US010129569B2

(12) United States Patent
Ortiz et al.

(10) Patent No.: US 10,129,569 B2
(45) Date of Patent: Nov. 13, 2018

(54) WIRELESS TRANSMISSION OF SPORTS VENUE-BASED DATA INCLUDING VIDEO TO HAND HELD DEVICES

(71) Applicant: Front Row Technologies, LLC, Albuquerque, NM (US)

(72) Inventors: Luis M. Ortiz, Albuquerque, NM (US); Kermit D. Lopez, Albuquerque, NM (US)

(73) Assignee: Front Row Technologies, LLC, Albuquerque, NM (US)

(*) Notice: Subject to any disclaimer, the term of this patent is extended or adjusted under 35 U.S.C. 154(b) by 390 days.

(21) Appl. No.: 14/470,231

(22) Filed: Aug. 27, 2014

(65) Prior Publication Data
US 2015/0052546 A1 Feb. 19, 2015

Related U.S. Application Data

(60) Continuation of application No. 12/819,609, filed on Jun. 21, 2010, now abandoned, which is a division of
(Continued)

(51) Int. Cl.
*H04N 21/2187* (2011.01)
*A63B 71/06* (2006.01)
(Continued)

(52) U.S. Cl.
CPC ......... *H04N 21/2187* (2013.01); *A63B 71/06* (2013.01); *H04N 5/247* (2013.01);
(Continued)

(58) Field of Classification Search
CPC ......... H04N 21/2187; H04N 21/25816; H04N 21/41407; H04N 21/4263; H04N 21/4312;
(Continued)

(56) References Cited

U.S. PATENT DOCUMENTS 4,183,056 A 1/1980 Evans et al.
4,443,387 A 4/1984 Gordon
(Continued)

FOREIGN PATENT DOCUMENTS

CA 2237939 9/1999
EP 0 934 765 A1 8/1999
(Continued)

OTHER PUBLICATIONS

Office Action dated Nov. 6, 2015 in U.S. Appl. No. 14/259,899.
(Continued)

*Primary Examiner* — Nhon T Diep
(74) *Attorney, Agent, or Firm* — Luis M. Ortiz; Kermit D. Lopez; Ortiz & Lopez, PLLC

(57) ABSTRACT

Venue-based data including video from cameras located at a sports venue can be provided to hand held devices authorized by at least one casino. A casino patron's hand held device can enable to view sporting events provided to a hand held device from a server and placement of wagers with the server. Venue-based data including video and statistics are received from server including camera views captured as video by at least one camera located within at least one sports venue. Venue-based data is processed at server for display on a display associated with at least one hand held device operating within a casino. Venue-based data is displayed on hand held devices, enabling casino patrons to view event video. Portable devices can be authorized only when moving about a casino. Casino patrons can also gamble using said hand held device while viewing selected sporting events within the casino.

10 Claims, 25 Drawing Sheets

Related U.S. Application Data application No. 09/902,348, filed on Jul. 10, 2001, now Pat. No. 7,812,856, application No. 14/470,231, filed on Aug. 27, 2014, which is a continuation of application No. 12/893,174, filed on Sep. 29, 2010, now abandoned, which is a continuation of application No. 09/902,348, filed on Jul. 10, 2001, now Pat. No. 7,812,856, application No. 14/470,231, filed on Aug. 27, 2014, which is a continuation of application No. 10/015,458, filed on Dec. 13, 2001, now abandoned.

(60) Provisional application No. 60/243,561, filed on Oct. 26, 2000.

(51) Int. Cl.
| | |
|---|---|
| *H04N 5/247* | (2006.01) |
| *H04N 5/44* | (2011.01) |
| *H04N 21/414* | (2011.01) |
| *H04N 21/426* | (2011.01) |
| *H04N 21/431* | (2011.01) |
| *H04N 21/478* | (2011.01) |
| *H04N 21/61* | (2011.01) |
| *H04N 21/81* | (2011.01) |
| *H04N 21/258* | (2011.01) |
| *H04N 5/38* | (2006.01) |

(52) U.S. Cl.
CPC ......... *H04N 5/44* (2013.01); *H04N 21/25816* (2013.01); *H04N 21/41407* (2013.01); *H04N 21/4263* (2013.01); *H04N 21/4312* (2013.01); *H04N 21/4314* (2013.01); *H04N 21/4781* (2013.01); *H04N 21/47815* (2013.01); *H04N 21/6131* (2013.01); *H04N 21/8126* (2013.01); *H04N 5/38* (2013.01)

(58) Field of Classification Search
CPC ........... H04N 21/4314; H04N 21/4781; H04N 21/47815; H04N 21/6131; H04N 21/8126; H04N 5/247; H04N 5/44; H04N 5/38; A63B 71/06
See application file for complete search history.

(56) References Cited

U.S. PATENT DOCUMENTS

| | | |
|---|---|---|
| 4,817,948 A | 4/1989 | Simonelli |
| 4,994,909 A | 2/1991 | Graves et al. |
| 5,036,537 A | 7/1991 | Jeffers et al. |
| 5,159,592 A | 10/1992 | Perkins |
| 5,164,827 A | 11/1992 | Paff |
| 5,243,415 A | 9/1993 | Vance |
| 5,295,180 A | 3/1994 | Vandetti et al. |
| 5,299,117 A | 3/1994 | Farnbach |
| 5,299,177 A | 3/1994 | Koch |
| 5,413,345 A | 5/1995 | Nauck |
| 5,422,816 A | 6/1995 | Sprague et al. |
| 5,448,291 A | 9/1995 | Wickline |
| 5,485,504 A | 1/1996 | Ohnsorge |
| 5,508,731 A | 4/1996 | Kohorn |
| 5,513,384 A | 4/1996 | Brennan et al. |
| 5,521,958 A | 5/1996 | Selig et al. |
| 5,530,924 A | 6/1996 | Miller |
| 5,546,538 A | 8/1996 | Cobbley et al. |
| 5,561,712 A | 10/1996 | Nishihara |
| 5,568,205 A | 10/1996 | Hurwitz |
| 5,579,239 A | 11/1996 | Freeman et al. |
| 5,585,850 A | 12/1996 | Schwaller |
| 5,598,208 A | 1/1997 | McClintock |
| 5,600,368 A | 2/1997 | Matthews, III |
| 5,613,191 A | 3/1997 | Hylton et al. |
| 5,621,732 A | 4/1997 | Osawa |
| 5,627,915 A | 5/1997 | Rosser et al. |
| 5,642,378 A | 6/1997 | Denheyer |
| 5,663,717 A | 9/1997 | DeLuca |
| 5,673,317 A | 9/1997 | Cooper |
| 5,689,549 A | 11/1997 | Bertocci et al. |
| 5,708,961 A | 1/1998 | Hylton et al. |
| 5,724,492 A | 3/1998 | Matthews, III et al. |
| 5,726,660 A | 3/1998 | Purdy et al. |
| 5,729,471 A | 3/1998 | Jain et al. |
| 5,729,535 A | 3/1998 | Rostoker et al. |
| 5,742,521 A | 4/1998 | Ellenby et al. |
| 5,757,916 A | 5/1998 | MacDoran et al. |
| 5,758,088 A | 5/1998 | Bezaire et al. |
| 5,760,824 A | 6/1998 | Hicks, III |
| 5,760,848 A | 6/1998 | Cho |
| 5,761,697 A | 6/1998 | Curry et al. |
| 5,763,864 A | 6/1998 | O'hagan et al. |
| 5,768,151 A | 6/1998 | Lowy et al. |
| 5,778,187 A | 7/1998 | Monteiro et al. |
| 5,793,416 A | 8/1998 | Rostoker et al. |
| 5,797,089 A | 8/1998 | Nguyen |
| 5,802,294 A | 9/1998 | Ludwig et al. |
| 5,806,005 A | 9/1998 | Hull et al. |
| 5,808,695 A | 9/1998 | Rosser et al. |
| 5,812,819 A | 9/1998 | Rodwin et al. |
| 5,822,324 A | 10/1998 | Kostresti et al. |
| 5,826,185 A | 10/1998 | Wise et al. |
| 5,835,061 A | 11/1998 | Stewart |
| 5,835,858 A | 11/1998 | Vaihoja et al. |
| 5,841,122 A | 11/1998 | Kirchhoff |
| 5,847,612 A | 12/1998 | Birleson |
| 5,847,762 A | 12/1998 | Canfield et al. |
| 5,850,352 A | 12/1998 | Moezzi et al. |
| 5,861,881 A | 1/1999 | Freeman et al. |
| 5,864,549 A | 1/1999 | Honkasalo et al. |
| 5,870,465 A | 2/1999 | Hosbach et al. |
| 5,878,211 A | 3/1999 | Delagrange et al. |
| 5,884,957 A | 3/1999 | Shoen et al. |
| 5,892,554 A | 4/1999 | Dicicco et al. |
| 5,894,320 A | 4/1999 | Vancelette |
| 5,912,700 A | 6/1999 | Honey et al. |
| 5,920,701 A | 7/1999 | Miller et al. |
| 5,922,073 A | 7/1999 | Shimada |
| 5,933,773 A | 8/1999 | Barvesten |
| 5,946,635 A | 8/1999 | Dominguez |
| D413,881 S | 9/1999 | Ida et al. |
| 5,953,056 A | 9/1999 | Tucker |
| 5,953,076 A | 9/1999 | Astle et al. |
| 5,956,716 A | 9/1999 | Kenner et al. |
| 5,959,539 A | 9/1999 | Adolph et al. |
| 5,979,757 A | 11/1999 | Tracy et al. |
| 5,982,445 A | 11/1999 | Eyer et al. |
| 5,983,005 A | 11/1999 | Monteiro et al. |
| 5,990,958 A | 11/1999 | Bheda et al. |
| 5,991,382 A | 11/1999 | Bayless et al. |
| 5,991,399 A | 11/1999 | Graunke et al. |
| 5,991,498 A | 11/1999 | Young |
| 5,999,124 A | 12/1999 | Sheynblat |
| 5,999,808 A | 12/1999 | LaDue |
| 6,002,720 A | 12/1999 | Yurt et al. |
| 6,002,995 A | 12/1999 | Suzuki et al. |
| 6,003,135 A | 12/1999 | Bialick et al. |
| 6,005,599 A | 12/1999 | Asai et al. |
| 6,005,611 A | 12/1999 | Gullichsen et al. |
| 6,005,927 A | 12/1999 | Rahrer et al. |
| 6,006,105 A | 12/1999 | Rostoker et al. |
| 6,009,336 A | 12/1999 | Harris et al. |
| 6,014,694 A | 1/2000 | Aharoni et al. |
| 6,016,348 A | 1/2000 | Blatter et al. |
| 6,023,606 A | 2/2000 | Monte et al. |
| 6,026,119 A | 2/2000 | Funk et al. |
| 6,029,000 A | 2/2000 | Woolsey et al. |
| 6,034,621 A | 3/2000 | Kaufman |
| 6,034,716 A | 3/2000 | Whiting et al. |
| 6,043,837 A | 3/2000 | Driscoll, Jr. et al. |
| 6,049,718 A | 4/2000 | Stewart |
| 6,064,860 A | 5/2000 | Ogden |
| D426,527 S | 6/2000 | Sakaguchi |

(56) References Cited

U.S. PATENT DOCUMENTS

| | | | |
|---|---|---|---|
| 6,073,124 A | 6/2000 | Krishnan et al. | |
| 6,073,171 A | 6/2000 | Gaughan et al. | |
| 6,078,954 A | 6/2000 | Lakey et al. | |
| 6,095,423 A | 8/2000 | Houdeau et al. | |
| 6,099,409 A | 8/2000 | Brenner et al. | |
| 6,100,925 A | 8/2000 | Rosser et al. | |
| 6,104,414 A | 8/2000 | Odryna et al. | |
| 6,104,815 A | 8/2000 | Alcorn et al. | |
| 6,108,365 A | 8/2000 | Rubin et al. | |
| 6,111,863 A | 8/2000 | Rostoker et al. | |
| 6,115,615 A | 9/2000 | Ota et al. | |
| 6,118,493 A | 9/2000 | Duhault et al. | |
| 6,121,966 A | 9/2000 | Teodosio et al. | |
| 6,124,862 A | 9/2000 | Boyken et al. | |
| 6,128,143 A | 10/2000 | Nalwa | |
| 6,131,025 A | 10/2000 | Riley et al. | |
| 6,133,946 A | 10/2000 | Cavallaro et al. | |
| 6,137,525 A | 10/2000 | Lee et al. | |
| 6,141,034 A * | 10/2000 | McCutchen | G02B 27/22 348/36 |
| 6,141,347 A | 10/2000 | Shaughnessy et al. | |
| 6,144,375 A | 11/2000 | Jain et al. | |
| 6,144,402 A | 11/2000 | Norsworthy et al. | |
| 6,144,702 A | 11/2000 | Yurt et al. | |
| 6,154,172 A | 11/2000 | Piccionelli et al. | |
| 6,154,250 A | 11/2000 | Honey et al. | |
| 6,167,092 A | 12/2000 | Lengwehasatit | |
| 6,169,568 B1 | 1/2001 | Shigetomi | |
| 6,173,317 B1 | 1/2001 | Chaddha et al. | |
| 6,175,517 B1 | 1/2001 | Jigour et al. | |
| 6,178,426 B1 | 1/2001 | Klein et al. | |
| 6,182,084 B1 | 1/2001 | Cockrell et al. | |
| 6,192,257 B1 | 2/2001 | Ray | |
| 6,195,680 B1 | 2/2001 | Goldszmidt et al. | |
| 6,204,843 B1 | 3/2001 | Freeman et al. | |
| 6,215,484 B1 | 4/2001 | Freeman et al. | |
| 6,222,937 B1 | 4/2001 | Cohen et al. | |
| 6,227,974 B1 | 5/2001 | Eilat et al. | |
| 6,252,586 B1 | 6/2001 | Freeman et al. | |
| 6,256,019 B1 | 7/2001 | Allport | |
| 6,269,483 B1 | 7/2001 | Broussard | |
| 6,271,752 B1 | 8/2001 | Vaios | |
| 6,278,374 B1 * | 8/2001 | Ganeshan | F23N 5/082 250/554 |
| 6,289,464 B1 | 9/2001 | Wecker et al. | |
| 6,295,094 B1 | 9/2001 | Cuccia | |
| 6,317,039 B1 | 11/2001 | Thomason | |
| 6,317,776 B1 | 11/2001 | Broussard et al. | |
| 6,356,661 B1 | 3/2002 | Wen | |
| 6,359,902 B1 | 3/2002 | Putzolu | |
| 6,373,842 B1 | 4/2002 | Coverdale et al. | |
| 6,385,772 B1 | 5/2002 | Courtney | |
| 6,389,473 B1 | 5/2002 | Carmel et al. | |
| 6,400,264 B1 | 6/2002 | Hsieh | |
| 6,400,946 B1 | 6/2002 | Vazvan et al. | |
| 6,405,371 B1 | 6/2002 | Oosterhout et al. | |
| 6,424,369 B1 | 7/2002 | Adair et al. | |
| 6,434,398 B1 | 8/2002 | Inselberg | |
| 6,434,403 B1 | 8/2002 | Ausems et al. | |
| 6,434,530 B1 | 8/2002 | Sloane et al. | |
| 6,442,637 B1 | 8/2002 | Hawkins et al. | |
| 6,443,840 B2 | 9/2002 | Von Kohorn | |
| 6,456,334 B1 | 9/2002 | Duhault | |
| 6,466,202 B1 | 10/2002 | Suso et al. | |
| 6,470,378 B1 | 10/2002 | Tracton et al. | |
| 6,473,739 B1 | 10/2002 | Showghi et al. | |
| 6,492,997 B1 | 12/2002 | Gerba et al. | |
| 6,496,802 B1 | 12/2002 | van Zoest et al. | |
| 6,496,980 B1 | 12/2002 | Tillman et al. | |
| 6,498,865 B1 | 12/2002 | Brailean et al. | |
| 6,519,771 B1 | 2/2003 | Zenith | |
| 6,522,352 B1 | 2/2003 | Strandwitz et al. | |
| 6,525,762 B1 | 2/2003 | Mileski et al. | |
| 6,526,034 B1 | 2/2003 | Gorsuch | |
| 6,526,335 B1 | 2/2003 | Treyz et al. | |
| 6,529,519 B1 | 3/2003 | Steiner et al. | |
| 6,535,493 B1 | 3/2003 | Lee et al. | |
| 6,549,624 B1 | 4/2003 | Sandru | |
| 6,560,443 B1 | 5/2003 | Vaisanen et al. | |
| 6,564,070 B1 | 5/2003 | Nagamine et al. | |
| 6,564,380 B1 | 5/2003 | Murphy | |
| 6,570,889 B1 | 5/2003 | Stirling-Gallacher et al. | |
| 6,571,221 B1 | 5/2003 | Stewart et al. | |
| 6,578,203 B1 * | 6/2003 | Anderson, Jr. | H04S 1/002 348/143 |
| 6,579,203 B2 | 6/2003 | Wang et al. | |
| 6,602,191 B2 | 8/2003 | Quy | |
| 6,603,977 B1 | 8/2003 | Walsh et al. | |
| 6,608,633 B1 | 8/2003 | Sciammarella et al. | |
| 6,615,175 B1 * | 9/2003 | Gazdzinski | B66B 1/34 187/396 |
| 6,622,017 B1 | 9/2003 | Hoffman | |
| 6,624,846 B1 | 9/2003 | Lassiter | |
| 6,631,522 B1 | 10/2003 | Erdelyi | |
| 6,647,015 B2 | 11/2003 | Malkemes et al. | |
| 6,657,654 B2 | 12/2003 | Narayanaswami | |
| 6,658,019 B1 | 12/2003 | Chen et al. | |
| 6,665,291 B1 | 12/2003 | Shahdad et al. | |
| 6,669,346 B2 | 12/2003 | Metcalf | |
| 6,675,386 B1 * | 1/2004 | Hendricks | H04N 7/17318 348/143 |
| 6,681,398 B1 * | 1/2004 | Verna | H04N 5/76 348/E5.103 |
| 6,684,250 B2 | 1/2004 | Anderson et al. | |
| 6,690,947 B1 * | 2/2004 | Tom | H04M 1/72525 455/418 |
| 6,697,018 B2 | 2/2004 | Stewart | |
| 6,714,797 B1 | 3/2004 | Rautila | |
| 6,728,518 B1 | 4/2004 | Scrivens et al. | |
| 6,731,940 B1 | 5/2004 | Nagendran | |
| 6,741,250 B1 | 5/2004 | Furlan et al. | |
| 6,751,221 B1 | 6/2004 | Saito et al. | |
| 6,754,509 B1 | 6/2004 | Khan et al. | |
| 6,757,262 B1 | 6/2004 | Weisshaar et al. | |
| 6,757,740 B1 | 6/2004 | Parekh et al. | |
| 6,766,036 B1 | 7/2004 | Pryor | |
| 6,769,028 B1 | 7/2004 | Sass et al. | |
| 6,769,127 B1 | 7/2004 | Bonomi et al. | |
| 6,774,926 B1 | 8/2004 | Ellis et al. | |
| 6,782,102 B2 | 8/2004 | Blanchard et al. | |
| 6,813,608 B1 | 11/2004 | Baranowski | |
| 6,819,354 B1 | 11/2004 | Foster et al. | |
| 6,839,080 B2 | 1/2005 | Meyers | |
| 6,853,851 B1 | 2/2005 | Rautiola et al. | |
| 6,853,973 B2 | 2/2005 | Mathews et al. | |
| 6,859,791 B1 | 2/2005 | Spagna et al. | |
| 6,877,134 B1 | 4/2005 | Fuller et al. | |
| 6,889,384 B1 | 5/2005 | Soloff | |
| 6,895,216 B2 | 5/2005 | Sato et al. | |
| 6,912,513 B1 | 6/2005 | Candelore | |
| 6,931,290 B2 | 8/2005 | Forest | |
| 6,934,510 B2 | 8/2005 | Katayama | |
| 6,952,558 B2 | 10/2005 | Hardacker | |
| 6,954,469 B1 | 10/2005 | Dygert | |
| 6,968,012 B1 | 11/2005 | Meggers | |
| 6,970,183 B1 | 11/2005 | Monroe | |
| 6,970,678 B1 | 11/2005 | Ditzik | |
| 6,985,588 B1 | 1/2006 | Glick et al. | |
| 6,986,155 B1 | 1/2006 | Courtney et al. | |
| 6,986,158 B1 | 1/2006 | Terui et al. | |
| 6,992,702 B1 | 1/2006 | Foote et al. | |
| 6,993,137 B2 | 1/2006 | Fransdonk | |
| 7,010,492 B1 | 3/2006 | Bassett et al. | |
| 7,015,954 B1 | 3/2006 | Foote et al. | |
| 7,024,677 B1 | 4/2006 | Synder et al. | |
| 7,037,198 B2 | 5/2006 | Hameen-Anttila | |
| 7,080,153 B2 | 7/2006 | Monteiro et al. | |
| 7,080,774 B1 | 7/2006 | Abboud et al. | |
| 7,106,360 B1 | 9/2006 | Frederick | |
| 7,124,425 B1 | 10/2006 | Anderson, Jr. et al. | |
| 7,133,837 B1 | 11/2006 | Barnes, Jr. | |
| 7,149,253 B2 | 12/2006 | Hosur | |
| 7,149,549 B1 | 12/2006 | Ortiz et al. | |
| 7,162,532 B2 | 1/2007 | Koehler et al. | |

(56) References Cited

U.S. PATENT DOCUMENTS

| | | | |
|---|---|---|---|
| 7,174,308 B2 | 2/2007 | Bergman et al. |
| 7,191,462 B1 | 3/2007 | Roman et al. |
| 7,193,645 B1 | 3/2007 | Aagaard et al. |
| 7,196,722 B2 | 3/2007 | White et al. |
| 7,229,354 B2 | 6/2007 | McNutt et al. |
| 7,257,158 B1 | 8/2007 | Figueredo et al. |
| 7,376,388 B2 | 5/2008 | Ortiz et al. |
| 7,379,886 B1 | 5/2008 | Zaring et al. |
| 7,448,063 B2 | 11/2008 | Freeman et al. |
| 7,451,401 B2 | 11/2008 | Tanskanen et al. |
| 7,486,943 B2 | 2/2009 | Choti et al. |
| 7,487,112 B2 | 2/2009 | Barnes, Jr. |
| 7,603,321 B2 | 10/2009 | Gurvey |
| 7,657,910 B1 | 2/2010 | McAulay et al. |
| 7,683,937 B1 | 3/2010 | Blumenfeld |
| 7,712,125 B2 | 5/2010 | Herigstad et al. |
| 7,782,363 B2 | 8/2010 | Ortiz |
| 7,792,297 B1 | 9/2010 | Piccionelli et al. |
| 7,812,856 B2 | 10/2010 | Ortiz et al. |
| 7,822,635 B1 | 10/2010 | Brown et al. |
| 7,849,393 B1 | 12/2010 | Hendricks et al. |
| 7,945,935 B2 | 5/2011 | Stonedahl |
| 7,962,948 B1 | 6/2011 | Girouard et al. |
| 8,024,186 B1 | 9/2011 | De Bonet |
| 8,051,453 B2 | 11/2011 | Arseneau et al. |
| 8,086,184 B2 | 12/2011 | Ortiz et al. |
| 8,087,054 B2 | 12/2011 | Zacks et al. |
| 8,090,321 B2 | 1/2012 | Ortiz et al. |
| 8,165,598 B2 | 4/2012 | Tran et al. |
| 8,270,895 B2 | 9/2012 | Ortiz et al. |
| 8,401,460 B2 | 3/2013 | Ortiz et al. |
| 8,433,278 B2 | 4/2013 | Adams et al. |
| 8,464,302 B1 | 6/2013 | Liwerant et al. |
| 8,583,027 B2 | 11/2013 | Ortiz et al. |
| 8,588,815 B2 | 11/2013 | Kenyon |
| 8,724,484 B2 | 5/2014 | Jones et al. |
| 2001/0025239 A1 | 9/2001 | Hakenberg et al. |
| 2001/0040671 A1 | 11/2001 | Metcalf |
| 2001/0042105 A1 | 11/2001 | Koehler et al. |
| 2001/0045978 A1 | 11/2001 | McConnell et al. |
| 2002/0018124 A1 | 2/2002 | Mottur et al. |
| 2002/0023010 A1 | 2/2002 | Rittmaster et al. |
| 2002/0023123 A1 | 2/2002 | Madison |
| 2002/0046084 A1 | 4/2002 | Steele et al. |
| 2002/0049979 A1 | 4/2002 | White et al. |
| 2002/0053078 A1 | 5/2002 | Holtz et al. |
| 2002/0056081 A1 | 5/2002 | Morley et al. |
| 2002/0058499 A1 | 5/2002 | Ortiz |
| 2002/0069419 A1 | 6/2002 | Raverdy et al. |
| 2002/0099854 A1 | 7/2002 | Jorgensen |
| 2002/0109706 A1 | 8/2002 | Lincke et al. |
| 2002/0115454 A1 | 8/2002 | Hardacker |
| 2002/0176000 A1 | 11/2002 | Katayama |
| 2002/0177449 A1 | 11/2002 | McDonnell et al. |
| 2002/0186668 A1 | 12/2002 | Thomason |
| 2002/0188943 A1 | 12/2002 | Freeman et al. |
| 2003/0036408 A1 | 2/2003 | Johansson et al. |
| 2003/0040303 A1 | 2/2003 | Nelson et al. |
| 2003/0041334 A1 | 2/2003 | Lu |
| 2003/0046108 A1 | 3/2003 | Labadie |
| 2003/0061294 A1 | 3/2003 | Stennicke |
| 2003/0093797 A1 | 5/2003 | Bazzaz |
| 2003/0105845 A1 | 6/2003 | Leermakers |
| 2003/0112354 A1 | 6/2003 | Ortiz et al. |
| 2003/0156540 A1 | 8/2003 | Trossen et al. |
| 2003/0172375 A1 | 9/2003 | Shaw et al. |
| 2003/0189589 A1 | 10/2003 | LeBlanc et al. |
| 2003/0210329 A1 | 11/2003 | Aagaard et al. |
| 2004/0073437 A1 | 4/2004 | Halgas, Jr. et al. |
| 2004/0098748 A1 | 5/2004 | Bo et al. |
| 2005/0046698 A1 | 3/2005 | Knight |
| 2005/0060751 A1 | 3/2005 | Glaser |
| 2005/0246752 A1 | 11/2005 | Liwerant et al. |
| 2006/0047774 A1 | 3/2006 | Bowman et al. |
| 2006/0104600 A1 | 5/2006 | Abrams |
| 2006/0170778 A1 | 8/2006 | Ely et al. |
| 2006/0174297 A1 | 8/2006 | Anderson, Jr. et al. |
| 2006/0203770 A1 | 9/2006 | Kjellberg |
| 2006/0288375 A1 | 12/2006 | Ortiz et al. |
| 2007/0005795 A1 | 1/2007 | Gonzalez |
| 2007/0015586 A1 | 1/2007 | Huston |
| 2007/0019068 A1 | 1/2007 | Arseneau et al. |
| 2007/0067446 A1 | 3/2007 | Jones et al. |
| 2007/0129817 A1 | 6/2007 | Cadiz et al. |
| 2007/0188611 A1 | 8/2007 | Carter |
| 2007/0240190 A1 | 10/2007 | Arseneau et al. |
| 2007/0275746 A1 | 11/2007 | Bitran |
| 2008/0016534 A1 | 1/2008 | Ortiz et al. |
| 2008/0040753 A1 | 2/2008 | Anandpura et al. |
| 2008/0254811 A1 | 10/2008 | Stewart |
| 2008/0270567 A1 | 10/2008 | Stiers et al. |
| 2008/0271082 A1 | 10/2008 | Carter et al. |
| 2009/0017749 A1 | 1/2009 | Braun |
| 2009/0237505 A1 | 9/2009 | Ortiz |
| 2009/0262136 A1 | 10/2009 | Tischer et al. |
| 2010/0188485 A1 | 7/2010 | Abrams |

FOREIGN PATENT DOCUMENTS

| | | | |
|---|---|---|---|
| EP | 1 113 669 A2 | 7/2001 |
| WO | 9935827 A1 | 7/1999 |
| WO | 0016544 A2 | 3/2000 |
| WO | 0072574 A2 | 11/2000 |
| WO | 0103088 A1 | 1/2001 |
| WO | 0106791 A1 | 1/2001 |
| WO | 0110128 A1 | 2/2001 |
| WO | 0114981 A1 | 3/2001 |
| WO | 0115450 A1 | 3/2001 |
| WO | 0117262 A1 | 3/2001 |
| WO | WO 01/31497 A1 | 5/2001 |
| WO | 0180559 A2 | 10/2001 |
| WO | 0198903 A1 | 12/2001 |

OTHER PUBLICATIONS

Merriam-Webster, Incorporated, "Merriam-Webster's Collegiate Dictionary," 10th Edition, Springfield, MA, 1998, p. 583.

Second Declaration of Paul S. Min, PhD, filed in Requester's Comments in Reexam Control No. 95/001,566, 25 pages.

Requester's Comments in Response to Mar. 31, 2015 Non-Final Office Action and Jun. 1, 2015 Patent Owner's Submissions filed on Jul. 1, 2015 in Control No. 95/001,566.

Holbrook H. W. et at., IP Multicast Channels: Express Support for Large-scale Single-source Applications, Proceedings of the Conference on Applications Technologies, Architectures, and Protocols for Computer Communication (1999) New York, pp. 65-78.

Holmquist, L. E., Breaking the Screen Barrier, Gothenburg Studies in Informatics, Report 16 May 2000, Depart of Informatics, Goteborg University, Sweden, 152 pages.

Horn, U. et al., Scalable Video Coding for Multimedia Applications and Robust Transmission over Wireless Channels, 7th International Workshop on Packet Video (1996) pp. 43-48.

IEEE Std 802.11-1997, Part 11: Wireless LAN Medium Access Control (MAC) and Physical Layer (PHY) Specifcations, Jun. 26, 1997, 459 pages.

Isidore, C., Baseball's secret $uccess $tory, CNNMoney.com, Dec. 23, 2005, 3 pages.

Iwata, A. et al, Scalable Routing Strategies for Ad Hoc Wireless Networks, IEEE Journal on Selected Areas in Communications (1999) 17(8):1369-1379.

Jiang, Z. et al., Incorporation Proxy Services into Wide Area Cellular IP Networks, IEEE Wireless Communications and Networking Conference(2000) Chicago, IL, Sep. 23-28, pp. 246-252.

Johanson, M., Smile!—A Multimedia Communication Framework for Distributed Collaboration, Framkom technical report 2001:1, 12 pages.

Johnson, D. B., Dynamic Source Routing in Ad Hoc Wireless Networks, Mobile Computing (1996) Springer, Imielinski T. et al. (eds.), pp. 153-161.

(56) References Cited

OTHER PUBLICATIONS

Johnston, A. et al., Ericsson's WebOnAir Information Server, Ericsson Review (2000) 4:264-274.
Jonsson, L-E , RObust Checksum-based header COmpression (ROCCO), Ericsson Research, Sweden, Nov. 9, 1999, 17 pages.
Kalva, H. et al., Implementing Multiplexing, Streaming, and Server Interaction for MPEG-4, IEEE Transactions on Circuits and Systems for Video Technology (1999) 9(8):1299-1312.
Katkere, A. et al., Multiple Perspective Interactive Video, International Joint Conference on Artificial Intelligence (1995) 14(2):2063-2064.
Katz, R. H., Adaptation and Mobility in Wireless Information Systems, IEEE Personal Communications (1995) 1:6-17.
Kellerer, W. et al., IP based enhanced Data Casting Services over Radio Broadcast Networks, 1st European Conference on Universal Multiservice Networks (2000) Colmar, Oct. 2-4, pp. 195-203.
Kent, S. et al., Network Working Group, RFC 2401, Security Architecture for the Internet Protocol, Nov. 1998, 66 pages.
Kent, S. et al., Network Working Group, RFC 2402, IP Authentication Header, Nov. 1998, 22 pages.
Koivisto, A., Multimedia Presentation and Transmission Standards and Their Support for Automatic Analysis, Conversion and Scaling: A Survey, Language and Media Processing Laboratory Mar. 2000, LAMP-TR-039, 46 pages.
Kozamernik, F., Media Streaming over the Internet—an overview of delivery technologies, EBU Technical Review Oct. 2002, 15 pages.
Kuri, J. et al., Reliable Multicast in Multi-access Wireless LANS, Eighteenth Annual Joint Conference of the IEEE Computer and Communications Societies (1999) New York, Mar. 21-25, pp. 760-767 vol. 2.
Larzon, L-A., A Lighter UDP, Thesis, Division of Computer Communications, Depart. of Computer Science and Electrical Engineering, Lulea University of Technology, Lulea, Sweden, Dec. 1999, 55 pages.
Latour, A., New Video Technology Lets Users Manipulate What They Watch, The Wall Street Journal, Dec. 7, 2000, 4 pages.
Lee, S.-J. et al., Ad hoc Wireless Multicast with Mobility Prediction, Eight International Conference on Computer Communications and Networks (1999) Boston, MA, Oct. 11-13, pp. 4-9.
Lee, S.-J. et al., A Performance Comparison Study of Ad Hoc Wireless Multicast Protocols, IEEE INFOCOM (2000), pp. 565-574.
Lee, H. et al., Fischlar on a PDA: Handheld User Interface Design to a Video Indexing, Browsing and Playback System, International Conference on Universal Access in Human-Computer Interaction (2001) New Orleans, LA, Aug. 5-10, 5 pages.
Lefebvre, F., An Experimental DAB Delivery Platform for Internet Broadcast Services, Communications Research Centre Canada, Canada, 7 pages.
Li A. H., et al (eds.), Video Steaming Services—Stage 1, 3rd Generation Partnership Project 2, Version 1.0, Jul. 10, 2000, 18 pages.
Mauve, M. et al., An Application Developer's Perspective on Reliable Multicast for Distributed Interactive Media, ACM SIGCOMM Computer Communication Review Jul. 2000, 12 pages.
Microsoft NetShow—A Now outdated Active Streaming and RealMedia A/V tool Note: NetShow has been supplanted by the new Windows Media Player, ServerWatch, Jun. 25, 2002, 3 pages.
MobiTV, https://www.mobitiv.com, printed Apr. 15, 2016, 10 pages.
Montelius, F. et al., Streaming Video in Wireless Networks—Service and Technique, Thesis, Linkoping Department of Electrical Engineering, Dec. 11, 2001, Linkoping, Sweden, 126 pages.
Moura, J. M. F. et al., Retrieving quality video across heterogenous networks—Video over Wireless, IEEE Personal Communications (1996) 3(1):44-54.
Nedovic, V. et al., Delivery of Near Real-Time Soccer Match Highlights to Wireless PDA Devices, Dec. 2002, 6 pages.
NetAid, Wikipedia—the free encyclopedia, printed Apr. 15, 2016, 3 pages.
Nilsson, T., Toward third-generation mobile multimedia communication, Ericsson Review No. 3 (1999) pp. 122-131.
Ojala, T. et al., Mobile Karpat—A Case Study in Wireless Personal area Networking, MUM (2004) Oct. 27-29, College Park, MA,8 pages.
Opara Glass Network, http://www.operaglassnetworks.com, printed Apr. 15, 2016, 1 page.
Oracle Video Server, Introducing Oracle Video Server, Release 3.0, Feb. 1998, 78 pages.
Oracle Video Server in the Broadcast Industry, An Oracle Technical White Paper, Apr. 1999, 15 pages.
PacketVideo Corporation, Private Company Information—Businessweek, printed Apr. 15, 2016, 2 pages.
Parnes, P., The mStar Environment—Scalable Distributed Teamwork using IP Multicast, Sep. 1997, Thesis for Division of Software Engineering, Depart. of Computer Science and Electrical Engineering, Lulea University of Technology, Sweden, 74 pages.
Parnes, P., The mStar Environment—Distributed Collaborative Teamwork in Action, Aug. 7, 1997.
Parnes, P., The History of the mStar Entertainment, Lulea University of Technology, Sweden, Oct. 11, 1998, 4 pages.
Parnes, P. et al., Real-Time Control and Management of Distributed Applications using IP-Multicast, Proceedings of the Sixth IFIP/IEEE International Symposium on Integrated Network Management (1999) Boston, MA, May 24-28, pp. 901-914.
Parnes, P., An IP-Multicast based Framework for Designing Synchronous Distributed Multi-User Applications on the Internet, Doctoral Thesis, Computer Science and Electrical Engineering, Lulea University of Technology, Nov. 1999, 218 pages.
Parnes, P. et al., Paper D—mSTAR: Enabling Collaborative Applications on the Internet, Journal of Internet Computing Sep./Oct. 2000, pp. 95-108.
Pattath, A. et al., Interactive Visualization and Analysis of Network and Sensor Data on Mobile Devices, IEEE Symposium on Visual Analytics Science and Technology (2006) Baltimore, MD, Oct. 31-Nov. 2, pp. 83-90.
Petkovic, M. et al., A Framework for Video Modelling, The Proc. of International Conference on Applied Informatics (2000) 6 pages.
Pham, T.-L. et al., A Situated Computing Framework for Mobile and Ubiquitous Multimedia Access using Small Screen and Composite Devices, Proceedings of the eighth ACM International Conference on Multimedia (2006) New York, pp. 323-331.
Postel, J., RFC 768, User Datagram Protocol, Aug. 28, 1980, 3 pages.
Postel, J. (eds.), RFC: 791, Internet Protocol, DARPA Internet Program, Protocol Specification Sep. 1981, 45 pages.
Postel, J. (eds.), RFC: 793, Transmission Control Protocol, DARPA Internet Program, Protocol Specification, Sep. 1981, 81 pages.
PR Newswire, iMove™ and InMotion Technologies Partner to Delivery Enhanced Sports Video Solutions Jun. 26, 2000 4 pages.
Qian, L. et al., A General Joint Source—Channel Matching Method for Wireless Video Transmission, Data Compression Conference (1999) Snowbird, UT, Mar. 29-31., pp. 414-423.
Rehm, E., Representing Internet Streaming Media Metadata using MPEG-7 Multimedia Description Schemes, Proceedings of the 2000 ACM workshops on Multimedia (2000) New York, pp. 93-98.
Roman, M. et al., Integrating PDAs into Distributed Systems: 2K and PalmORB, Lecture Notes in Computer Science Sep. 1999 13 pages.
Rowe, L. A. et al., BIBS: A Lecture Webcasting System, Mar. 20, 2001, 23 pages.
Sahasrabuddhe, L. H. et al., Light-Trees: Optical Multicasting for Improved Performance in Wavelength-Routed Networks, IEEE Communications Feb. 1999, pp. 67-73.
Sampath, L., Wireless/Mobile Video Delivery Architecture, Thesis, Graduate School of the University of Florida, 2000, 88 pages.
Santini, S. et al., A Multiple Perspective Interactive Video Architecture for VSAM, Proceedings of the 1998 DARPA Image Understanding Workshop, Monterey, CA, Nov. 1998, 5 pages.
ScanZ Communications Selects Cadence to Bring New Sports-Officiating Technology to Live, Speed Communications, May 5, 1999, 2 pages.

(56) References Cited

OTHER PUBLICATIONS

Schmandt, C. et al., Impromptu: Managing Networked Audio Applications for Mobile Users, MoviSYS (2004) Boston, MA, Jun. 6-9, 11 pages.
Schmidt, B. K., An Architecture for Distributed, Interactive, Multi-Stream Multi-Participant Audio and Video, Technical Report No. CSL-TR-99-781, Apr. 1999, Stanford University, 46 pages.
Servetto, S. D. et al., Video Multicast Over Fair Queueing Networks, Proceedings of the 2000 IEEE International Conference on Image Processing, Vancouver, BC Sep. 10-13, pp. 540-543 vol. 3.
Singh, A., Networking Protocol for Wireless Multimedia Streaming, Research Project in the Dept. of Electrical Engineering and Computer Sciences, University of California Berkeley, May 19, 2000, 27 pages.
Strupczewski, J. "Wireless gadgets give sports fans closer look," Dec. 14, 2001 Reuters News 12:50:05, Exhibit 5 of Case No. 1:10-cv-00433-JB-KBM, 4 pages.
Talluri, R. et al., A Robust, Scalable, Object-based Video Compression Technique for Very Low Bitrate Coding, IEEE Transactions on Circuits and Systems for Video Technology (1997) 7(1):221-233.
Tamm, G., 100,000 following sailing on the net, Contact (2000) No. 3, Mar. 2, Ericsson Exhibit 3 of Case No. 1:10-cv-00433-JB-KBM, 3 pages.
Tamm, G , Mobile Internet takes you to the ice, Contact (2000) No. 8, May 18, Ericsson, Exhibit 1 of Case No. 1:10-cv-00433-JB-KBM, 3 pages.
Tiilikainen, P., SIP (RFC 2543), an Implementation for Marratech Pro, Thesis, Division of Software Engineering, Depart. of Computer Science and Electrical Engineering, Lulea University of Technology, Sweden, Apr. 2000, 29 pages.
Vass, J. et al., Mobile Video Communications in Wireless Environments, IEEE 3rd Workshop on Multimedia Signal Processing (1999) Copenhagen, Sep. 13-15, pp. 45-50.
Vernick, M., The Design, Implementation, and Analysis of the Stony Brook Video Server, Dissertation, Doctor of Philosophy, Computer Science, State University of New York, Stony Brook, Dec. 1996, 137 pages.
Virage, Inc., C-Span and Virage Launch Wireless Presidential Debate Video Search Engine, Oct. 3, 2000, 4 pages.
Wallen, J., GEO targets Big Brother addicts, Citywire Money Nov. 1, 2000, 1 page.
Wang, Y. et al., Error Control and Concealment for Video Conmmunication: A Review, Proceedings of the IEEE (1998) 86(5):974-997.
Wideray, Jack SP640 User Guide, 2002, 23 pages.
Wikstrand, G. et al., Designing a Football Experience for a Mobile Device, Human-Computer Interaction (2003) Rauterberg, M. et al., (eds.) IOS Press, pp. 940-943.
Wikstrand, G., Human Factors and Wireless Network Applications, More Bits and Better Bits, Ph.D. Thesis, Depart. of Computing Science, Umea University, 2006, 91 pages.
Wordzap AG: Private Comapny Information—Businessweek, printed Apr. 20, 2016, 1 page.
Wu, D., An Internet MBone Broadcast Management System, Jul. 15, 1998, 11 pages.
Xu, D. et al., Providing Seamless QoS for Multimedia Multicast in Wireless Packet Networks, SPIE 3528, Multimedia Systems and Applications Jan. 22, 1999, 10 pages.
Yun, L. C., Digital Video in a Fading Interference Wireless Environment, IEEE International Conference on Acoustics, Speech, and Signal Processing (1996) Atlanta, GA, May 7-10, pp. 1069-1072 vol. 2.
Zaslavsky, A. et al., Mobile Computing: Overview and Current Status, Australian Computer Journal (1999) 30(2):42-52.
U.S. Appl. No. 14/186,48—Office Action dated Jul. 15, 2016.
95/001,565 3PR Request for Reexam submitted Mar. 4, 2011.
95/001,565 PO Response to non-final Office Action dated May 26, 2011.
95/001,565 Decision on Petition Dismissed issued Aug. 18, 2011.
95/001,565 Decision on Petition Granted in part issued Nov. 4, 2011.
95/001,565 PO Response after non-final action dated Nov. 21, 2011.
95/001,565 Information Disclosure Statement dated Dec. 14, 2011.
95/001,565 Decision on Petition Dismissed issued Feb. 3, 2012.
95/001,565 PO Response after non-final action dated Feb. 16, 2012.
95/001,565 Decision on Petition Dismissed issued Mar. 2, 2012.
95/001,565 Decision on Petition Dismissed issued Mar. 7, 2012.
95/001,565 Action Closing Prosecution issued Mar. 12, 2012.
95/001,565 PO Comments after Action Closing Prosecution submitted Mar. 16, 2012.
95/001,565 Affidavit(s), Declaration(s) and/or Exhibit(s) submitted Mar. 16, 2012.
95/001,565 Decision on Petition Dismissed issued Jun. 5, 2012.
95/001,565 Affidavit(s), Declaration(s) and/or Exhibit(s) submitted Jun. 6, 2012.
95/001,565 Decision on Petition Dismissed issued Oct. 25, 2012.
95/001,565 Reexam—non-final action + determination dated Apr. 1, 2011.
95/001,565 Accepted response only dated Nov. 9, 2012.
95/001,565 PO complete Response to non-final Office Action + RTB declaration + petitions dated Nov. 9, 2012.
95/001,565 3PR Opposition filed in response to petition submitted Nov. 23, 2012.
95/001,565 Decision on Petition (PO petition to revive) issued Apr. 2, 2013.
95/001,565 Decision on Petition (PO page waiver) issued Jul. 2, 2013.
95/001,565 3PR Petition, IDS, Comments after ACP submitted Aug. 1, 2013.
95/001,565 Decision on Petition (3PR page waiver) issued Nov. 18, 2013.
95/001,565 Information Disclosure Statement filed Nov. 22, 2013.
95/001,565 Information Disclosure Statement filed Nov. 27, 2013.
95/001,565 Action Closing Prosecution issued Apr. 11, 2014.
95/001,565 3PR Petition to Require Examiner to consider Gullichsen Articles submitted Jun. 10, 2014.
95/001,565 Decision on Petition Denied issued Aug. 8, 2014.
95/001,565 3PR Renewed Petition to Require Examiner to consider Gullichsen Articles submitted Oct. 8, 2014.
95/001,565 Decision on Petition Granted issued Dec. 8, 2014.
95/001,565 Non-Final Office Action dated Jan. 29, 2015.
95/001,565 PO Response to Non-Final Office Action dated Mar. 30, 2015.
95/001,565 3PR Request Comments after Non-Final Action dated Apr. 29, 2015.
95/001,565 Decision on Petition Granted issued Jun. 22, 2015.
95/001,565 Affidavit(s), Declaration(s) and/or Exhibit(s) submitted Aug. 19, 2015.
95/001,565 Information Disclosure Statement filed Aug. 19, 2015.
95/001,565 Decision on Petition Granted issued Sep. 11, 2015.
95/001,565 3PR Comments after Non-Final Office Action dated Oct. 8, 2015.
95/001,565 Action Closing Prosecution issued Jan. 20, 2016.
95/001,565 PO Response to Action Closing Prosecution dated Feb. 22, 2016.
95/001,565 3PR Requester Comments after Action Closing Prosecution submitted Mar. 23, 2016.
95/001,565 Right of Appeal Notice issued Apr. 11, 2016.
95/001,565 Notice of Appeal filed May 10, 2016.
95/001,566 Receipt of Original Inter Partes Reexam Request Mar. 4, 2011.
95/001,566 Reexamination Formalities Notice Mailed Mar. 15, 2011.
95/001,566 Notice of reexamination request filing date Mar. 15, 2011.
95/001,566 Non-Final Office Action dated Apr. 22, 2011.
95/001,566 Response after non-final action—owner—dated Jun. 17, 2011.
95/001,566 Information Disclosure Statement (IDS) filed Jun. 17, 2011.
95/001,566 Receipt of Petition in a Reexam Jul. 18, 2011.

(56) References Cited

OTHER PUBLICATIONS

95/001,566 Third Party Requester Comments after Non-final Action dated Jul. 18, 2011.
95/001,566 Information Disclosure Statement (IDS) File Jul. 18, 2011.
95/001,566 Information Disclosure Statement filed Jul. 18, 2011.
95/001,566 Notification of Defective Paper in a Reexam Jul. 27, 2011.
95/001,566 RX—Mail Petition Decision—Dismissed Aug. 18, 2011.
95/001,566 Receipt of Petition in a Reexam Aug. 26, 2011.
95/001,566 Receipt of Petition in a Reexam Nov. 21, 2011.
95/001,566 Receipt of Petition in a Reexam Dec. 14, 2011.
95/001,566 Third Party Request Comments after Non-final Action dated Dec. 14, 2011.
95/001,566 RX—Mail Petition Decision—Dismissed Jan. 26, 2012.
95/001,565 Petition Decision on Request for Reconsideration Denying Reexamination Feb. 3, 2012.
95/001,566 Receipt of Petition in a Reexam Feb. 16, 2012.
95/001,566 Response after non-final action—owner—dated Feb. 16, 2012.
95/001,566 RX—Mail Petition Decision—Dismissed Mar. 2, 2012.
95/001,566 RX—Mail Petition Decision—Dismissed Apr. 24, 2012.
95/001,566 Receipt of Petition in a Reexam May 3, 2012.
95/001,566 Response after non-final action—owner—dated May 3, 2012.
95/001,566 Receipt of Petition in a Reexam Aug. 20, 2012.
95/001,566 Third Party Request Comments after Non-final Action dated Aug. 20, 2012.
95/001,566 RX—Mail Petition Decision—Granted Oct. 24, 2012.
95/001,566 RX—Mail Inter Partes Non-Final Office Action dated Mar. 28, 2013.
95/001,566 Response after non-final action—owner—dated May 24, 2013.
95/001,566 Affidavit(s), Declaration(s) and/or Exhibit(s) Filed May 24, 2013.
95/001,566 Information Disclosure Statement Filed Jun. 24, 2013.
95/001,566 Reexam—Affidavit(s), Declaration(s) and/or Exhibit(s) Filed by Third Party Requester Jun. 24, 2013.
95/001,566 Receipt of Petition in a Reexam Jun. 24, 2013.
95/001,566 Third Party Requester Comments after Non-Final Action dated Jun. 24, 2013.
95/001,566 Ready for Examiner Action after Nonfinal dated Jun. 24, 2013.
95/001,566 RX—Mail Notice of Defective Paper Sep. 18, 2013.
95/001,566 RX—Mail Petition Decision—Dismissed Sep. 23, 2013.
95/001,566 Third Party Request Comments after Non-final Action dated Oct. 3, 2013.
95/001,566 Information Disclosure Statement filed Oct. 3, 2013.
95/001,566 Information Disclosure Statement filed Nov. 22, 2013.
95/001,566 Information Disclosure Statement (IDS) Filed Nov. 27, 2013.
95/001,566 RX—Mail Petition Decision—Granted Feb. 20, 2014.
95/001,566 Information Disclosure Statement considered May 19, 2014.
95/001,566 RX—Mail Reexam—Action Closing Prosecution Jun. 9, 2014.
95/001,566 Patent Owner Comments after Action Closing Prosecution Jul. 8, 2014.
95/001,566 Third Party Requester Comments after Action Closing Prosecution Aug. 7, 2014.
95/001,566 Ready for Examiner Action after ACP Aug. 7, 2014.
95/001,566 Receipt of Petition in a Reexam Aug. 7, 2014.
95/001,566 RX—Mail Petition Decision—Granted Sep. 22, 2014.
95/001,566 RX—Mail Notification of Informal or Nonresponsive Amendment Dec. 10, 2014.
95/001,566 Patent Owner Comments after Action Closing Prosecution Jan. 12, 2015.
95/001,566 RX—Mail Inter Partes Non-Final Office Action dated Mar. 31, 2015.
95/001,566 Response after non-final action—owner—dated Jun. 1, 2015.
95/001,566 Informal response/amendment dated Jul. 22, 2015.
95/001,566 RX—Mail Petition Decision—Dismissed Jul. 24, 2015.
95/001,566 Response after non-final action—owner—dated Aug. 21, 2015.
95/001,566 Receipt of Petition in a Reexam Sep. 21, 2015.
95/001,566 Third Party Requester Comments after Non-Final Action dated Sep. 21, 2015.
95/001,566 RX—Mail Petition Decision—Granted Oct. 1, 2015.
95/001,566 RX—Mail Reexam—Action Closing Prosecution Jan. 20, 2016.
95/001,566 Certificate of Service Feb. 22, 2016.
95/001,566 Patent Owner Comments after Action Closing Prosecution Feb. 22, 2016.
95/001,566 Third Party Request Comments after Action Closing Prosecution Mar. 23, 2016.
95/001,566 Right of Appeal Notice May 19, 2016.
95/001,566 Notice of Appeal Filed Jun. 17, 2016.
95/001,566 Certificate of Service Jun. 21, 2016.
95/001,567 Receipt of Original Inter Partes Reexam Request Mar. 7, 2011.
95/001,567 Reexam—Information Disclosure Statement filed by Third Party Request Mar. 7, 2011.
95/001,567 Reexam Litigation Search Conducted Mar. 13, 2011.
95/001,567 Reexamination Formalities Notice Mailed Mar. 23, 2011.
95/001,567 Notice of reexamination request filing date Mar. 23, 2011.
95/001,567 notice of assignment of reexamination request Mar. 23, 2011.
95/001,567 Reexam—Non-Final Action dated Apr. 22, 2011.
95/001,567 Action Closing Prosecution (nonfinal) Aug. 22, 2011.
95/001,567 Right of Appeal Notice Oct. 26, 2011.
95/001,567 Notice of Appeal—Requester Nov. 23, 2011.
95/001,567 Receipt of Petition in a Reexam Feb. 21, 2012.
95/001,567 Notice of Non-Compliant Owner Respondents Brief Feb. 23, 2012.
95/001,567 Notice of Non-Compliance Mailed—Owner Respondents Brief Feb. 23, 2012.
95/001,567 Respondent Brief—Owner Mar. 5, 2012.
95/001,567 Receipt of Petition in a Reexam Mar. 6, 2012.
95/001,567 RX—Mail Petition Decision—Granted Mar. 16, 2012.
95/001,567 Receipt of Petition in a Reexam Mar. 30, 2012.
95/001,567 Receipt of Petition in a Reaxam Mar. 30, 2012.
95/001,567 Appeal Brief—Third Party Requester Apr. 16, 2012.
95/001,567 Respondent Brief—Owner May 16, 2012.
95/001,567 RX—Mail Petition Decision—Denied Jun. 20, 2012.
95/001,567 Receipt of Petition in a Reexam Jun. 25, 2012.
95/001,567 RX—Mail Petition Decision—Dismissed Jul. 26, 2012.
95/001,567 RX—Mail Petition Decision—Granted Aug. 2, 2012.
95/001,567 Receipt of Petition in a Reexam Sep. 10, 2012.
95/001,567 RX—Mail Petition Decision—Granted Oct. 10, 2012.
95/001,567 Receipt of Petition in a Reexam Oct. 24, 2012.
95/001,567 Respondent Brief—Owner Review by BPAI Complete Oct. 24, 2012.
95/001,567 RX—Mail Petition Decision—Granted Dec. 19, 2012.
95/001,567 RX—Mail Examiners Answer Mar. 7, 2013.
95/001,567 Oral Hearing Request—Third Party Requester Apr. 8, 2013.
95/001,567 Rebuttal Brief—Request Review by BPAI Complete Apr. 8, 2013.
95/001,567 RX—Mail Miscellaneous Communication to Applicant Apr. 29, 2013.
95/001,567 Docketing Notice Mailed to Appellant Jun. 20, 2013.
95/001,567 Notification of Appeal Hearing Nov. 7, 2013.
95/001,567 Oral Hearing Request—Owner Nov. 12, 2013.
95/001,567 Confirmation of Hearing by Applicant Nov. 14, 2013.
95/001,567 Confirmation of Hearing by Applicant Nov. 18, 2013.
95/001,567 Information Disclosure Statement Filed Nov. 23, 2013.
95/001,567 Information Disclosure Statement (IDS) Filed Nov. 27, 2013.

(56) References Cited

OTHER PUBLICATIONS

95/001,567 Board of Patent Appeals and Interferences Decision—Reversed Jan. 8, 2014.
95/001,567 BPAI Decision: New Grown of Rejection (R. 1.977(b)) Jan. 8, 2014.
95/001,567 Patent Owner Response after Board Decision with New Ground of Rejection R. 1.977(b)) Feb. 7, 2014.
95/001,567 Request Comments on Patent Owner Response after Board Decision Mar. 7, 2014.
95/001,567 Information Disclosure Statement Filed Mar. 7, 2014.
95/001,567 Mail—Order by BPAI Apr. 8, 2014.
95/001,567 Receipt of Petition in a Reexam May 2, 2014.
95/001,567 Reexam—Opposition filed in response to petition May 16, 2014.
95/001,567 RX—Mail Petition Decision—Denied Jul. 25, 2014.
95/001,567 Receipt of Petition in a Reexam Aug. 1, 2014.
95/001,567 Patent Owner Response after Board Decision with New Ground of Rejection R. 1.977(b) Aug. 1, 2014.
95/001,567 RX—Mail Petition Decision—Granted Sep. 3, 2014.
95/001,567 Request Comments on Patent Owner Response after Board Decision Sep. 17, 2014.
95/001,567 Information Disclosure Statement (IDS) Filed Sep. 17, 2014.
95/001,567 Receipt of Petition in a Reexam Sep. 17, 2014.
95/001,567 RX—Mail Petition Decision—Dismissed Oct. 2, 2014.
95/001,567 BPAI Decision Remand to Examiner (R. 1977(d)) Nov. 12, 2014.
95/001,567 RX—Mail Petition Decision—Dismissed Nov. 19, 2014.
95/001,567 RX—Mail Miscellaneous, Communications to Applicant Dec. 19, 2014.
95/001,567 RX—Mail Determination on Resp/Comments Aft BPAI Dec. w/New Ground of Ref. Jan. 16, 2015.
95/001,567 Owner Comments on Exmnr's Determination Aft BPAI Dec. w/New Ground of Rej. Feb. 17, 2015.
95/001,567 Request Comments on Exmnr's Determination Aft BPAI Dec w/New Ground of Rej. Mar. 13, 2015.
95/001,567 Docketing Notice Mailed to Appellant Aug. 21, 2015.
95/001,567 BPAI Decision—Examiner Affirmed Sep. 16, 2015.
95/001,567 Mail BPAI Decision on Appeal—Affirmed Sep. 16, 2015.
95/001,567 RX—Mail Notice of Intent to Issue Reexam Certificate Jan. 20, 2016.
95/001,567 Reexamination Certificate Issued Feb. 23, 2016.
95/001,568 3PR Request for Reexam submitted Mar. 7, 2011.
95/001,568 Notice of Assignment of Reexamination Request Mar. 17, 2011.
95/001,568 Notice of Reexamination request filing date Mar. 17, 2011.
95/001,568 Reexam—non-final action + determination dated May 19, 2011.
95/001,568 Information Disclosure Statement filed Jul. 14, 2011.
95/001,568 PO Response after non-final action dated Jul. 14, 2011.
95/001,568 3PR Information Disclosure Statement filed Aug. 12, 2011.
95/001,568 Notification of Defective Paper in a Reexam Oct. 13, 2011.
95/001,568 Decision on Petition Dismissed Oct. 27, 2011.
95/001,568 Decision on Petition Dismissed Nov. 4, 2011.
95/001,568 Notification of Defective Paper in a Reexam Nov. 4, 2011.
95/001,568 PO Response after non-final action dated Nov. 21, 2011.
95/001,568 Information Disclosure Statement filed Dec. 14, 2011.
95/001,568 Decision on Petition Dismissed Jan. 26, 2012.
95/001,568 Decision on Petition Denied Feb. 2, 2012.
95/001,568 Receipt of Petition in a Reexam Feb. 16, 2012.
95/001,568 Decision on Petition Dismissed Mar. 2, 2012.
95/001,568 Decision on Petition Dismissed Mar. 7, 2012.
95/001,568 Notice of Intent to Issue a Reexam Certificate Mar. 12, 2012.
95/001,568 Affidavit(s), Declaration(s) and/or Exhibit(s) Mar. 16, 2012.
95/001,568 Decision on Petition Dismissed Jun. 5, 2012.
95/001,568 PO Response after non-final action dated Jun. 6, 2012.
95/001,568 Decision on Petition Dismissed Nov. 26, 2012.
95/001,568 PO Complete Response to Non-Final Office Action + RTB declaration + petitions dated Dec. 14, 2012.
95/001,568 Accepted response only submitted Dec. 14, 2012.
95/001,568 Reexam—Opposition filed in response to petition Dec. 28, 2012.
95/001,568 Information Disclosure Statement filed Nov. 22, 2013.
95/001,568 Information Disclosure Statement filed Nov. 27, 2013.
95/001,568 Decision on Petition (PO petition to revive) issued Dec. 13, 2013.
95/001,568 Decision on Petition (PO page waiver) issued Dec. 13, 2013.
95/001,568 3PR Petition, IDS, Comments after non-final Office Action dated Jan. 13, 2014.
95/001,568 Decision on Petition (3PR page waiver) issued Mar. 20, 2014.
95/001,568 Non-Final Office Action dated May 29, 2014.
95/001,568 Response to Non-Final Office Action dated Jul. 29, 2014.
95/001,568 3PR Comments on PO Response dated Aug. 28, 2014.
95/001,568 Notification of Nonresponsive Amendment dated Sep. 23, 2014.
95/001,568 PO Response after non-final action dated Oct. 13, 2014.
95/001,568 Decision on Petition (3PR page Waiver) issued Dec. 1, 2014.
95/001,568 3PR's Abridge Comments submitted Dec. 30, 2014.
95/001,568 Action Closing Prosecution issued Feb. 26, 2015.
95/001,568 PO's Comments after ACP submitted Mar. 30, 2015.
95/001,568 3PR's Comments after ACP submitted Apr. 29, 2015.
95/001,568 Right of Appeal Notice issued May 27, 2015.
95/001,568 Notice of Appeal Patent Owner submitted Jun. 29, 2015.
95/001,568 Petition for Continued Reexamination Patent Owner submitted Jul. 27, 2015.
95/001,568 Opposition to Petition to Reopen Prosecution 3PR submitted Aug. 10, 2015.
95/001,568 Reexam Miscellaneous Incoming Letter Sep. 14, 2015.
95/001,568 Decision on Petition issued Feb. 2, 2016.
95/001,568 Notice of Intent to Issue Reexam Certificate dated Mar. 31, 2016.
95/001,568 Reexamination Certificate Issued Apr. 28, 2016.
95/002,393 Receipt of Original Inter Partes Reexam Request Sep. 15, 2012.
95/002,393 Reexamination requested by third party requester Sep. 15, 2012.
95/002,393 Notice of assignment of reexamination request.
95/002,393 Notice of reexamination request filing Oct. 18, 2012.
95/002,393 Reexamination Formalities Notice Mailed Oct. 19, 2012.
95/002,393 RX—Mail Inter Partes Reexam Order—Granted Dec. 7, 2012.
95/002,393 RX—Mail Inter Partes Non-Final Office Action dated Dec. 7, 2012.
95/002,393 Information Disclosure Statement (IDS) Filed Feb. 7, 2013.
95/002,393 Response after non-final action—owner—dated Feb. 7, 2013.
95/002,393 Receipt of Petition in a Reexam Feb. 7, 2013.
95/002,393 RX—Concurrent Proceedings Notice Feb. 7, 2013.
95/002,393 Information Disclosure Statement filed Feb. 7, 2013.
95/002,393 Receipt of Petition in a Reexam Mar. 11, 2013.
95/002,393 Third Party Request Comments after Non-Final Action dated Mar. 11, 2013.
95/002,393 Affidavit(s), Declaration(s) and/or Exhibit(s) filed Mar. 11, 2013.
95/002,393 Information Disclosure Statement filed Mar. 11, 2013.
95/002,393 RX—Mail Petition Decision—Granted Jul. 15, 2013.
95/002,393 RX—Mail Notice of Defective Paper Jan. 24, 2013.
95/002,393 RX—Mail Reexam—Action Closing Prosecution Aug. 29, 2013.

(56) References Cited

OTHER PUBLICATIONS

95/002,393 Receipt of Petition in a Reexam Sep. 12, 2013.
95/002,393 Information Disclosure Statement filed Sep. 12, 2013.
95/002,393 Information Disclosure Statement filed Sep. 27, 2013.
95/002,393 RX—Concurrent Proceedings Notice Sep. 27, 2013.
95/002,393 Information Disclosure Statement (IDS) Filed Sep. 27, 2013.
95/002,393 Receipt of Petition in a Reexam Sep. 27, 2013.
95/002,393 Receipt of Petition in a Reexam Oct. 28, 2013.
95/002,393 Information Disclosure Statement filed Nov. 22, 2013.
95/002,393 Information Disclosure Statement filed Nov. 27, 2013.
95/002,393 RX—Mail Petition Decision—Dismissed Dec. 18, 2013.
95/002,393 RX—Mail Petition Decision—Dismissed Mar. 19, 2014.
95/002,393 Receipt of Petiton in a Reexam Apr. 16, 2014.
95/002,393 RX—Mail Petition Decision—Granted May 20, 2014.
95/002,393 RX—Mail Reexam—Action Closing Prosecution Jun. 4, 2015.
95/002,393 Patent Owner Comments after Action Closing Prosecution Jul. 6, 2015.
95/002,393 Patent Owner Comments after Action Closing Prosecution Jul. 7, 2015.
95/002,393 Information Disclosure Statement Filed Aug. 5, 2015.
95/002,393 Third Party Request Comments after Action Closing Prosecution Aug. 5, 2015.
95/002,393 Reexam—Affidavit(s), Declaration(s) and/or Exhibit(s) Filed by Third Party Requester Aug. 5, 2015.
U.S. Appl. No. 09/316,328, filed May 21, 1999, Ramadan et al.
U.S. Appl. No. 10/940,259, filed Sep. 13, 2004, Kenyon.
U.S. Appl. No. 60/136,589, filed May 28, 1999, Tanskanen et al.
U.S. Appl. No. 60/194,761, filed Apr. 3, 2000, Herringshaw et al.
U.S. Appl. No. 60/205,942, filed May 18, 2000, Kaiman et al.
U.S. Appl. No. 60/212,125, filed Jun. 16, 2000, Fransdonk.
U.S. Appl. No. 60/230,667, filed Sep. 7, 2000, Anders et al.
U.S. Appl. No. 60/233,771, filed Sep. 19, 2000, Stennicke.
U.S. Appl. No. 60/241,776, filed Oct. 10, 2000, Doctor et al.
U.S. Appl. No. 60/243,561, filed Oct. 26, 2000, Ortiz et al.
U.S. Appl. No. 60/250,944, filed Dec. 1, 2000, Davies et al.
U.S. Appl. No. 60/250,947, filed Dec. 1, 2000, Davies et al.
ActiveSky System, 1999-2001, printed Apr. 12, 2006, 1 page.
Alderton, M., The Bluetooth question, Mobile Dev & Design, Jan. 1, 2001, 5 pages.
Almeida, J. M. et al., Analysis of Educational Media Server Workloads, Proceedings of the 11th International Workshop on Network and Operating Systems Support for Digital Audio and Video, Port Jefferson, NY, Jun. 25-26, 2001, 10 pages.
Alven, D. et al., Does it take a WISP to manage a wisp of hotspots—Analysis of the WLAN market from a WISP perspective, Master Thesis, Royal Institute of Technology, Stockholm, Feb. 2002, 117 pages.
Apostolopoulos, J. G. et al., Video streaming: Concepts, Algorithms, and Systems, Hewlett-Packard Company, Sep. 18, 2002, 25 pages.
Aramvith, S. et al., A Coding Scheme for Wireless Video Transport with Reduced Frame-Skipping, SPIE Proceedings of Visual Communications and Image Processing (2000) 4067, 9 pages.
Asbun, E. et al., Real-time Error Concealment in Compressed Digital Video Streams, Picture Coding Symposium, 1999, 4 pages.
Batra, P. et al., Effective algorithms for video transmission over wireless channels, Signal Processing: Image Communication (1998) 12(2):147-166 abstract.
Billinghurst, K., "Wireless Internet adds a new dimension," Contact Magazine (1999) No. 14, Ericsson, Exhibit 2 of Case No. 1:10-cv-00433-JB-KBM, 3 pages.
Bjork, S. et al., WEST: A Web Browser for Small Terminals, UIST (1999) Asheville, NC, CHI Letters 1(1):187-196.
Bradshaw, M. K. et al., Periodic Broadcast and Patching Services—Implementation, Measurement, and Analysis in an Internet Streaming Video Testbed, SIGMM (2001) Ottawa, Ontario, Canada, 14 pages.

Byers, J. W. et al., A Digital Fountain Approach to Reliable Distribution of Bulk Data, Proceedings of the ACM SIGCOMM Conference on Applications, technologies, architectures, and protocols for computer communication (1998) New York, NY, pp. 56-67.
Campbell, A. T., QoS-aware Middleware for Mobile Multimedia Communications, Multimedia Tools and Applications (1998) 7:67-82.
Celik, M., Digital Video Transmission over Wireless Channels, Apr. 30, 2000, 13 pages.
Chalmers, M. et al., Designing the augmented stadium, Department of Computing Sciences, University of Glasgow, 2006, 8 pages.
Chandra, S., Wireless Network Interface Energy Consumption: Implications for Popular Streaming Formats, Multimedia Systems (2003) 9(2):185-201.
Chang, S.-F. et al., Real-Time Content-Based Adaptive Streaming of Sports Video, IEEE Workshop on Content-Based Access of Image and Video Libraries (2001) Kauai, HI, pp. 139-146.
Chawathe, Y. D., Scattercast: An Architecture for Internet Broadcast Distribution as an Infrastructure Service, Dissertation, Doctor of Philosophy in Computer Science, University of California, Berkeley, Fall 2000, 161 pages.
Chen, S. et al., Distributed Quality-of-Service Routing in Ad Hoc Networks, IEEE Journal on Selected Areas in Communications (1999) 17(8):1488-1505.
Childers, L. et al., ActiveSpaces on the Grid: The Construction of Advanced Visualization and Interaction Environments, Simulation and Visualiation on the Grid, vol. 13 of the series Lecture Notes in Computational Sciences and Engineering (2000) Springer-Verlag, Berlin, pp. 64-80.
Chow, R. K.Y. et al., Scalable Video Delivery to Unicast Handheld-based Clients, IEEE International Conference on Networks Sep. 5-8, 2000, pp. 93-98.
Cisco, Transforming Sports and Entertainment: In the Stadium and Beyond, Cisco Public Information, 6 pages.
De, P. et al., WiVision: A Wireless Video System for Real-Time Distribution and On-Demand Playback, First IEEE Consumer Communication and Networking Conference (2004) Las Vegas, NV, Jan. 5-8, pp. 575-580.
Declaration (With Exhibits A-D) Under 1.132 by Luis Ortiz & Kermit Lopez.
Derose, J. F., The Wireless Data Handbook, Fourth Edition, John Wiley & Sons, Inc., New York, 1999, 395 pages.
Dunkels, A., Minimal TCP/IP implementation with proxy support, SICS Technical Report, T2001:20 Feb. 2001, 81 pages.
Easton, J., Going Wireless: Revolutionize Your Business with Mobile Technology, HarperInformation (2002) abstract.
Elsen, I. et al., Streaming Technology in 3G Mobile Communication Systems, Computer Sep. 2001, pp. 46-52.
Engman, A., High Performance Video Streaming on Low End Systems, M. Sc. Thesis in Electrical Engineering, Telia Research AB, Nattjanster Division, Stockholm, Dec. 1999, 47 pages.
New Ericsson demo facility lets visitors test drive 3G wireless internet, Ericsson Press Release, Jul. 20, 1999, 1 page.
Ericsson Press Release, Creating new possibilities for mobile multimedia broadcasting, Oct. 11, 1999, 3 pages.
Ericsson Stages Live Global ECDMA Multi-party Link-up, Business Wire, Feb. 24, 2000, 2 pages.
Erlandson, C. et al., WAP—The wireless application protocol, Ericsson Review (1998) 4:150-153.
E-Stadium Fans have the game in the palms of their hands, Sep. 30, 2005, 1 page.
FCC 00-289, Annual Report and Analysis of Competitive Market Conditions with Respect to Commercial Mobile Services, Fifth Report, Aug. 3, 2000, 183 pages.
Fitzek, F. H. P. et al., A Prefetching Protocol for Continuous Media Streaming in Wireless Environments, IEEE Journal on Selected Areas in Communications (2001) 19(10):2015-2028.
Forman, G. H., et al., The Challenges of Mobile Computing, Computer (1994) 27(4):38-47.
Frankhauser, G. et al., The WaveVideo System and Network Architecture: Design and Implementation, TIK Technical Report No. 44 Jun. 1998, 28 pages.

(56) References Cited

OTHER PUBLICATIONS

Frodigh, M. et al., Future-Generation Wireless Networks, IEEE Personal Communications Oct. 2001, pp. 10-17.
George, T., "PDAs Bring Sports Fans Closer to Athletes," InformationWeek Dec. 14, 2001, http://www.informationweek.com/pdas-bring-sports-fans-closer-to-athlete/6508218, Exhibit 4 of Case No. 1:10-cv-00433-JB-KBM, 2 pages.
Girod, B. et al., Scalable Video Coding with Multiscale Motion Compensation and Unequal Error Protection, Multimedia Communications and Video Coding Part III (1996) Springer US, New York, pp. 475-482.
Girod, B. et al., Feedback-Based Error Control for Mobile Video Transmission, Proceedings of the IEEE (1999) 87(10):1707-1723.
Girod, B. et al., Chapter 12: Wireless Video, Compress Video Over Networks, Sun, M.-T. et al. (eds.), Nov. 14, 1999, 38 pages.
Glenn, R. et al., Wireless Information Technology for the 21st Century, Information Technology Laboratory, National Institute of Standards and Technology, Feb. 17, 1999, 64 pages.
Goodman, D. J., The Wireless Internet: Promises and Challenges, Computer Jul. 2000, pp. 36-41.
Griffioen, J. et al., Experience Developing Wireless Networks for Interactive Multimedia Instructions, 28th Annual Frontiers in Education Conference (1998) Tempe, AZ, Nov. 4-7, ppl 1005-1010 vol. 3.
Gunnarsson, M., Enabling Multi-Access Services with the Always Best Connected Concept, Ericsson Oct. 2003, 17 pages.
Gupta, P. et al., The Capacity of Wireless Networks, IEEE Transactions on Information Theory (2000) 46(2):388-404.
Hayden, T., Vivid Sky Launches SkyBOX for Major League Sports Fans at Demofall Feb. 8, 2006, 1 page.
Heinzelman, W. B., Application-Specific Protocol Architectures for Wireless Networks, Doctor of Philosophy, Massachusetts Institute of Technology, Jun. 2000, 154 pages.
Control No. 95/002,393 Action Closing Prosecution dated Jun. 4, 2015, pp. 56 and 60.
Dierks, T. et al., "The TLS Protocol Version 1.0," Network Working Group (1999) The Internet Society, 160 pages.
Dittmann, J. et al. (eds.), "Multimedia and Security " Workshop at ACM Multimedia '98, Sep. 12-13, Bristol, U.K., 137 pages.
Mooij, W., "Advances in Conditional Access Technology," International Broadcasting Convention Sep. 12-16, 1997, Conference Publication No. 447, pp. 461-464.
Wang, H. J., "Policy-Enabled Handoffs Across Heterogeneous Wireless Networks," Second IEEE Workshop on Mobile Computing Systems and Applications Proceedings (1999) 30 pages.
Microsoft Computer Dictionary, Fifth Edition, p. 232 and 304, Microsoft Press, Redmond, WA, 2002.
U.S. Appl. No. 95/001,565, filed Mar. 4, 2011, Ortiz et al.
U.S. Appl. No. 95/001,566, filed Mar. 4, 2011, Ortiz et al.
U.S. Appl. No. 95/001,567, filed Mar. 7, 2011, Ortiz et al.
U.S. Appl. No. 95/001,568, filed Mar. 7, 2011, Ortiz et al.
U.S. Appl. No. 95/002,393, filed Sep. 15, 2012, Ortiz et al.
U.S. Appl. No. 60/191,003, filed Mar. 21, 2000, Rittmaster et al.
"3Com: Don't Get Up, Sports Fans," USA Today, Tech Report, Aug. 22, 2000, pp. 1-2.
10th Anniversary of Instant Replay, http://www.ihavenet.com/NFL/NFL-2009-10th-Anniversary-Instant-Replay.html, United States.
http://wiki.answer.com/O/How_many_plays_are_in_an_average_NFL_football_game, Answer.com, United States.
http://mlb.mlb.com/mlb/subscriptions/index.isp?product=mlbtv (Accessed Apr. 2, 2011).
http://mlb.mlb.com/content/printer_friendly_mlb/y2011/m02/d10/c16607938.isp (Accessed Apr. 2, 2011).
http://www.sportsbusinessdaily.com/Journal/Issues/2009/07/20090713/This-Weeks-News/Streaming-Worth-$40M-to-Baseball.aspx?hl=mlb.ty%20subscribers&sc=0 (Accessed May 19, 2011).
http://www.sportsbusinessdaily.com/Journal/Issues/2007/02/20070219/SBJ-In-Depth/The-Rise-of-Online-Video.aspx?hl=mlb.tv%20subscriber&sc=0 (Accessed May 19, 2011) 2006.
http://web.archive.org/web/20070406201604/http://mlb.mlb.com/mlb/subscriptions.mlbtv.isp?c_id=mlb (Accesssed Apr. 2, 2011), 2006-2007.
http://www.sportsbusinessdaily.com/Journal/Issues/2008/03/20080324/This-Weekly-News/MLBAM-To-Roll-Out-Enhanced-Content.aspx (Accessed Apr. 2, 2011), 2007.
http://www.businessinsider.com/2009/2/spring-training-for-hi-def-mlbcom (Accessed Apr. 2, 2011), 2008.
http://web.archive.org/web/20080213232003/mlb_mlb.com/mlb/subscriptions/indez/isp?c_id=mlb (Accessed Apr. 2, 2011), 2008.
http://www.sportsbusinessdaily.com/Journal/Issues/2009/11/20091109/This-Weeks-News/Yankees-Streaming-Sells-6000-Subs.aspx (Accessed Apr. 2, 2011), 2009.
http://newyork.yankees.mlb.com/news/article.isp?vmd=20090203&contect_id=3793684&vkey-news_mlb&fexl=isp&c_id=mlb (Accessed Apr. 2, 2011), 2009.
http://www.sportsbusinessdaily.com/Journal/Issues/2011/03/21/Media/MLBAM.aspx (Accessed Apr. 2, 2011), 2010.
http://replay.waybackmachine.org/20100319010030/http://mlb.mlb.com/mlb/subsriptions/index.jsp?product=mlbtv&affiliateId=mlbMENUMLBTV (Accessed Apr. 2, 2011), 2010.
http://mlb.mlb.com/mobile/albat/index.isp?c_id=mlb (Accessed Apr. 2, 2011).
http://news.cnet.com/8301-13579_3-9960064-37.html (Accessed Apr. 2, 2011).
http://mlb.mlb.com/news/press_releases/press_release.isp?vmd=20090610&contect_id=5249086&vkey=pr_mlbcom&fext=isp&c_id=mlb (Accessed Apr. 2, 2011).
http://mlb.mlb.com/news/article.isp?c_id=mlb&content_id=7983018&text=iso&vmd=20100127&tvkey=news_mlb (Accessed Apr. 2, 2011).
http://mlb.mlb.com/news/press_releases/press_release.isp?vmd=20100915&contect_id=147045228vkey=pr_mlbcom&fext-isp&c_id=mlb (Accessed Apr. 2, 2011).
http://mlb.mlb.com/news/article.isp?c_id=mlb&content_id=7983018&fext=isp&vmd=20100127&vkey=news_mlb (Accessed Apr. 2, 2011).
http://mlb.mlb.com/news/press_releases/press_release.isp?vmd=20110225&content_id=16735680&vkey=pr_mlbcom&fext=isp&c_id=mlb (Accessed Apr. 2, 2011).
http://itunes.apple.com/us/app/mlb-com/at-bat-11/id420031160?mt=8 (Accessed Apr. 2, 2011).
http://www.apple.com/or/library/2011/01/22appstore.html (Accessed May 19, 2011).
http://www.mobilemarketingandtechnology.com/2010/toppost/most-developer-will-not-make-money-on-apps/ (Accessed May 19, 2011).
http://www.signiant.com/signiant-news-and-press-releases/bid/28516/Sports-Streaming-s-Big-Play (Accessed Apr. 2, 2011), 2009.
http://www.nba.com/leaguepass/3pp/index.html (Accessed Apr. 2, 2011).
http://www.nba.com/leaguepass/broadband/index.html (Accessed Apr. 2, 2011).
http://www.nba.com/leaguepass/mobile/index.html (Accessed Apr. 2, 2011).
http://www.itvt.com/story/6258/nba-digital-trumpets-its-cross-platfom-success (Accessed Apr. 2, 2011).
http://www.beet.tv/2010/02/nba-digital-breaks-record-with-17-million-views-of-nba-allstar-game.html (Accessed Apr. 2, 2011).
http://news.turner.com/article_display.cfm?article_id=5089 (Accessed Apr. 2, 2011).
http://news.turner.com/article_display.cfm?article+id=5213 (Accessed Apr. 2, 2011).
http://gigaom.com/video/multiplatform-video-pays-off-for-the-nba (Accessed Apr. 2, 2011).
http://news.turner.com/article_display.cfm?article_id=5664 (Accessed Apr. 2, 2011).
http://mlb.mlb.com/mobile/atbat/index.jsp?c_id=mlb (Accessed Apr. 2, 2011).
http://www.nytimes.com/2011/05/03/business/media/03television.html?r=1&pagewanted=print (Accessed May 19, 2011).
http://www.rcrwireless.com/article/20110513/DAS/110519968arizona-diamondbacks-take-a-swing-at-wi-fi-portal-for-fans (Accessed May 10, 2011).

(56) References Cited

OTHER PUBLICATIONS http://sportsvideo.org.main/blog/2011/05/13/nba-digital%e2%80%99s-perez-on-cord-cutting-adapt-or-%e2%80%98risk-losing-an-entire-generation-of-fans%e2%80%99/print/ (Accessed May 19, 2011).
http://videonuze.com/blogs/?2010-07-13/Sports-Continues-to-be-Shining-Star-of-Online-Video/&id=2633 (Accessed Apr. 2, 2011).
http://www.sportsbusinessdaily.com/Journal/Issues/2010/02/20100222/SBJ-In-Depth/Whats-The-Right-Call-On-Wireless.aspx (Accessed Apr. 2, 2011).
http://www.nba.com/leaguepass/broadband/index.html (Accessed Mar. 28, 2011).
http://mlb.mlb.com/mlb/subscriptons/index.isp?product=mlbtv (Accessed Apr. 2, 2011).
http://mlb.mlb.com/news/article.isp?vmd=20100930&contect_id=15258494&vkey=news_mlb&c_id=mlb (Accessed May 11, 2011).
http://mlb.mlb.com/news/article/isp?vmd=20091006&content_id=7364784&vkey=news+mlb&fext=jsp&c_id=mlb (Accessed May 11, 2011).
http://www.youtube.com/watch?v=g3_8Z6Aotp8 (Tony Verna Trubute).
http://www.youtube.com/watch?v=TuFky-Zir5s&feature-related (First Instant Replay).
Aboba, B. et al., "Introduction to Accounting Management," Network Working Group, Oct. 2000, 109 pages.
Adamson, W. A., et al., "Secure Distributed Virtual Conferencing: Multicast or Bust," *CITI Technical Report 99-1*, Center for Information Technology Integrated, University of Michigan, Ann Arbor, Jan. 25, 1999, pp. 1-7.
"Advisory/Be Here Corporation Gives Consumers Up Close View of the Summer X-Gmaes with 360-Degree Internet Coverage," Business Wire, Aug. 17, 2000, 3 pages.
Alm, R., "New Arena a Technical Marvel," *The Dallas Morning News*, Oct. 15, 2000, pp. 1-6.
Austin, News Watch; Samsung Puts a Colorful Twist on Its Handheld-Phone Hybrid, http://www.nytimes.com/2001/04/19/technology/news-watch-samsung-puts-a-colorful-twist-on-its-handheld-phone-hybrid.html, Apr. 19, 2011.
Bad Call Costs Steelers' Fans $32 Million http://www.deadspin.com/#15090503/bad-cell-costs-steelers-fans-32-million/, United States.
Baldocchi, Palo Alto Patch, AT&T Gives Stanford Stadium Wi-Fi Stanford becomes the first campus to offer Wi-Fi access in all of its sporting venues, http://paloalto.patch.com/articles/att-gives-stanford-stadium-wifi-access, May 20, 2011.
Barbero, M. et al., "A Bit-Rate Reduction System for HDTV Transmission," IEEE Transactions on Circuits and Systems for Video Technology (1991) 1(1):4-13.
"Bassett", Response to Office Action dated Sep. 17, 2002 (15 pages).
Battista, et al., "MPEG-4: A Multimedia Standard for the Third Millennium, Part 1," 1070-986X/99, *IEEE* (1999) pp. 74-83.
Begun, Newsweek, Baseball Good Eye, http://www.immersionwireless.com/newsweek.pdf Apr. 8, 2002.
Bergstein, B., "Click Me Out to the Ballgame, Web-Wired Stadiums Aim to Spur Evolution of Spectator Sports," *Las Vegas Review Journal*, Online Edition, Oct. 20, 2000, pp. 1-4.
Bergstein, B., "Having Ball with Technology, High-Tech Firms Teaming up with Pro Sports Venues," www.abcnews.com, Spe. 27, 2000, pp. 1-2.
Biderman, 11 Minutes of Action, Wall Street Journal Online at http://online-wsi.com/article/SB10001424052748704281204500285205586l406.html, United States.
Blum, Huffington Post, Baseball Instant Reply to Begin Thursday, http://www.huffingtonpost.com/2008/08/25/baseball-instant; Aug. 26, 2008.
Boyter, S., "Product likely to he home run with sports fans," *DFW TechBiz*, Aug. 21, 2000, pp. 1-3.
Boyter, S., Dallas-Fort Worth Tech Biz, Front Row Takes a Look at the Old ball Game, Jul. 16, 2001, United States.
Braff, MLB Network Covers All MLB Clubs, 1,800 Clubs for '30 Clubs in 30 Days', http://sportsvideo.org/main/blog/2011/03/21/mlb-network-covers-all-mlb-clubs-1800-miles-for-%e2%80%9830-clubs-in-30-days%e2%80%99/, Mar. 21, 2011.
Braves Join the Insider Team, http://www.immersionwireless.com/allbusinesschronicle.pdf, created Aug. 23, 2005.
Broadcasting, Wikipedia, http://en.wikipedia.org/wiki/Broadcasting#cite_note-0 (Accessed May 25, 2011).
Capin, et al., "Efficient Modeling of Virtual Humans in MPEG-4," 0-7803-6536-4/00, *IEEE* (2000), pp. 1-4.
Carnoy, D., "LG TP3000," *CNET Wireless*, Aug. 17, 2000, pp. 1-2.
Carroll, K. "Fans take to ChoiceSeats: Interactive technology, e-commerce expand to sporting events," *Telephony Online*, Jan. 10, 2000, 2 pgs.
Chen, MP3 Player s in the Year 2000 Were Not So Good (But We Still Loved Them) http://gizmodo.com/5437243/mp3-players-in-the-year-2000-we-not-so-good-but-were-still-loved-them, (Dec. 30, 2009).
Cherriman, P. et al., "Orthogonal Frequency-Division Multiplex Transmission of H.263 Encoded Video over Highly Frequency-Selective Wireless Networks," IEEE Transactions on Circuits and Systems for Video Technology (1999) 9(5):701-712.
"ChoiceSeat, Live Interactive Event Entertainment," www.choiceseat.com, Oct. 15, 2000 pp. 1-5.
"ChoiceSeat The Interactive Evolution of Sports," Sponsorship Opportunities, n.d. (2 pages).
CNET, Shakeware, http://download.cnet.com/MP3-Player-2000/3000-2133_4-10040702.htm (Feb. 28, 2000).
CNET, "Cell phone video start up files for IPO" http://news.cnet.com/Cell-phone-video-start-up-files-for-IPO/2100-1033_3-238076.html (Mar. 16, 2000).
"Contactless Applications for PDAs"; Inside Technologies, Cartes 2000, Aug. 2000, pp. 1-14.
IDS initialed by Examiner acknowledged Dec. 5, 2011.
Crouch, PCWorld, Cyber Super Bowl Hast Its Limits, Web sites and wireless services bring football to your PC or PDA, but TV has a lock on the field, http://www.opcworld.com/article/38905/cyber_super_bowl_has_its_limits.html, Jan. 18, 2001.
Crucial, The Memory Experts, No Memory Upgrades are Available for your IBM Workpad (8602) Laptop/Notebook http://www.crucial.com/upgrade/compatible-memory-for-IBM/Workpad+(8602)/list.html, (2011).
CyperioaPC.com, Classic Computer Systems, http://www.cyberiapc.com/classicsys/workpad.htm.
Dachman, J., Sports Video Group, NBA Digital's Perez on Cord Cutting: Adapt or 'Risk Losing a Generation of Fans', Published May 13, 2011, http://sportsvideo.org/main/blog/2011/05/13/nba-digital%E2%80%99s-perez-on-cord-cutting-adapt-or-%E2%2%80%98risk-losing-an-entire-generation-of-fans%2E%80%99/.
Evanyk, FCC, Reply to the American Power Association in the matter of Carrier Current Systems including Broadband over Power Line Systems (Jun. 21, 2004).
"Fiber Optic Video/Audio/Intercom/Data System," Telecast Fiber Systems, Inc., pp. 1-4.
Front Row Technologies, LLC's Preliminary Supplemental Infringement Contentions and Document Disclosures, p. 3.
Front Row Technologies, LLC's Infringement Contentions, Exhibit B, p. 3, 8.
Gordon, K., "Interactive Broadband Video at the Garden," *Digital Video Magazine* Apr. 2000, 11 pages.
Greenman, New York Times, What's Next; Next Step for Cell Phones: Adding Pictures to the Conversation, http://select.nytimes.com/gst/abstract.html?res=F40E17FD34580C768EDDA80894D9404482, Jan. 25, 2001.
Gussow, D., "Sittin' in the captain's chair," *St. Petersburg Times* Mar. 30, 1998, 4 pages.
Hibbert, L., "Decision you can't argue with," *Professional Engineering* Jul. 7, 1999, 12(13):26-27.
Higgins, Region Focus, Virtual Vroom! http://www.immersionwireless.com/regionfocus.pdf, created Aug. 23, 2005.
Horn, B., Sports in America: Instant Replay's Success Wasn't Immediate for Vema, The Dallas Morning News, Sunday, Jan. 25, 2998, United States.

(56) References Cited

OTHER PUBLICATIONS

Jason, Yankee Stadium Will Continue to be Safe from iPads and Kindles, http://itsaboutthemoney.net/archives/2011/03/28/yankee-stadium-will-continue-to-be-safe-from-ipads-and-kindles, Mar. 28, 2011.
IEEE Computer Society, "IEEE Standard Glossary of Computer Networking Terminology," Jun. 30, 1995 (7pages).
"IEEE 802.11b Wireless LANs," 3COM Technical Paper, Apr. 25, 2000, pp. 1-3, pp. 1-13.
IEEE Computer Society, IEEE Std 802.11a-1999(R2003), "Part 11: Wireless LAN Medium Access Control (MAC) and Physical Layer (PHY) specifications. High-speed Physical Layer in the 5 GHz Band." 1999 (91 pages).
IEEE Computer Society, IEEE Std 802.11b-1999(R2003), "Part 11: Wireless LAN Medium Access Control (MAC) and Physical Layer (PHY) specifications: Higher-speed Physical Layer Extension in the 2.4 GHz band." 2000 (96 pages).
International Telecommunication Union, "Data Networks and Open System Communications Open Systems Interconnection—Model and Notation ITU-T Recommendation X.200," Jul. 1994 (63 pages).
Jayburd, The Huffington Post Social News, Comment on Baseball Instant Reply to Begin Thursday, http://huffingtonpost.com/social/jayburd/baseball-instant-replay-t_n_121672_15020851.html.
Johnson, The Guardian.co.uk, Ten Years of Technology 2000, http://www.guardian.co.uk/technology/blog/2009/dec/11/technology-decade-2000?intmp=239, Dec. 11, 2009, San Francisco, California, USA.
Kieskowski, StreamingMedia.com, Content Prophets: Floating Balloons for Wireless Content, http://www.streamingmedia.com/Articles/ReadArticle.aspx?ArticleID=64198&PageNum=2, Jun. 6, 2001.
Lauterbach, T., et al., "Multimedia Environment for Mobiles (MEMO)—Interactive Multimedia Services to Portable and Mobile Terminals," Robert Bosch Multimedia-Systems GmbH & Co., KG., Hildesheim, Germany, 1997, pp. 1-6.
LCDs for Less, http://www.lcds4less.com/models/IBM/WorkPad/IBM-WorkPad-laptop-screens.html, IBM Workpad Laptop Screens.
Lewiston Morning Tribute, Apr. 30, 2002 http://news.google.com/newspapers?id=cgF1AAIBAJ&slid=EDIMAAIBAJ&pg=3406.4067799.
Marriott, M., "Video Technology to Make the Head Spin," The New York Times, Mar. 2, 2000, 2 pages.
MemoryStock.com, http://www.memorystock.com/ram/IBMWorkPadz50RAM.html, RAM upgrade for IBM Workpad z50 Laptops (50 a maximum of 48Mb RAM).
"Microsoft Windows Embedded, CE Product Information," Microsoft.com, Feb. 6, 2001 (3 pages).
MLB Press Release, http://mlb.mlb.com.news/article.isp?vmd=20101212&content_id=16309080&c_id=mlb, Dec. 12, 2010.
MLB Press Release, MLB to launch limited instant replay of Thursday, Aug. 28, http://mlb.mlb.com/content/printer_friendly/mlb/v2008/m08/, Aug. 26, 2008.
Mowery, J., "What's the Difference Between 60Hz and 120Hz?" http://www.ledtv.org/content/whats-difference-between-60hz-and-120hz, (Nov. 17, 2010).
NFL, http://www.nfl.com/kickoff/sotry/09000d5d801e3eb1/article/new-rules-for-2007/, United States.
Nguyen, The Stanford Daily, Athletics Venues to Feature Wi-Fi, http://www.standforddaily.com/2011/05/23/athletics-venues-to-feature-wi-fi/, May 23, 2011.
Norris, The Guardian.co.uk, Mobile Matters, http://www.guardian.co.uk/technology/2002/dec/12/mobilephones.onlinesupplement/print, Dec. 12, 2002, UK.
Norris, The Guardian.co.uk, Phone firms face 3G Headache, http://www.guardian.co.uk/technology/2004/feb/28/mobilephones/ashleynorris/print, Feb. 28, 2004, UK.
Norris, The Guardian.co.uk, Mobile Phones Steal the Show, http://www.guardian.co.uk/technology/2004/mar/23/mobilephones.onlinesupplement/print, Mar. 22, 2004, UK.
Office Actions dated Feb. 3, 2009, Aug. 19, 2009, Apr. 13, 2010, and Feb. 14, 2011 in U.S. Appl. No. 10/015,458 (141 pages).
Ogunnaike, Concertgoers Multitasking to Stravinsky, New York Times, Published May 29, 2004.
Ortiz U.S. Pat. No. 7,149,549 raises SNQ as to Requester U.S. Pat. No. 7,929,954 in U.S. Appl. No. 90/012,391, Decision Granting Ex Parte Reexamination dated Aug. 27, 2012.
Ortiz U.S. Pat. No. 7,149,549 and U.S. Pat. No. 7,796,162 raise SNQ as to Requester U.S. Pat. No. 7,486,943 in U.S. Appl. No. 90/009,979, Decision Granting Ex Parte Reexamination Feb. 10, 2012, Certificate issued Oct. 22, 2012.
"Peanuts, popcorn and a PC at the old ballpark," www.king5.com, Sep. 28, 2000, pp. 1-4.
Phoenix: Baseball & Wireless—Arizona Diamondbacks' WiFi Web Portal, RCR Wireless News, http://www.youtube.com/watch?v=TRMWarCA0c, May 11, 2011.
Requester's Memorandum in Support of Their Motion to Consolidate and/or Dtay, Case 1:12-cv-01309-WJ-ACT Document 58 p. 13 of 19 Filed Jan. 17, 2013.
Response in Opposition to Petition for Writ of Mandamus, Case: 13-144 Document: 11-1 p. 22 Filed: Jan. 23, 2013.
Results of Search in AppFT Database for U.S. Patents Referencing Bassett: "REF/7010492: 15 patents," Search performed May 25, 2011.
Results of Search in AppFT Database for: "data processing system" and "notebook computer" and "yee" and "PDA": 970 applications.
ReExam Control No. 90/012,489, Order Granting ReExamination of U.S. Pat. No. 8,045,965, dated Nov. 23, 2012.
Richer et al., ATSC Digital Television System, Proceedings of the IEEE, vol. 94, No. 1, Jan. 2006, United States.
Rigney, C. et al. "remote Authentication Dial in User Service (RADIUS)" Network Working Group, Apr. 1997, 66 pages.
Rogier's Police Page, Sting, Brand New Day Tour (1999), http://www.dordt.nl/~gugten/tour-s06.htm; © Rogier van der Gugten, Utrecht, 2002.
Ruel, VYVX, Doctor Design, and Erbes Dev Group Go to the Ball Game: Watch PC-TV, Internet TV, at the Stadium http://ruel.net/top/box.article.05.htm (Sep. 1, 1997).
Rysavy Research, "Strategic Use of Wi-Fi in Mobile Broadband Networks," Oct. 14, 2010 (13 pages).
Rysavy, The Spectrum Imperative: Mobile Broadband Spectrum and its Impacts for U.S. Consumers and the Economy an Engineering Analysis, Rysavy Research, Mar. 16, 2011, United States.
Rysavy, Mobile Broadband Capacity Constraints and the Need for Optimization, Rysavy Research, Feb. 16, 2010, United States.
Rysavy, Transition to 4G, Rysavy Research, Sep. 1, 2010, United States.
Rysavy, Net Neutrality Regulatory Proposals: Operational and Engineering Implications for Wireless Networks and the Consumers They Serve, Rysavy Research, Jan. 14, 2010, United States.
Sachdev. "Rooftop owners seek to extend deal with Cubs by 9 years," Chicago Tribune, Jan. 30, 2013, http://articles.chicagotribune.com/2013-01-30/business/chi-wrigley-field-rooftop-owners-20130130_1_rooftop-owners-rooftop-business-cubs-place-signs.
Salzberg, K. et al., "Intel's Immersive Sports Vision," Intel Corporation, Mar. 30, 2001.
Sanborn, S., "Armchair Quarterbacks go Wireless at 3Com Park," *InfoWorld*, Sep. 29, 2000, pp. 1-2.
"Scanz Communications Forms Joint Venture with Screenco Pty Ltd," Business Wire, Oct. 25, 2000 (1 page).
"Scanz Communications and Star Bridge Systems Announce Strategic Alliance," Business Wire, Oct. 21, 1999 (2 pages).
Scanz Communications, Press Excerpts, http://wwwdesignadvocate.net/scanz/news.htm.
Schatz, Wall Street Journal, Cell Phone Data-Roaming Rules Get FCC Green Light, Apr. 8, 2011.
Schmuckler, E., "Best Seat in the House?" *Brandweek* Oct. 16, 2000, 41(40):48, 5 pages.
Screenshot of www.scanz.com as of Jun. 2, 2000 (2 pages).
Screenshot of www.scanz.com/Consumer_Product.htm as of Jun. 2, 2000 (2 pages).
"Seeing is Believing—Motorola and Packetvideo Demonstrate MPEG-4 Video over GPRS," Press Release, Packetvideo, May 10, 2000, pp. 1-3.
"SGI at the Pepsi Center"; Silicon Graphics, Inc.; Jul. 2000, pp. 1-2.

(56) References Cited

OTHER PUBLICATIONS

SlapChop, http://slapchopp.wordpress.com/2009/12/30/gizmodos-look-back-at-mp3-players-of-2000-interesting-read/.
SkyTel.net, 2Way Messaging, http://skytel.net/Wireless_paging_2way.html.
Smartphone, Wikipedia http://en.wikipedia.org/wiki/Smartphone (accessed Feb. 6, 2013).
Sports Business Journal, Boom! TV advances could disappear, http://webcache.googleusercontent.com/search?q=cache:NHuDZgirODUJ:www.sportsbusinessdaily.com/Journal/Issues/2002/04/20050408/Spcial-Report.aspx+%22Barry+Goldberg%22+and+choiceseat&cd=26&hl=en&ct=clnk&gl=us&source=www.google.com, Apr. 8-149, 2002.
Tamm, G., "100,000 following sailing on the net," Contact (2000) No. 3, Mar. 2, Ericsson, Exhibit 3 of Case No. 1:10-cv-00433-JB-KBM, 3 pages.
Tamm, G., "Mobile Internet takes you to the ice," Contact (2000) No. 8, May 18, Ericsson, Exhibit 1 of Case No. 1:10-cv-00433-JB-KBM, 3 pages.
Taylor, H. et al., "The Magic Video-on-Demand Server and Real-Time Simulation System," IEEE Parallel & Distributed Technology (1995) Summer, pp. 40-51.
Technical Specifications, IBM WorkPad 10u, retrieved from http://pdadb.net/index_php?m=specs&id=1135&view=1&c=ibm_workpad on Aug. 10, 2011 (2 pages).
Technical Specifications, IBM WorkPad 20X, retrieved from http://pdadb.net/index.php?m=specs&id=1136&view=1&c=ibm on Aug. 10, 2011 (3 pages).
Technical Specifications, IBM WorkPad 22X, retrieved from http://pdadb.net/index.php?m=specs&oid=1138&view=1&c=ibm on Aug. 10, 2011 (2 pages).
Technical Specifications, IBM WorkPad 30x, retrieved from http://pdadb.net/index_php?m=specs&id=1144&view=1&c=ibm on Aug. 10, 2011 (2 pages).
Technical Specifications, IBM WorkPad 40u, retrieved from http://pdadb.net/index_php?m=specs&id=1145&view=1&c=ibm on Aug. 10, 2011 (2 pages).
Technical Specifications, IBM WorkPad c3, retrieved from http://pdadb.net/index_php?m=specs&id=1152&view=1&c=ibm on Aug. 10, 2011 (2 pages).
Technical Specifications, IBM WorkPad c500, retrieved from http://pdadb.net/index.php?m=specs&id=1164&view=1&c=ibm on Aug. 10, 2011 (2 pages).
Technical Specifications, IBM Workpad c505, retrieved from http://pdadb.net/index_php?m=specs&id=1165&view=1&c=ibm on Aug. 10, 2011 (2 pages).
Technical Specifications, IBM WorkPad z50, retrieved from http://pdadb.net/index_php?m=specs&id=163&view=1&c=ibm on Aug. 10, 2011 (2 pages).
Tiley, HPC Factor, IBM Workpad z50, http://www.hpcfactor.com/reviews/hardware/ibm/workpad-z50/ (2005).
Traffic411.com Joins Packet Video in Wireless Multimedia Trials http://www.traffic411.com/pressbody.html#06-13-00 (Jun. 13, 2004).
Trask, N. T. et al., "Smart Cards in Electronic Commerce," *BT Technol J.*, (1999) 17(3):57-66, July.
Umstead, Thomas, NBA's Digital Drive, Multichannel News, Jan. 21, 2008.
Unstrung: The Birth of the Wireless Internet, CIBC World Markets, Equity Research, Oct. 4, 2000, pp. 1-140.
Video Nuze, MLB: Mobile Use of Our Content Will Exceed Online Within 12-18 Months (Jun. 21, 2011).
"Viewers Take Control," Entrepreneur, Video Age International, Apr. 2000, 1 page.
Walters, J., "Instant Gratification," Sports Illustrated Asia (1999) http://sportsillustrated.asia/vault/article/magazine/MAG1017633/index.htm, Nov. 15.
Williams, P., "No choice: Stats, highlights available in wireless world," *Street& Smith's Sports Business Journal* Apr. 8, 2002 (2 pages).

"Wireless Dimensions Corporation Adds to Mobile-Venue Suites™"; Press Release, Wireless Dimensions; Allen, Texas; Jul. 26, 2000; http://www.wirelessdimensions.net/news.html, pp. 1-2.
Wolfe, A., et al., "Handhelds, downsized PCs, smart phones converge on Comdex—Info appliances go prime time," *Electronic Engineering Times* Nov. 15, 1999 (3 pages).
Worden, Wall Street Journal, ESPN Launches App for Mobile-TV Devices, http://online.wsl.com/article/SB10001424052748704031604576248892096438426.htm, Apr. 8, 2011.
Wray, The Guardian, co.uk, Handset hitch forces 3G Delay, http://www.guardian.co.uk/technology/2001/dec/05/internetnews.mobilephone/print, Dec. 5, 2001, UK.
Wu, et al., "On End-to-End Architecture for Transporting MPEG-4 Video over the Internet," *IEEE Transactions on Circuits and Systems for Video Technology* (2000) 10(6):1-18, Sep.
Yankee Stadium Policies and Procedures, New York Yankee's Website, see Cameras and Video Equipment Section (p. 2) (accessed Feb. 6, 2013) http://mlb.mlb.com/nyy/ballpark/information/index.isp?content=policies.
Zhong et al., The Development and eStadium Testbeds for Research and Development of Wireless Services for Large-scale Sports Venues. $2^{nd}$ Int'l IEEE/Create-Net TridentCom, Conference on Testbeds and Research Infrastructures for the Development of Networks and Communities in Barcelona, Spain, 2006.
Appeal Decision and Transcript, U.S. Appl. No. 10/620,098, dated Jan. 29, 2010 and Feb. 2, 2010, 19 pages.
173 MLB Advanced Media, L.P.'S Answers and Counterclaims to Plaintiff Front Row Technologies, LLC's Fourth Amended Complaint.
175 NBA Media Ventures, LLC's Answer, Defenses, and Counterclaims to Plaintiff's Fourth Amended Complaint for Patent Infringement.
176 Defendants Mercury Radio Arts, Inc.'s, and GBTV, LLC's Answer and Counterclaims to Fourth Amended Complaint.
177 Defendant Premiere Radio Networks, Inc.'s Answer to Fourth Amended Complaint and Counterclaim.
39 Defendants' Motion for Leave to File Defendants' First Amended Answer, Defenses, and Counterclaims to Plaintiff's First Amended Complaint for Patent Infringement.
190 Plaintiff Front Row Technologies, LLC's Motion to Dismiss Premiere Radio Networks, Inc.'s Inequitable Conduct Counterclaim.
42 Plaintiff Front Row Technologies, LLC's Opposition to Defendants' Motion for Leave to Amend.
189 Plaintiff Front Row Technologies, LLC's Motion to Dismiss GBTV, LLC's & Mercury Radio Arts, Inc.'s Inequitable Conduct Counterclaim.
188 Plaintiff Front Row Technologies, LLC's Motion to Dismiss NBA Media Ventures, LLC's Inequitable Conduct Counterclaim.
187 Plaintiff Front Row Technologies, LLC's Motion to Dismiss MLB Advanced Media, L.P.'s Inequitable Conduct Counterclaim.
95/001,565 Amendment—Argument after Notice of Appeal Jul. 25, 2016.
95/001,565 Appendix to the Specification (1) Jul. 25, 2016.
95/001,565 Appendix to the Specification (2) Jul. 25, 2016.
95/001,565 Appendix to the Specification (3) Jul. 25, 2016.
95/001,565 Applicant Arguments—Remarks Made in an Amendment Jul. 25, 2016.
95/001,565 Claim—Amendment not Entered Jul. 25, 2016.
95/001,565 Reexam Certificate of Service (1) Jul. 25, 2016.
95/001,565 Reexam Certificate of Service (2) Jul. 25, 2016.
95/001,565 Receipt of Petition in a Reexam (1) Aug. 8, 2016.
95/001,565 Receipt of Petition in a Reexam (2) Aug. 8, 2016.
95/001,565 Reexam Certificate of Service (1) Aug. 8, 2016.
95/001,565 Reexam Certificate of Service (2) Aug. 8, 2016.
95/001,565 Appendix to the Specification (1) Aug. 25, 2016.
95/001,565 Appendix to the Specification (2) Aug. 25, 2016.
95/001,656 Appendix to the Specification (3) Aug. 25, 2016.
95/001,656 Other Reference—Patent-App-Search documents (1) Aug. 25, 2016.
95/001,565 Other Reference—Patent-App-Search documents (2) Aug. 25, 2016.

(56) References Cited

OTHER PUBLICATIONS

95/001,565 Other Reference—Patent-App-Search documents (3) Aug. 25, 2016.
95/001,565 Other Reference—Patent-App-Search documents (4) Aug. 25, 2016.
95/001,565 Other Reference—Patent-App-Search documents (5) Aug. 25, 2016.
95/001,565 Other Reference—Patent-App-Search documents (6) Aug. 25, 2016.
95/001,565 Other Reference—Patent-App-Search documents (7) Aug. 25, 2016.
95/001,565 Other Reference—Patent-App-Search documents (8) Aug. 25, 2016.
95/001,565 Reexam Certificate of Service Aug. 25, 2016.
95/001,565 Notice—Defective Brief in Reexam Nov. 16, 2016.
95/001,565 Appendix to the Specification (1) Dec. 16, 2016.
95/001,565 Appendix to the Specification (2) Dec. 16, 2016.
95/001,565 Appendix to the Specification (3) Dec. 16, 2016.
95/001,565 Reexam Certificate of Service Dec. 16, 2018.
95/001,565 Miscellaneous Communication to Applicant—No Action Count, Jan. 4, 2017.
95/001,565 Letter Acknowledging that an improper Paper in a Reexam Proceeding has been returned destroyed Jan. 9, 2017.
95/001,565 Reexam Certificate of Service Jan. 17, 2017.
95/001,565 Reexam Certificate of Service Mar. 27, 2017.
95/001,565 Reexam Certificate of Service Apr. 7, 2017.
Ex. 1001—U.S. Pat. No. 8,583,027 B2 (Ortiz).
Ex. 1002—Declaration of Paul S. Min, Ph.D.
Ex. 1003—U.S. Appl. No. 13/403,231.
Ex. 1004—Declaration and Power of Attorney filed in U.S. Appl. No. 13/403,231.
Ex. 1005—U.S. Appl. No. 60/243,561.
Ex. 1006—U.S. Appl. No. 09/708,776.
Ex. 1007—U.S. Appl. No. 11/498,415.
Ex. 1008—U.S. Appl. No. 11/738,088.
Ex. 1009—U.S. Appl. No. 12/329,631.
Ex. 1010—U.S. Appl. No. 12/884,858.
Ex. 1011—U.S. Appl. No. 12/884,810.
Ex. 1012—U.S. Appl. No. 13/314,385.
Ex 1013—U.S. Appl. No. 60/214,339.
Ex. 1014—U.S. Appl. No. 09/887,492.
Ex. 1015—U.S. Appl. No. 13/364,793.
Ex. 1016—May 24, 2013 Patent Owner Response in 95001566.
Ex. 1017—Oct. 3, 2013 Request Comments in 95001566.
Ex. 1018—Mar. 31, 2015 NFOA in 95001566.
Ex. 1019—Aug. 21, 2015 Patent Owner Response in 95001566.
Ex. 1020—Sep. 21, 2015 Requester Comments in 95001566.
Ex. 1021—Jan. 20, 2016 ACP in 95001566.
Ex. 1022—Feb. 22, 2016 Patent Owner Response in 95001566.
Ex. 1023—Oct. 10, 2013 IDS in U.S. Appl. No. 13/403,231.
Ex. 1024—Oct. 15, 2013 Notice of Non-Compliant IDS in U.S. Appl. No. 13/403,231.
Ex. 1025—Feb. 10, 2012 NFOA in 90009979.
Ex. 1026—Jun. 1, 2012 Final Office Action in 90009979.
Ex. 1028—U.S. Patent Publ No. 20020023010A1 (Rittmaster).
Ex. 1029—Dec. 22, 2011 Request for Reexam in 90009979.
Ex. 1030—U.S. Pat. No. 7,486,943B2 (Choti).
Ex. 1031—U.S. Appl. No. 60/191,003 (Rittmaster Provisional).
Ex. 1032—U.S. Pat. No. 6,496,802B1 (van Zoest).
Ex. 1033—May 19, 2016 Right of Appeal Notice in Reexam Control No. 95001566.
Ex. 1034—Comparison of '793 application with '231 application.
Ex. 1035—Feb. 4, 2013 NFOA in U.S. Appl. No. 13/403,231.
Ex. 1036—U.S. Pat. No. 8,090,321B2 (Ortiz).
Ex. 1037—U.S. Pat. No. 8,270,895B2 (Ortiz).
Ex. 1038—US20100122303A1 (Maloney).
Ex. 1039—Jul. 17, 2013 Notice of Allowance in U.S. Appl. No. 13/403,231.
Ex. 1040—Defendant's Opening Claim Construction Brief in 10-cv-00433.
Ex. 1041—Front Row Opening Claim Construction Brief in 10-cv-00433.
Ex. 1042—Assessing the Cell Phone Challenge (Christian).
Ex. 1043—AT&T Tempts Landline Users (Paul).
Ex. 1044—AT&T Tells FCC It's Time to Cut the Cord (Bradley).
Ex. 1045—IEEE std 610.7 (1995)—Glossary of Computer Networking Terminology.
Ex. 1046—Navstar GPS User Equipment Introduction—1996.
Ex. 1047—Internet Protocol—DARPA Internet Program Protocol Specification—1981.
Ex. 1048—Memorandum Opinion and Order in *Front Row Techs, LLC* v. *NBA Media Ventures, LLC* (10-cv-00433).
Paper 002—MLB IPR Petition re '027 Patent.
Paper 008—Patent Owner's Preliminary Response.
Paper 009—Institution Decision.
D.N.M. 10-cv-00433 dckt 000044_000 filed Dec. 12, 2013.
D.N.M. 10-cv-00433 dckt 000048_000 filed Jan. 6, 2011.
D.N.M. 10-cv-00433 dckt 000050_000 filed Jan. 6, 2011.
D.N.M. 10-cv-00433 dckt 000053_000 filed Jan. 24, 2011.
D.N.M. 10-cv-00433 dckt 000066_000 filed Feb. 10, 2011.
D.N.M. 10-cv-00433 dckt 000082_000 filed Mar. 7, 2011.
D.N.M. 10-cv-00433 dckt 000083_000 filed Mar. 8, 2011.
D.N.M. 10-cv-00433 dckt 000229_000 filed Oct. 21, 2015.
D.N.M. 10-cv-00433 dckt 000242_000 filed Oct. 30, 2015.
D.N.M. 10-cv-00433 dckt 000256_000 filed Dec. 14, 2015.
D.N.M. 10-cv-00433 dckt 000257_000 filed Dec. 23, 2015.
D.N.M. 10-cv-00433 dckt 000261_000 filed Jan. 6, 2016.
D.N.M. 10-cv-00433 dckt 000272_000 filed Jan. 26, 2016.
D.N.M. 10-cv-00433 dckt 000286_000 filed Mar. 30, 2016.
D.N.M. 10-cv-00433 dckt 000287_000 filed Mar. 31, 2016.
D.N.M. 10-cv-00433 dckt 000288_000 filed Mar. 31, 2016.
D.N.M. 10-cv-00433 dckt 000308_000 filed May 15, 2016.
D.N.M. 10-cv-00433 dckt 000313_000 filed May 18, 2016.
D.N.M. 10-cv-00433 dckt 000314_000 filed May 18, 2016.
D.N.M. 10-cv-00433 dckt 000316_000 filed May 18, 2016.
D.N.M. 10-cv-00433 dckt 000317_000 filed May 18, 2016.
D.N.M. 10-cv-00433 dckt 000330_000 filed Jun. 3, 2016.
D.N.M. 10-cv-00433 dckt 000331_000 filed Jun. 3, 2016.
D.N.M. 10-cv-00433 dckt 000333_000 filed Jun. 3, 2016.
D.N.M. 10-cv-00433 dckt 000335_000 filed Jun. 6, 2016.
D.N.M. 10-cv-00433 dckt 000336_000 filed Jun. 6, 2016.
D.N.M. 10-cv-00433 dckt 000337_000 filed Jun. 6, 2016.
D.N.M. 10-cv-00433 dckt 000350_000 filed Jul. 5, 2016.
D.N.M. 10-cv-00433 dckt 000353_000 filed Jul. 15, 2016.
D.N.M. 10-cv-00433 dckt 000357_000 filed Aug. 30, 2016.
D.N.M. 10-cv-00433 dckt 000360_000 filed Aug. 31, 2016.
D.N.M. 10-cv-00433 dckt 000361_000 filed Sep. 1, 2016.
United States Court of Appeals for the Federal Circuit, Case No. 16-2604, *Front Row Technologies, LLC* v. *MLB Advanced Media*, Document 1.
United States Court of Appeals for the Federal Circuit, Case No. 16-2604, *Front Row Technologies, LLC* v. *MLB Advanced Media*, Document 33.
United States Court of Appeals for the Federal Circuit, Case No. 16-2604, *Front Row Technologies, LLC* v. *MLB Advanced Media*, Document 34.
United States Court of Appeals for the Federal Circuit, Case No. 16-2604, *Front Row Technologies, LLC* v. *MLB Advanced Media*, Document 44.
United States Court of Appeals for the Federal Circuit, Case No. 16-2604, *Front Row Technologies, LLC* v. *MLB Advanced Media*, Document 45.
United States Court of Appeals for the Federal Circuit, Case No. 16-2604, *Front Row Technologies, LLC* v. *MLB Advanced Media*, Document 50.
United States Court of Appeals for the Federal Circuit, Case No. 16-2604, *Front Row Technologies, LLC* v. *MLB Advanced Media*, Document 57-1.
United States Court of Appeals for the Federal Circuit, Case No. 16-2604, *Front Row Technologies, LLC* v. *MLB Advanced Media*, Document 57-2.

(56) References Cited

OTHER PUBLICATIONS

United States Court of Appeals for the Federal Circuit, Case No. 16-2604, *Front Row Technologies, LLC* v. *MLB Advanced Media*, Document 57-3.
3 United States Court of Appeals for the Federal Circuit, Case No. 16-2604, *Front Row Technologies, LLC* v. *MLB Advanced Media*, Document 57-4.
United States Court of Appeals for the Federal Circuit, Case No. 16-2604, *Front Row Technologies, LLC* v. *MLB Advanced Media*, Document 57-5.
United States Court of Appeals for the Federal Circuit, Case No. 16-2604, *Front Row Technologies, LLC* v. *MLB Advanced Media*, Document 66.
United States Court of Appeals for the Federal Circuit, Case No. 16-2604, *Front Row Technologies, LLC* v. *MLB Advanced Media*, Document 68.
95/001,565 Decision on Petition—Dismissed May 9, 2017.
95/001,565 Reply Brief Noted May 25, 2017.
95/001,565 Appeal Board Docketing Notice May 26, 2017.
95/001,565 Notice of Hearing Aug. 14, 2017.
95/001,565 Confirmation of Hearing by Appellant Aug. 16, 2017.
95/001,565 Confirmation of Hearing by Appellant Aug. 31, 2017.
*Front Row Technologies, LLC* v. *MLB Advanced Media, L.P., Mercury Radio Arts, Inc., d/b/a 'The Glenn Beck Program, Inc.', GBTV, LLC & Premiere Radio Networks, Inc.*, Case No. 1:12-cv-01309-JB-SCY, Northern District of Texas, Dallas Division asserting U.S. Pat. No. 8,090,321, Consolidated on Feb. 12, 2013 with *Front Row Technologies, LLC* v. *Major League Baseball, et al.*, Case No. 10-cv-00433 JB-KBM.
*Front Row Technologies, LLC* v. *NBA Media Ventures, Turner Sports Interactive, Inc. and Turner Digital Basketball Services, Inc.*, Case No. 1:13-cv-01153-JB-SCY, District of New Mexico asserting U.S. Pat. No. 8,583,027, Consolidated on Apr. 22, 2014 with *Front Row Technologies, LLC* v. *Major League Baseball, et al.*, Case No. 10-cv-00433 JB-KBM.
*Front Row Technologies, LLC* v. *Turner Sports Interactive, Inc. and Turner Digital Basketball Services, Inc.*, Case No. 1:13-cv-00636-JB-SCY, District of New Mexico asserting U.S. Pat. Nos. 8,086,184; 8,270,895; and 8,401,460.
United States Court of Appeals for the Federal Circuit, Case No. 16-2604, *Front Row Technologies, LLC* v. *MLB Advanced Media*.
95/001,565 Appeal Brief—Owner Jul. 25, 2016.
95/001,565 Receipt of Petition Aug. 8, 2016.
95/001,565 Respondent Brief—Requestor Aug. 25, 2016.
95/001,565 Reexam—Miscellaneous Action Sep. 14, 2016.
95/001,565 Reexam Petition Decision—Dismissed Sep. 16, 2016.
95/001,565 Appeal Docketing Notice Nov. 16, 2016.
95/001,565 Appeal Brief—Owner—Dec. 16, 2016.
95/001,565 Respondent Brief—Requester—Jan. 17, 2017.
95/001,565 Examiner's Answer to Appeal Brief Feb. 27, 2017.
95/001,565 Rebuttal Brief—Owner—Mar. 27, 2017.
95/001,565 Oral Hearing Request—Third Party Requester Jul. 27, 2027.
95/001,565 Request for Oral Hearing Apr. 26, 2017.
95/001,566 Notice of Intent to Issue a Reexam Certificate Sep. 23, 2016.
95/001,566 Reexamination Certificate Issued Oct. 17, 2016.
U.S. Appl. No. 14/259,899, filed Apr. 23, 2014, Ortiz et al.
U.S. Appl. No. 14/259,899—Office Action dated Nov. 28, 2017.

\* cited by examiner

WIRELESS TRANSMISSION OF SPORTS VENUE-BASED DATA INCLUDING VIDEO TO HAND HELD DEVICES

CROSS REFERENCE TO RELATED PATENT APPLICATION

This patent application is a continuation of U.S. patent application Ser. No. 12/819,609, which was filed on Jun. 21, 2010, entitled "SYSTEM FOR WIRELESSLY TRANSMITTING VENUE-BASED DATA TO REMOTE WIRELESS HAND HELD DEVICES OVER A WIRELESS NETWORK," which is a divisional of U.S. patent application Ser. No. 09/902,348, which was filed on Jul. 10, 2001, entitled "PROVIDING MULTIPLE PERSPECTIVES OF A VENUE ACTIVITY TO ELECTRONIC WIRELESS HAND HELD DEVICES," which issued as U.S. Pat. No. 7,812,856 on Oct. 12, 2010, which claims priority to U.S. Provisional Application Ser. No. 60/243,561, which was filed on Oct. 26, 2000, entitled "Providing multiple perspectives for a venue activity through an electronic hand held device," the disclosures of which are all herein incorporated by reference in its entirety.

This patent application is also a continuation of U.S. patent application Ser. No. 12/893,174, which was filed on Sep. 29, 2010, entitled "PROVIDING MULTIPLE PERSPECTIVES OF A VENUE ACTIVITY TO ELECTRONIC WIRELESS HAND HELD DEVICES," which is a continuation of U.S. patent application Ser. No. 09/902,348, which was filed on Jul. 10, 2001, entitled "Providing Multiple Perspectives of a Venue Activity to Electronic Wireless Hand Held Devices," which issued as U.S. Pat. No. 7,812,856 on Oct. 12, 2010, which claims priority to U.S. Provisional Application Ser. No. 60/243,561, which was filed on Oct. 26, 2000, entitled "Providing multiple perspectives for a venue activity through an electronic hand held device," the disclosures of which are all herein incorporated by reference in its entirety.

This patent application is also a continuation of U.S. patent application Ser. No. 10/015,458, which was filed on Dec. 13, 2001, entitled "Wireless transmission of in-play camera view to hand held devices," and is incorporated by reference in its entirety. This application therefore traces its priority date to and claims the benefit of the Oct. 26, 2000 filing date of U.S. Provisional Application Ser. No. 60/243,561.

FIELD OF THE INVENTION

The disclosed embodiments are related to wireless electronic hand held devices, such as Personal Digital Assistants (PDAs), hand held televisions, and data-enabled wireless telephones. The disclosed embodiments also relate to techniques for remotely delivering data including video from sports venues to hand held devices. In addition, the disclosed embodiments relate to techniques for providing increased viewing opportunities for audiences in venue environments, such as stadiums, amusement parks, and casinos. Additionally, the disclosed embodiments relate to providing venue-based data including video from sports venues to hand held devices regardless of where they are located.

BACKGROUND

Sports venues and amusement parks have video display screens generally located throughout. Most casinos have sports book areas, which feature a plurality of large television screens that receive video images from video cameras positioned to capture video images at diverse locations within sports venues. The audience of data from a typical sporting event can also generally view sports related data on large television screens located within sports stadiums. Feeds are additionally generally provided from the cameras to announcers in a broadcast booth, replaying certain plays from the event so that announcers can make comments about plays, and finally transmitting a telecast to the viewing audience located at sports venues and also sports book areas within casinos, the data including some aspects of captured video, team information and team/player statistics.

Despite the availability of such large screen television monitors, observers still lack enhanced viewing options or perspectives within venues. Furthermore, casino patrons are limited to viewing live sporting events on large screen located within sports book areas of a casino, therefore mobility of casino patrons and their ability to view sporting events is also limited.

The large television screens placed in a venue such as a stadium are typically linked to a server providing video from cameras that are fixed or mobile. Placement of cameras about the stadium was somewhat restricted as of the Oct. 26, 2000 priority date of this invention ("the priority date") and they are generally in communication with an enterprise system. The movement of the game ball in a football game, for example, along with the players on the field is dynamic and unpredictable, and may not always be caught by the active camera having the best perspective. Thus, during a game, the large television screens typically provide only one view, which can further be obstructed by other players or officials, often destroying a critical angular view.

In addition, such large screens are often utilized to bombard audience members with information, such as advertisements, thereby cutting into venue activity video that venue audience members might otherwise wish to view such as instant replays, a current play or other event data. The audience members, therefore, essentially view the large screen at the behest of the camera operator or director and cannot select their own views or camera angles.

Based on the foregoing, the present inventors have found that such limitations in venue environments including casinos can be solved through the use of hand held devices, such as PDAs, hand held televisions, data/video-enabled cellular telephones, and other hand held wireless video-enabled devices. For example, the shift in the consumer electronics industry from an emphasis on analog technology to a preference for digital technology right around the priority date was largely based on the fact that the former generally limits the user to a role of a passive recipient of information, while the latter is interactive and allows the user to control what, when, and how he or she receives and manipulates certain information. This shift in focus resulted in the development and increasingly widespread use of a portable digital devices, largely after the priority date, with some generically referred to as of the priority date as "personal digital assistants" (PDAs).

Hand held computing devices (i.e., hereinafter referred to as "hand held devices" or "handheld devices") are popular for storing and maintaining information. Although PDAs can be connected to a desktop personal computer or other PDAs via infrared, direct wire, or wireless communication links, PDAs and similar hand held devices can be linked to remote networks, such as the Internet, or local wireless resources, such as RF broadcasts, through available wireless communications techniques.

The most advanced data- and video-enabled wireless portable communication devices available in the marketplace as of the priority date take the form of a PDA or smartphone (e.g., Blackberry™). Unlike personal computers, which are general-purpose devices geared toward refining and processing information, modern portable communication devices are designed to capture, store, and display information originating from various sources. Additionally, while a certain level of skill is required to use a personal computer effectively, portable communication devices are designed with the novice and non-computer user in mind.

The present inventors realized that a solution to these shortcomings of data access at venues reside in the use of wireless hand held devices. By utilizing modern technology integrated with hand held communication devices, on-demand live action, multiple camera angles, instant replays, and real-time team and venue information can each be readily provided to venue attendees and casino patrons. Such systems can also provide venue attendees and casino patrons with increased mobility and freedom of use within and throughout venue and casino environments and to interact with enterprise hardware to include wagering (placing bets) on broadcasted activities.

SUMMARY

Aspects of disclosed embodiments provide improved methods and systems for delivering venue-related data to a hand held device.

It is an aspect of the disclosed embodiments to provide improved methods and systems for remotely delivering video (e.g., such as high definition video or other) provided at an entertainment venue, including for example, sports stadiums, concerts, casinos, and so on to hand held devices such as, for example, smartphones, cellular telephones, PDAs, tablet computing devices and laptop computers, regardless of where such hand devices are located (e.g., at home, at the venue, external to the venue, in another city, state, country, etc.).

It is still another aspect of the disclosed embodiments to provide methods and systems for providing multiple perspectives from a venue activity for viewing through hand held devices.

It is another aspect of the disclosed embodiments to provide systems and methods that can determine a user location within a venue.

It is yet another aspect of the disclosed embodiments to provide systems and methods that can authorize user access to data from a venue, wherein access can be determined by at least one of identity, access codes, location.

It is yet another aspect of the disclosed embodiments to provide hand held devices and associated methods that provide on-demand video action and instant replays from multiple camera angles focused on an entertainment venue activity.

It is still another aspect of the disclosed embodiments to provide hand held devices and associated methods that provide on-demand video action and instant replays from one or more cameras focused on a venue activity.

It is yet another aspect of the disclosed embodiments to provide in-play camera views for broadcast to hand held devices, including on-demand video action and instant replays from one or more cameras focused on a venue activity through a wireless communications network.

The above and other aspects of the invention can be achieved as will now be further described. In an example embodiment, a method and system is disclosed herein for providing venue-based data including video from cameras located at a sports venue to hand held devices operating in a casino. An example method can include steps or logical operations such as providing a casino patron with a hand held device that enables the casino patron to view sporting events provided to the hand held device from a server and to place wagers with the server, receiving venue-based data including video and statistics from the server including camera views captured as video by at least one camera (i.e., one or more cameras) located within at least one sports venue, processing the venue-based data at the server for display on a display associated with at least one hand held device operating within a casino, transmitting the venue-based data to at least one hand held device operating within a casino, and displaying the in-play camera view on the display, thereby enabling a user of the hand held device to view the in-play camera views from a sports venue through the hand held device operating within a casino and while the casino patron is moving about the casino. Throughout a casino, for example, patrons can gamble using the hand held device while viewing selected sporting events in accordance with an example embodiment.

In another example embodiment, a method can be implemented for wirelessly providing venue-based data to at least one hand held device (i.e., one or more hand held devices), the method comprising steps or logical operations of: acquiring venue-based data including high definition video captured simultaneously from more than one camera located at at least one entertainment venue and performer information from the at least one entertainment venue into at least one server, the more than one camera comprising at least one high definition video camera capable of capturing real time images of events; storing the venue-based data on the at least one server; authenticating remote hand held device user access to the venue-based data; and wirelessly transmitting from the at least one server, the venue-based data including the high definition video and the performer information as packet data over a wireless telecommunications network, the wireless packet-data communications network selectable by the user from the group of a wireless LAN and at least one cellular communications network, to at least one hand held device at locations within the range of a wireless gateway associated with the at least one entertainment venue and at locations within the range of the cellular communications network and capable of displaying the high definition video and authorized to receive, in response to the authenticating remote hand held device user access to the venue-based data, the venue-based data through the wireless telecommunications network, the wireless telecommunications network capable of transmitting the high definition video, in order to permit the venue-based data including the high definition video and the performer information to be accessible via the at least one hand held device at locations within at least one of the range of the wireless gateway associated with the live entertainment venue and the range of the at least one cellular communications network, wherein the venue-based data may be simultaneously transmitted to a first hand held device of the at least one hand held device that receives the venue-based data through the wireless LAN and to a second hand held device of the at least one hand held device that receives the venue-based data through the cellular communications network.

In another example embodiment, a step or logical operation can be further provided for accessing the venue-based data from the at least one server over a cellular or 802.11 data communications network via the at least one hand held device. In some example embodiments, the aforementioned venue-based data can include at least one video replay. In another example embodiment, the aforementioned venue-based data can also include audio data. In yet another example embodiment, the venue-based data can include real time video data. In some embodiments, the venue-based data can include real time video data, the at least one video replay and audio data. In still other example embodiments, the venue-based data can include team information. In still another embodiment, the venue-based data can include sports statistics.

The at least one hand held device can be, for example, a cellular telephone, a laptop computer, or a smartphone. In some embodiments, the at least one hand held device can be a hand held device such as a tablet computing device. In example embodiments, the at least one entertainment venue can be, for example, a sports venue, a racing venue, a concert venue, a casino, etc.

In an example embodiment, the step or operation of acquiring venue-based data from the at least one venue can further include a step or operation of acquiring the venue-based data utilizing at least one video camera.

In yet another example embodiment, a method for wirelessly providing venue-based data to at least one hand held device can be implemented. Such a method can include steps or logical operations such as, for example: acquiring venue-based data including high definition video within at least one server including video captured by more than one video camera capturing video images within at least one venue and performer information, the more than one camera comprising at least one high definition video camera capable of capturing real time images of events; storing the venue-based data on the at least one server; authenticating at least one hand held device for receipt of the venue-based data to the at least one hand held device from the at least one server; wirelessly transmitting from the at least one server, the venue-based data including the high definition video and the performer information as packet data over a wireless telecommunications network, the wireless packet-data communications network selectable by the user from the group of a wireless LAN and at least one cellular communications network, to the at least one hand held device at locations within the range of a wireless gateway associated with the at least one entertainment venue and at locations within the range of the cellular communications network and capable of displaying the high definition video and authorized to receive, in response to the authenticating at least one hand held device for receipt of the venue-based data, the venue-based data in real time through the wireless telecommunications network, the wireless telecommunications network capable of transmitting the high definition video, in order to permit the venue-based data including the high definition video and the performer information to be accessible via the at least one hand held device at locations within at least one of the range of the wireless gateway associated with the live entertainment venue and the range of the at least one cellular communications network, wherein the venue-based data may be simultaneously transmitted to a first hand held device of the at least one hand held device that receives the venue-based data through the wireless LAN and to a second hand held device of the at least one hand held device that receives the venue-based data through the cellular communications network.

In another example embodiment, the step or operation of authenticating the at least one hand held device can further comprise authenticating a particular user of the at least one hand held device for the delivery of the venue-based data to the at least one hand held device. In another example embodiment, a step or logical operation can be provided for accessing the venue-based data via the at least one hand held device. The venue-based data can include, for example, video replay data, audio data, real time video data, or combinations thereof, etc. In some example embodiments, the venue-based data can also include one or more of the following types of data: team information and sports statistics. The at least one hand held device can be a hand held device such as, for example, a cellular telephone, smartphone, tablet computing device, laptop computer, etc.

In another example embodiment, a system for wirelessly providing venue-based data to at least one hand held device can be implemented. Such a system can include, for example, at least one entertainment venue including more than one video camera simultaneously capturing video images of performers engaged in an entertainment activity within the at least one entertainment venue, the more than one camera comprising at least one high definition video camera capable of capturing real time images of events, at least one server storing venue-based data including the video images and a data communications network from which the venue-based data including high definition video is acquirable; at least one authentication module for authenticating authorized hand held device access to the venue-based data from the at least one server; and at least one transmitter for wirelessly transmitting from the at least one server, the venue-based data including the high definition video and the performer information as packet data over a wireless telecommunications network, the wireless packet-data communications network selectable by the user from the group of a wireless LAN and at least one cellular communications network, to at least one hand held device at locations within the range of a wireless gateway associated with the at least one entertainment venue and at locations within the range of the cellular communications network and capable of displaying the high definition video and authorized to receive, in response to the authenticating authorized hand held device access to the venue-based data, the venue-based data through the wireless telecommunications network, the wireless telecommunications network capable of transmitting the high definition video, in order to permit the venue-based data including the high definition video and the performer information to be accessible via the at least one hand held device at locations within at least one of the range of the wireless gateway associated with the live entertainment venue and the range of the at least one cellular communications network, wherein the venue-based data may be simultaneously transmitted to a first hand held device of the at least one hand held device that receives the venue-based data through the wireless LAN and to a second hand held device of the at least one hand held device that receives the venue-based data through the cellular communications network.

In some system embodiments, the venue-based data can be permitted to be accessible via the at least one hand held device. The venue-based data can be, for example, video replay data, real time video data, audio data, a combination of video data and audio data, and so on. In some example embodiments, the venue-based data include, for example, data such as team information, sports statistics, and so on. The at least one hand held device can be a hand held device such as a cellular telephone, smartphone, tablet computing device, laptop computer and so on. In one example embodiment, the at least one venue can be a sports venue such as a racing venue, baseball stadium, basketball arena, football stadium, hockey arena, soccer stadium, golf course, tennis court, and so. In another example embodiment, the at least one venue can be a concert venue. In another example embodiment, the at least one venue can be a casino.

In another example embodiment, a step or operation of acquiring venue-based data from the at least one venue can further comprises acquiring the venue-based data utilizing at least one video camera.

In yet another example embodiment, a system for wirelessly providing venue-based data to at least one hand held device can be implemented. Such an example system embodiment can include: at least one entertainment venue including more than one video camera simultaneously capturing video images of performers engaged in an entertainment activity within the at least one entertainment venue, the more than one camera comprising at least one high definition video camera capable of capturing real time images of events; at least one server storing venue-based data including the video images and performer information and a data communications network from which venue-based data including high definition video is acquirable; at least one authentication module for authenticating at least one hand held device for authorized acceptance of the venue-based data to the at least one hand held device; and at least one transmitter for wirelessly transmitting from the at least one server, the venue-based data including the high definition video and the performer information as packet data over a wireless telecommunications network, the wireless packet-data communications network selectable by the user from the group of a wireless LAN and at least one cellular communications network, to the at least one hand held device at locations within the range of a wireless gateway associated with the at least one entertainment venue and at locations within the range of the cellular communications network and capable of displaying the high definition video and through the wireless telecommunications network, in response to authenticating the at least one hand held device via the at least one authentication module, the wireless telecommunications network capable of transmitting the high definition video, in order to permit the venue-based data including the high definition video and the performer information to be accessible via the at least one hand held device at locations within at least one of the range of the wireless gateway associated with the live entertainment venue and the range of the at least one cellular communications network, wherein the venue-based data may be simultaneously transmitted to a first hand held device of the at least one hand held device that receives the venue-based data through the wireless LAN and to a second hand held device of the at least one hand held device that receives the venue-based data through the cellular communications network.

The venue-based data is accessible via the at least one hand held device. In some example embodiments, authenticating the at least one hand held device can further include authenticating a particular user of the at least one hand held device for the delivery of the venue-based data to the at least one hand held device. The venue-based data can include, for example, video replay data, real time video data, and/or audio data. In some example embodiments, the venue-based data can include team information and sports statistics.

BRIEF DESCRIPTION OF THE FIGURES

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION

The following detailed description refers to the state of technology as of the priority date for the present invention. Reference to particular parameters, values and configurations is provided for enabling in light of the current state of the art, should not be interpreted as limiting given the normal progression of technology. Future equivalents realized by technological progression are expected and should be considered in light of the scope of the appended claims.

Figure 1:
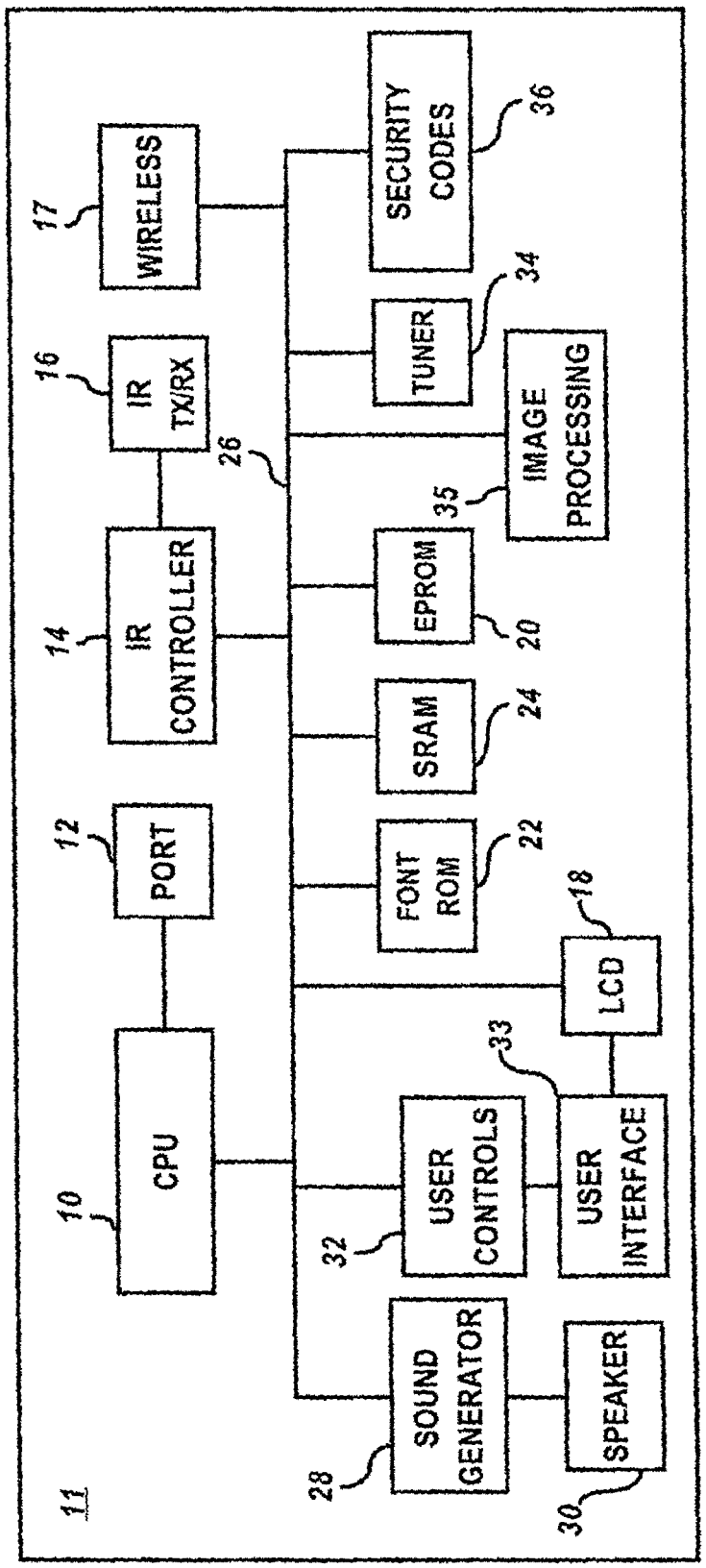
FIG. 1 depicts a block diagram illustrating components of a hand held device in which embodiments can be implemented.

FIG. 1 depicts a schematic diagram illustrating a general hardware configuration of a hand held device 11 in accordance with an embodiment. Those skilled in the art can appreciate, however, that other hardware configurations with less or more hardware and/or modules can be utilized in carrying out the methods and systems (e.g., hand held device 11) of the disclosed embodiments. CPU 10 of hand held device 11 performs as a main controller operating under the control of operating clocks supplied from a clock oscillator. CPU 10 can be configured, for example, as a 16-bit microprocessor. External pins of CPU 10 are generally coupled to an internal bus 26 so that it can be interconnected to respective components.

A SRAM 24 can be configured as a writeable memory that does not require a refresh operation and can be generally utilized as a working area of CPU 10. SRAM (Static RAM) is generally a form of semiconductor memory (RAM) based on a logic circuit known as a flip-flop, which retains information as long as there is enough power to run the device. Font ROM 22 can be configured as a read only memory for storing character images (e.g., font) displayable on a display 18. Examples of types of displays that can be utilized in accordance with display 18 include a TFT active matrix display, an illuminated LCD (Liquid Crystal Display), or other small-scale displays being developed.

CPU 10 of the present embodiment drives display 18 utilizing, among other media, font images from Font ROM 22, and images transmitted as data through wireless unit 17 and processed by image-processing module 35. An EPROM 20 can be configured as a read only memory that is generally erasable under certain conditions and can be utilized for permanently storing control codes for operating respective hardware components and security data, such as a serial number.

Figure 3:
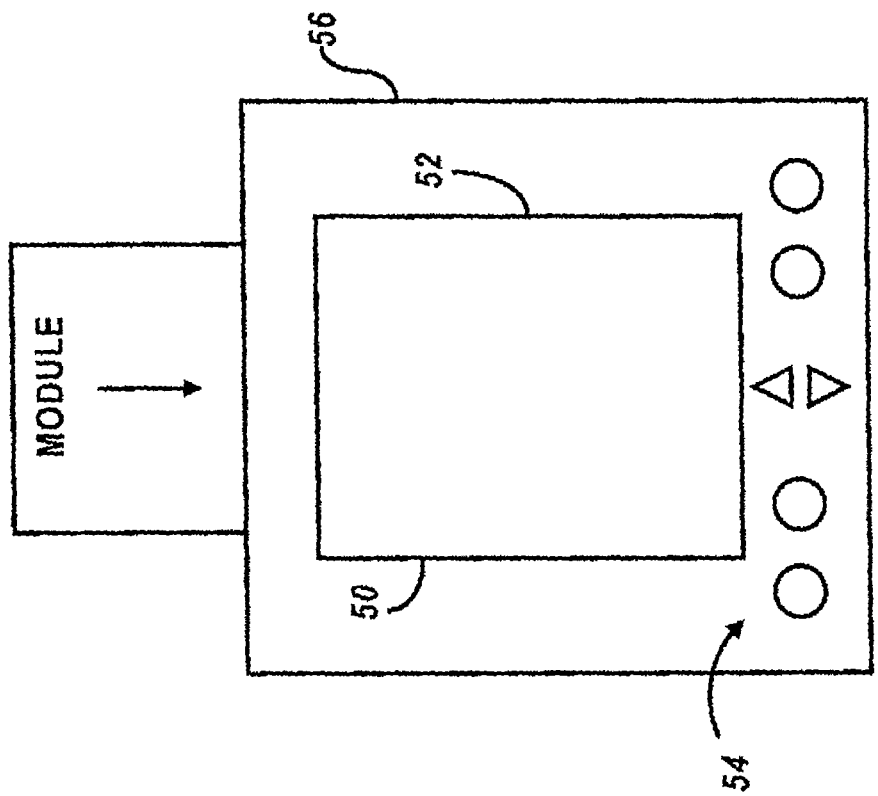
FIG. 3 depicts a pictorial representation of a hand held device for receiving a module in accordance with the disclosed embodiments.

An IR controller 14 can generally be configured as a dedicated controller for processing infrared codes transmitted/received by an IR transceiver 16 and for capturing the same as computer data. Wireless unit 17 can generally be configured as a dedicated controller and transceiver for processing wireless data transmitted from and to a wireless communications network. Note that wireless unit 17 can be implemented as a separate module or cartridge, such as illustrated in FIG. 3. Wireless unit 17 can thus comprise a wireless module.

Port 12 can be connected to CPU 10 and can be temporarily attached, for example, to a docking station to transmit information to and from hand held device 11 to other devices such as personal computers, retail cash registers, electronic kiosk devices, and so forth. Port 12 can also be configured, for example, to link with a modem, cradle or docking station, which is well known in the art, that permit network devices, a personal computer or other computing devices to communicate with hand held device 11.

User controls 32 permit a user to enter data to hand held device 11 and initiate particular processing operations via CPU 10. A user interface 33 can be linked to user controls 32 to permit a user to access and manipulate hand held device 11 for a particular purpose, such as, for example, viewing images on display 18. Those skilled in the art will appreciate that user interface 33 can be implemented as a touch screen user interface, as indicated by the dashed lines linking display 18 with user interface 33. In addition, CPU 10 can cause a sound generator 28 to generate sounds of predetermined frequencies from a speaker 30. Speaker 30 can be utilized to produce music and other audio information associated with video data transmitted to hand held device 11 form an outside source.

Those skilled in the art can appreciate that additional electronic circuits or the like other than, or in addition to, those illustrated in FIG. 1 can be used to construct hand held device 11. Such components, however, are not described in the present specification, because many aspects of them are well known in the art. For example, hand held televisions are available for receiving public television broadcasts, but the basic technology can be modified on such devices so that they can be adapted to (e.g., proper authentication, filters, security codes, or the like) receive venue-based RF transmissions from at least one venue-based RF source (e.g., a wireless camera, or data from a camera transmitted wirelessly through at least one transmitter). Those skilled in the art can thus appreciate that because of the brevity of the drawings described herein, only a portion of the connections between the illustrated hardware blocks is generally depicted. In addition, those skilled in the art will appreciate that hand held device 11 can be implemented as a specific type of a hand held device, such as a Personal Digital Assistant (PDA), paging device, WAP-enabled mobile phone, and other associated hand held computing devices well known in the art.

Given the teaching of various embodiments, it should be appreciated that a hand held device 11 can be configured to permit images, similar to television broadcast images, to be displayed on display 18 for a user to view. Hand held device 35 thus includes an image-processing unit 35 for processing images transmitted as data to hand held device 11 through wireless unit 17. A tuner unit 34, implemented as either a single tuner or a plurality of tuners, can be linked through internal bus 26 to CPU 10. Additionally, a security unit 36 can be utilized to process proper security codes to thereby ensure that data transferred to and from hand held device 11 can be secure and/or permitted. Broadcast security prevents general receipt of venue images without proprietary hardware and/or signals.

Security unit 36 can be implemented as an optional feature of hand held device 11. Security unit 36 can also be configured with software, e.g., algorithm routines or subroutines, that are processed by CPU 10, and which prevent wireless data from being transmitted/received from hand held device 11 beyond a particular frequency range, outside of a particular geographical area associated with a local wireless network, or absent authorization codes (e.g., decryption, encryption, coding, decoding, and so forth). Note that security unit 36 can be implemented as a separate security module, such as, for example, a smart card, or cartridge. An example of a module, which can be implemented in accordance with the methods and systems of the disclosed embodiments, is illustrated in FIG. 3. A security module of this type can be utilized for securing data transmitted from or to a hand held device such as, for example, hand held device 11.

Hand held device 11 can thus be configured with both wireless and wireline capabilities, depending on the needs and requirements of a manufacturer or customer. Such wireless capabilities include features such as those found in cellular telephone units, in accordance with carrying out embodiments. Examples of hand held devices that can be utilized in accordance with the methods and systems of the disclosed embodiments include, for example, the "PalmPilot™" PDA, manufactured and sold by Palm Computing, the Handspring Visor™, Window CE™ compatible devices, RIM™ Blackberry-family paging devices, Motorola paging devices, hand held portable televisions, and the Symbol™ SPT-family of PDA-type organizer devices. Such hand held devices are mentioned herein for illustrative purposes only and are not considered limiting features of the disclosed embodiments. It is reasonable to expect that hand held devices will evolve and new models provided by various manufacturers after the prior date, yet their functionality will still be able to implement features of the present invention. Hand held devices, which can also be implemented in accordance with the disclosed embodiments, include hand held devices, such as cellular telephones having viewable display screens (i.e., a display) for the display of data transmitted through wireless networks. Customized, venue-specific devices (i.e., proprietary, limited use) can also be developed in accordance with the disclosed embodiments that incorporate hardware and software modules necessary to practice the methods and systems taught herein.

Those skilled in the art can appreciate that although hand held device 11 is generally illustrated in FIG. 1, hand held device 11 can be implemented as a wireless application protocol (WAP) web-enabled cellular hand held device, such as a PDA, wireless telephone, or pager or a combination thereof. Hand held device 11 can also be configured with features of combination cellular telephone/PDA devices. One recent example of such a device is the Handspring™ PDA and associated cellular phone attachment module, which is manufactured and sold by Handspring™ Inc. Other such devices include the Palm-Motorola phone, which permits users to access e-mail and store calendars and contact databases. Hand held devices can also be provided in the form of a multi-RF (Radio Frequency) receiver-enabled hand held television-viewing device, such as those manufactured by Sony™ and Casio™. Regardless of the type of hand held device implemented, it is anticipated that such hand held devices will be adapted to receive and process data via image-processing unit 35 for ultimate display as moving images on display unit 18, in accordance with the disclosed embodiments. Image-processing unit 35 can include image-processing routines, subroutines, software modules, and so forth, to perform image-processing operations.

Figure 2:
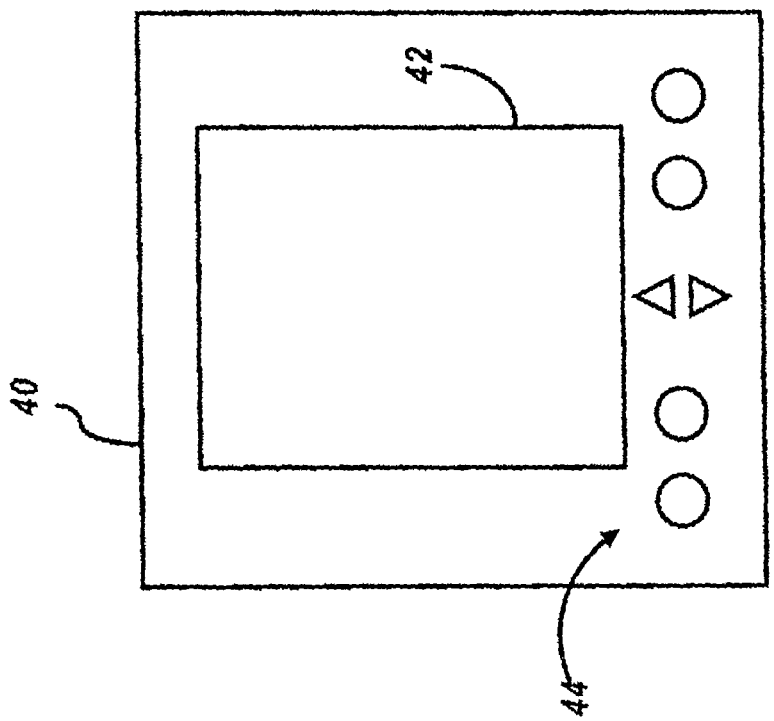
FIG. 2 illustrates a pictorial representation of a hand held device, which can be utilized to implement embodiments.

FIG. 2 illustrates a pictorial representation of a hand held device 40 that can be utilized to implement an embodiment. Hand held device 40 includes a display screen 42 (i.e., a display), which is generally analogous to display 18 of FIG. 1. Note that as utilized herein the terms "display screen" and "display" can be utilized interchangeably. Television images broadcast via radio frequency or digital data can be displayed on display screen 42 for a user to view. User controls 44 can permit a user to select and/or manipulate images or text displayed on display screen 42. User controls 44 of FIG. 2 are generally analogous to user controls 32 of FIG. 1. A touch screen user interface can be further configured on the display screen 42 with hand held device 40 to permit a user to manipulate images/text displayed on display screen 42.

FIG. 3 depicts a pictorial representation of a hand held device 56 adapted for receiving a module 50, in accordance with the disclosed embodiments. Although hand held device 56 of FIG. 3 is generally analogous to hand held device 40 of FIG. 2, the difference being that hand held device 56 can be adapted to receive a module/cartridge that permits hand held device 56 to function according to specific hardware, codes and/or instructions contained in a memory location (e.g., a computer chip or magnetic strip) within module 50. Module 50 can be configured as a smart card, well known in the art. Such a smart card can provide, for example, access codes (e.g., decryption) to enable hand held device 56 to receive venue broadcasts. Note that as utilized herein, the term "module" can refer to a physical module, such as a cartridge. The term "module" can also refer to a software module composed of routines or subroutines that perform a particular function. Those skilled in the art can appreciate the meaning of the term module is based on the context in which the term is utilized and environment being described. Thus, module 50 as illustrated can be generally configured as a physical cartridge or smart card. The term "module" as utilized herein can also refer to a software module, depending on the context of the discussion thereof.

To illustrate the use of a physical module, such as module 50, assume that a user can possess several such physical modules or cartridges. One module, when inserted into hand held device FIG. 3 can instruct hand held device 50 to function as a standard PDA, such as a Palm Pilot device. Another module, when inserted into hand held device FIG. 3, can instruct hand held device 56 to function as a portable television that receives wireless television broadcasts and/or data from a local wireless broadcast network and/or venue-based (e.g., short range) broadcasts. Such a module can also incorporate decryption capabilities to receive controlled/secured broadcasts at venues.

Those skilled in the art can thus appreciate that hand held device 56 can be adapted to receive and cooperate with module 50. Additionally, hand held device 56 includes a display screen 52 that is generally analogous to display screen 42 of FIG. 2 and display 18 of FIG. 1. Hand held device 56 also includes user controls 54 that are generally analogous to user controls 44 of FIG. 2 and user controls 32 of FIG. 1. Hand held device 56 of FIG. 3 is generally analogous to hand held device 11 of FIG. 1. Thus, hand held device 56 can also implement touch screen capabilities through a touch screen user interface integrated with display screen 52.

Assuming module 50 is implemented as a smart card instead of a cartridge to provide receiver and/or securing capabilities (e.g., encryption, decryption, coding, decoding, etc.), it is anticipated that similar features can be implemented in accordance with a smart card to insure that hand held device 56 includes touch screen user interface and video viewing capabilities. Smart cards are generally known in the art as credit card sized plastic cards with an embedded computer chip. The chip can either be a microprocessor with internal memory or a memory chip with non-programmable logic. The chip connection can be configured via direct physical contact or remotely through a contactless electromagnetic interface.

Smart cards can be generally configured as either a contact or contactless smart card, or a combination thereof. A contact smart card requires insertion into a smart card reader (e.g., contained within hand held device 56) with a direct connection to, for example, a conductive micromodule on the surface of the card. Such a micromodule can be generally gold plated. Transmission of commands, data, and card status takes place through such physical contact points.

A contactless card requires only close proximity to a reader. Both the reader and the card can be implemented with antenna means providing a contactless link that permits the devices to communicate with one another. Contactless cards can also maintain internal chip power or an electromagnetic signal (e.g., RF tagging technology). Two additional categories of smart codes, well known in the art, which are based on contact and contactless cards are the so-called Combi cards and Hybrid cards.

A Hybrid card generally can be equipped with two chips, each with a respective contact and contactless interface. The two chips are not connected, but for many applications, this Hybrid serves the needs of consumers and card issuers. The Combi card can be generally based on a single chip and can be generally configured with both a contact and contactless interface.

Chips utilized in such smart cards are generally based on microprocessor chips or memory chips. Smart cards based on memory chips depend on the security of the card reader for their processing and can be utilized when low to medium security requirements. A microprocessor chip can add, delete and otherwise manipulate information in its memory. Microprocessor-based memory cards typically contain microprocessor chips with 8, 16, and 32 bit architectures.

Figure 4:
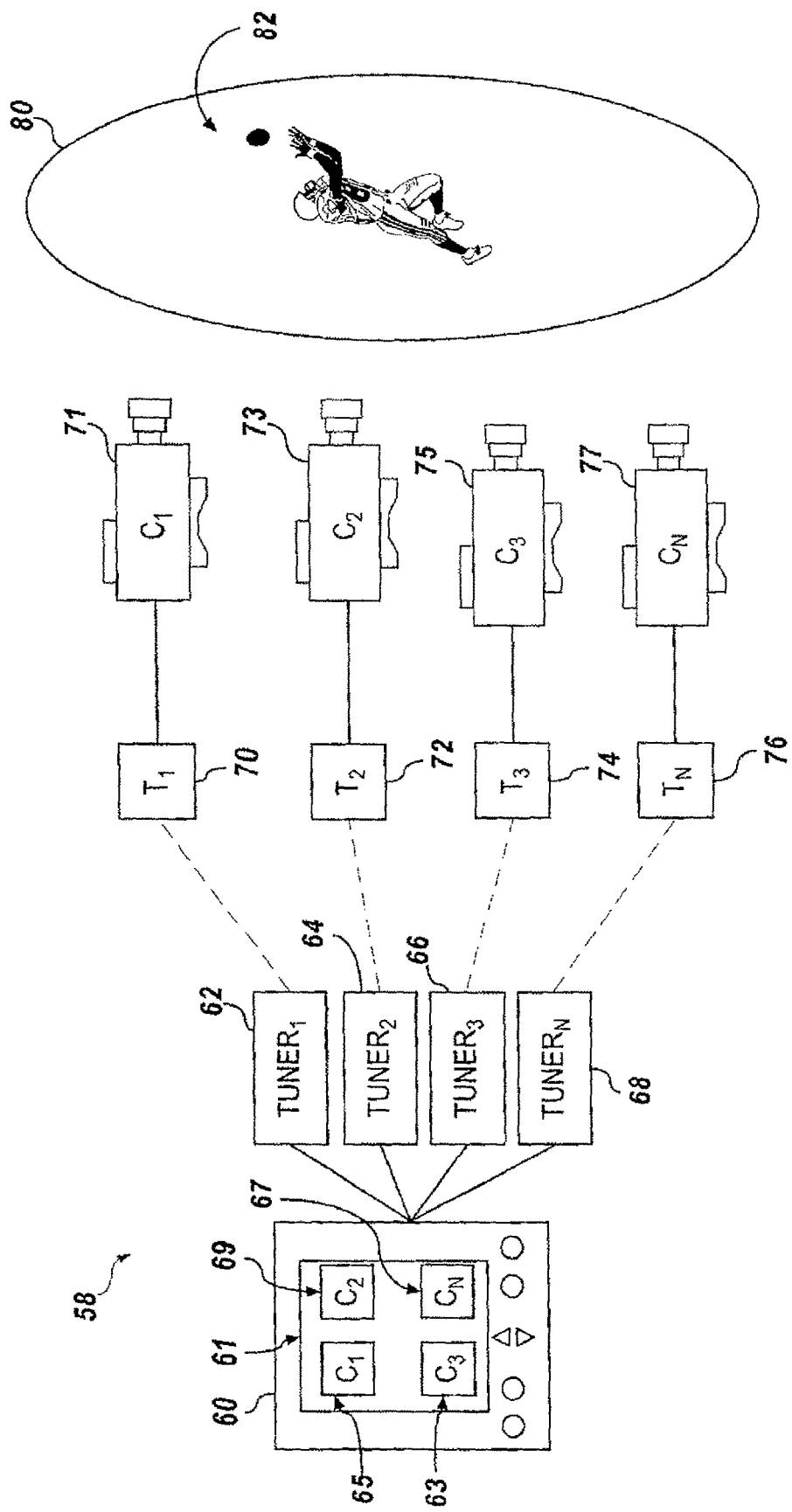
FIG. 4 illustrates a system for providing multiple perspectives through a hand held device of activities at a venue in accordance with the disclosed embodiments.

FIG. 4 illustrates a system 58 for providing multiple perspectives through a hand held device 60 of activities at a venue 80, in accordance with the disclosed embodiments. For illustrative purposes only, it can be assumed that venue 80 of FIG. 4 is a stadium venue, such as a football stadium. Cameras 71, 73, 75, and 77 are respectively positioned at strategic points about venue 80 to capture the best images of activity taking place within venue 80. Cameras 71, 73, 75, 77 are respectively linked to transmitters 70, 72, 74, and 76. Each of these transmitters can be configured as equipment, which feeds a radio signal to an antenna for transmission. The equipment can also provide for the securing transmission of signals and associated data. For example, such equipment can rely on the encryption of signals. These signals, if encrypted, can be decrypted by authorized hand held receivers.

The antenna can be integrated with the transmitter. Transmitters are well known in the art, and include active components, such as a driver, well known in the art. Transmitters also include passive components, such as a TX filter, also well known in the art. These components, when operating together, impress a signal onto a radio frequency carrier of the correct frequency by immediately adjusting its frequency, phase, or amplitude, thereby providing enough gain to the signal to project it to its intended target (e.g., a hand held device located within the venue).

A hand held device 60 can be held by a user at a stadium seat within view of the activity at the venue 80. Hand held device 60 is generally analogous to hand held device 11 of FIG. 1 and hand held device 40 of FIG. 2. Hand held device 60 of FIG. 4 can be configured as a hand held device (e.g., PDA, portable television, etc.) adapted for use with a cartridge/module, such as module 50 of hand held device 56 of FIG. 3. The cartridge/module can contain the electronics (e.g., tuner(s), filter(s), security codes, encryption/decryption codes, etc.) to allow a hand held device to be adapted for receiving venue-based data. Hand held device 60 includes a display screen 61 (e.g. display 18 of FIG. 1).

Additionally, display screen 61 of hand held device 60 can be configured with a touch screen user interface displayable and operable on display screen 61. Those skilled in the art can appreciate that touch screen interfaces are well known in the PDA art and further explanation thereof should not be necessary. Display screen 61 can include a touch screen display area 65 that can be associated with camera 71. Thus, images captured by camera 71 are transmitted from transmitter 70, which is linked to camera 71. Additionally, display screen 61 includes touch screen display areas 69, 63, and 67, which are respectively associated with cameras 73, 75, and 77.

Cameras 71, 73, 75, and 77 are respectively labeled $C_1$, $C_2$, $C_3$, and $C_N$ to indicate that a plurality of cameras can be utilized in accordance with system 58 to view activities taking place within venue 80, such as a football game or concert. Although only four cameras are illustrated in FIG. 4, those skilled in the art will appreciate that additional or fewer cameras can be also implemented in accordance with system 58. Touch screen display areas 65, 69, 63, and 67 are also respectively labeled $C_1$, $C_2$, $C_3$, and $C_N$ to illustrate the association between these display areas and cameras 71, 73, 75, and 77 where touch screen technology is utilized.

Hand held device 60 can be integrated with one or more plurality of tuners, as illustrated by tuners 62, 64, 66, and 68. Such tuners can be activated via user controls on hand held device 60 and/or via touch screen icons or areas displayed on display screen 61 that are associated with each tuner. Such icons/areas can be respectively displayed within display areas 65, 69, 63 and 67, or within a separate display area of display screen 61 (e.g., picture-within-picture capabilities found on large television sets). A user accesses tuner 62, for example, to retrieve real-time video images transmitted from transmitter 70 for camera 71. Likewise, a user can access tuner 64 to retrieve real-time video images transmitted from transmitter 72 for camera 73.

In addition, a user can access tuner 74 to retrieve real-time video images transmitted from transmitter 74 for camera 75. Finally, user can access tuner 68 to retrieve real-time video images transmitted from transmitter 76 for camera 77. In the example depicted in FIG. 4, a football player 82 is participating in a football game within venue 80. Cameras 71, 73, 75, and 77 capture moving images (e.g., video data) of the football player 82 from various angles and transmit these images to hand held device 60.

Figure 5:
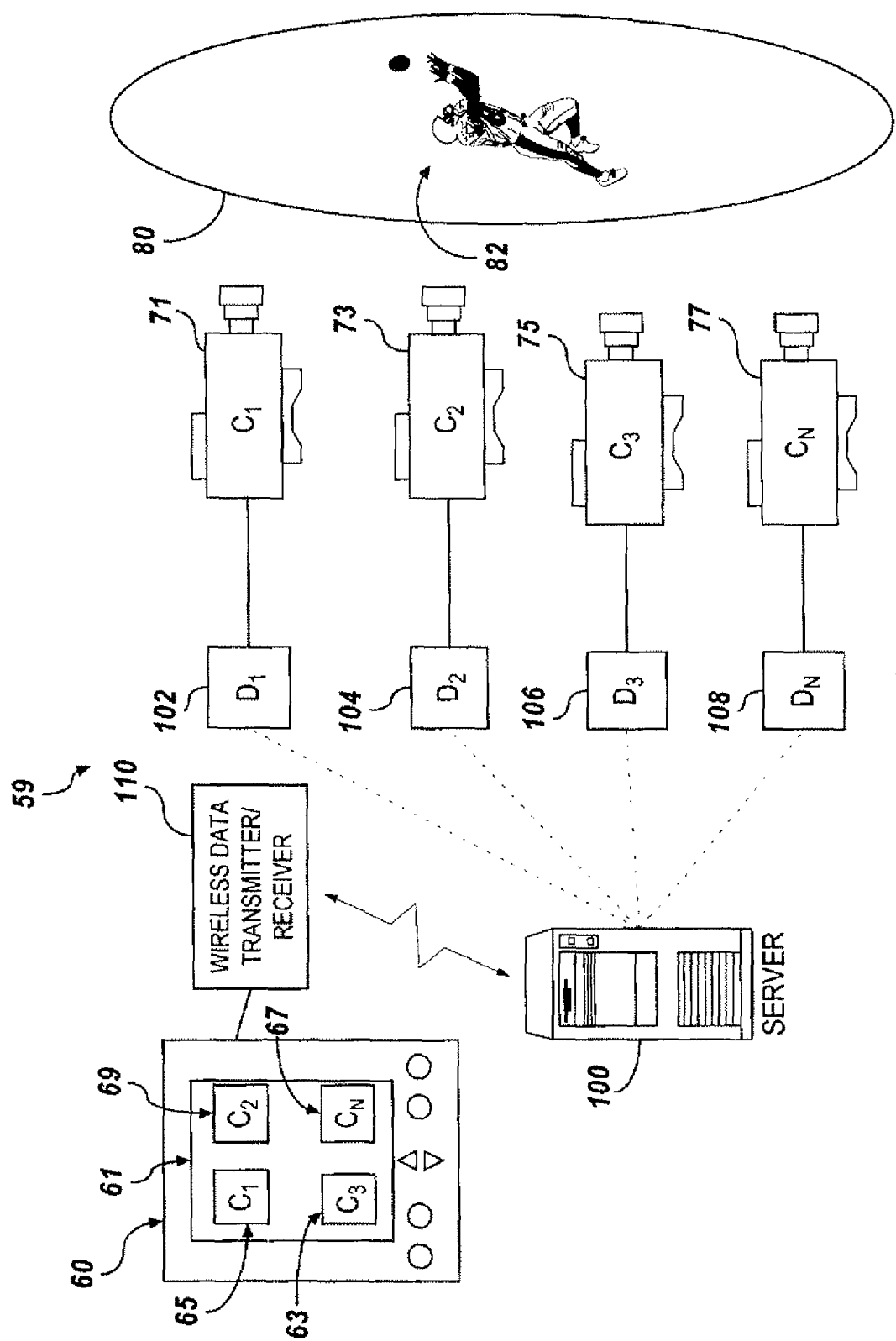
FIG. 5 depicts a system that provides multiple perspectives of a venue activity through a hand held device adapted to receive and process real time video data in accordance with the disclosed embodiments.

FIG. 5 depicts a system 59 that provides multiple perspectives of activity at a venue 80 through a hand held device 60 adapted to receive and process real time video data in accordance with the disclosed embodiments. Note that in FIG. 4 and FIG. 5 analogous parts are indicated by identical reference numerals. Thus, for example, cameras 71, 73, 75, and 77 of FIG. 5 are analogous to cameras 71, 73, 75, and 77 of FIG. 4. Hand held device 60 of FIG. 5 is also analogous to hand held device 60 of FIG. 4 and includes similar features thereof.

Hand held device 60 of FIG. 5, however, can be configured to receive wireless real time video data transmitted for cameras 71, 73, 75, and 77 respectively through data transmitters 102, 104, 106, and 108 to server 100 and thereafter to wireless data transmitter/receiver 110. Note that wireless data transmitter/receiver 110 is analogous to wireless unit 17 of FIG. 1. Hand held device 60 of FIG. 5 is also analogous to hand held device 11 of FIG. 1.

Hand held device 60 of FIG. 5 can also incorporate a touch screen user interface, as described herein with respect to analogous hand held device 60 of FIG. 4. The difference between system 58 of FIG. 4 and system 59 of FIG. 5 lies in the inclusion of digital transmitters 102, 104, 106, and 108 which are respectively linked to cameras 71, 73, 75, and 77 of FIG. 5. In the illustration of FIG. 5, cameras 71, 73, 75, and 77 can be configured as high definition video cameras which capture real time images of events or activities taking place within venue 80, such as real time video footage of football player 82.

A captured image of football player 82, for example, can be transferred from one or more of video cameras 71, 73, 75, and 77 of FIG. 5 and transmitted through a respective digital transmitter, such as digital transmitter 102, 104, 106 or 108 and transmitted via wired and/or wireless communications to server 100. The server 100 then processes the video data received from one or more of the digital transmitters and formats the video data for transmission via wireless means to wireless data transmitter/receiver 100, which can be integrated with hand held device 100. Transmitter/receiver 100 can communicate with the various components of hand held device 60, such as a CPU, image-processing unit, memory units, and so forth.

Those skilled in the art can appreciate that although real time video data can be transmitted to server 100, captured past video images can also be stored within server 100 and transferred to hand held device 60 for display at display screen 61. For example, instant replays can be transferred as video data to hand held device 60 upon the request of a user of hand held device 60. Such instant replay footage can be displayed on display screen 61 for the user to view.

Figure 6:
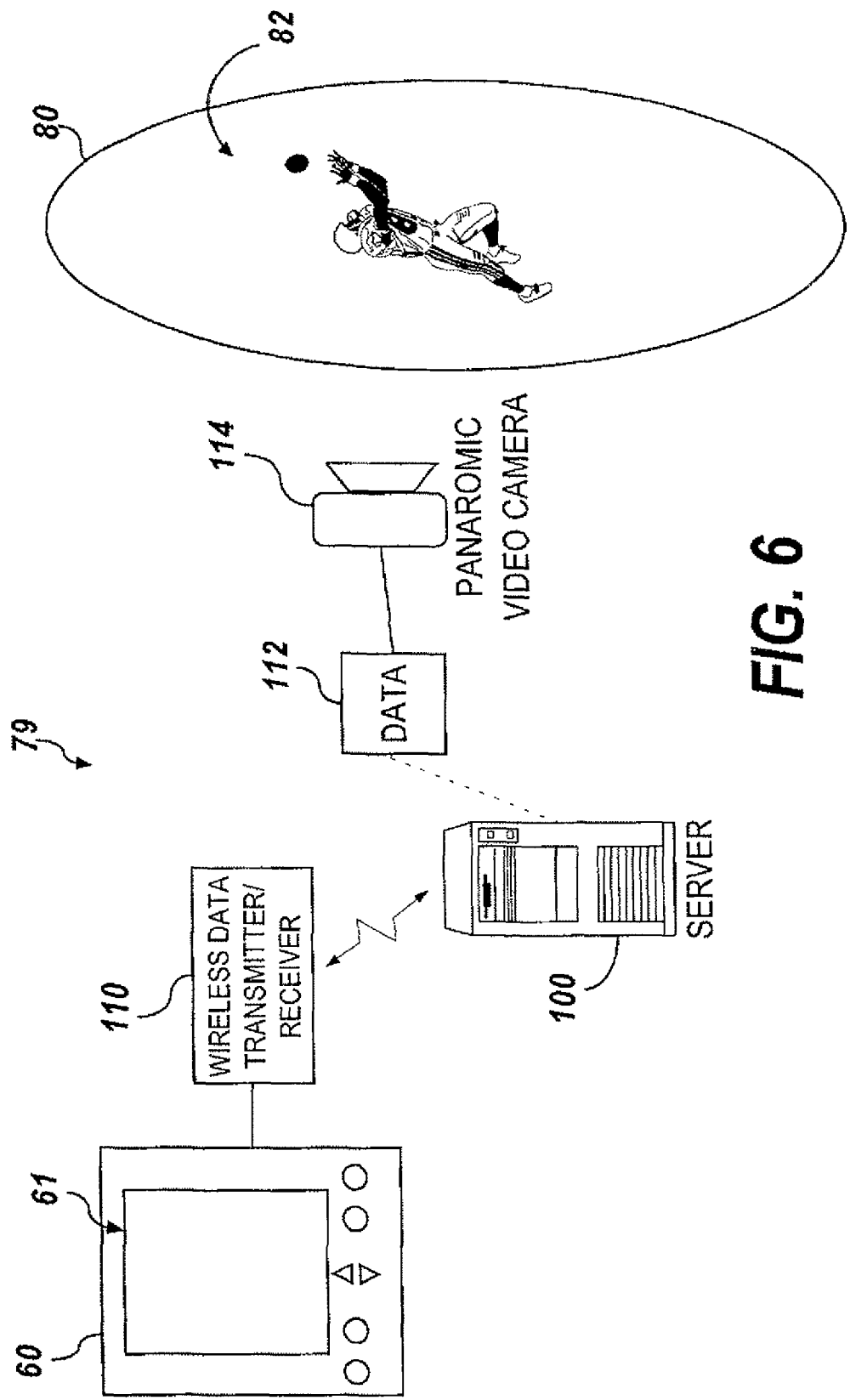
FIG. 6 depicts a system for providing multiple perspectives of activity at a venue through a hand held device adapted to receive and process real time video data in accordance with the disclosed embodiments.

FIG. 6 illustrates a system 79 for providing multiple perspectives of activity at a venue 80 through a hand held device 60 adapted to receive and process real time video data from at least one wide-angle and/or panoramic video camera 114, in accordance with the disclosed embodiments. In system 79 of FIG. 6, wide-angle/panoramic (hereinafter referred to as "panoramic") video camera 114 can be configured as a high-definition panoramic video camera that captures images of activities taking place at venue 80. In the example illustrated in FIG. 6, panoramic video camera 114 can capture of images of a football game and one or more football players, such as illustrated football player 82.

A data transmitter 112 can be linked to panoramic video camera 114. Video data captured by panoramic video camera 114 can be transferred to data transmitter 112, which thereafter transmits the video data to server 100 via a direct link or wireless link, depending on the needs or requirements of the promoters or venue owners. Note that this is also true of the system described in FIG. 6. Server 100 of FIG. 6 is analogous to server 100 of FIG. 5. Thus, in the case of FIG. 5, video data can be transmitted from one or more of data transmitters 102, 104, 106, and 108 via a direct wire/cable link or through wireless transmission means, such as through a wireless network.

Those skilled in the art will appreciate, of course, that hand held device 60 of FIG. 6 is analogous to hand held devices depicted in FIGS. 1-5 herein. In FIGS. 4, 5, and 6, like or analogous parts are identified by identical reference numerals. Thus, images captured by panoramic video camera 114 of activity taking place at venue 80 can be displayed as real time video images or instant replay data on display screen 61 of hand held device 60.

Figure 7:
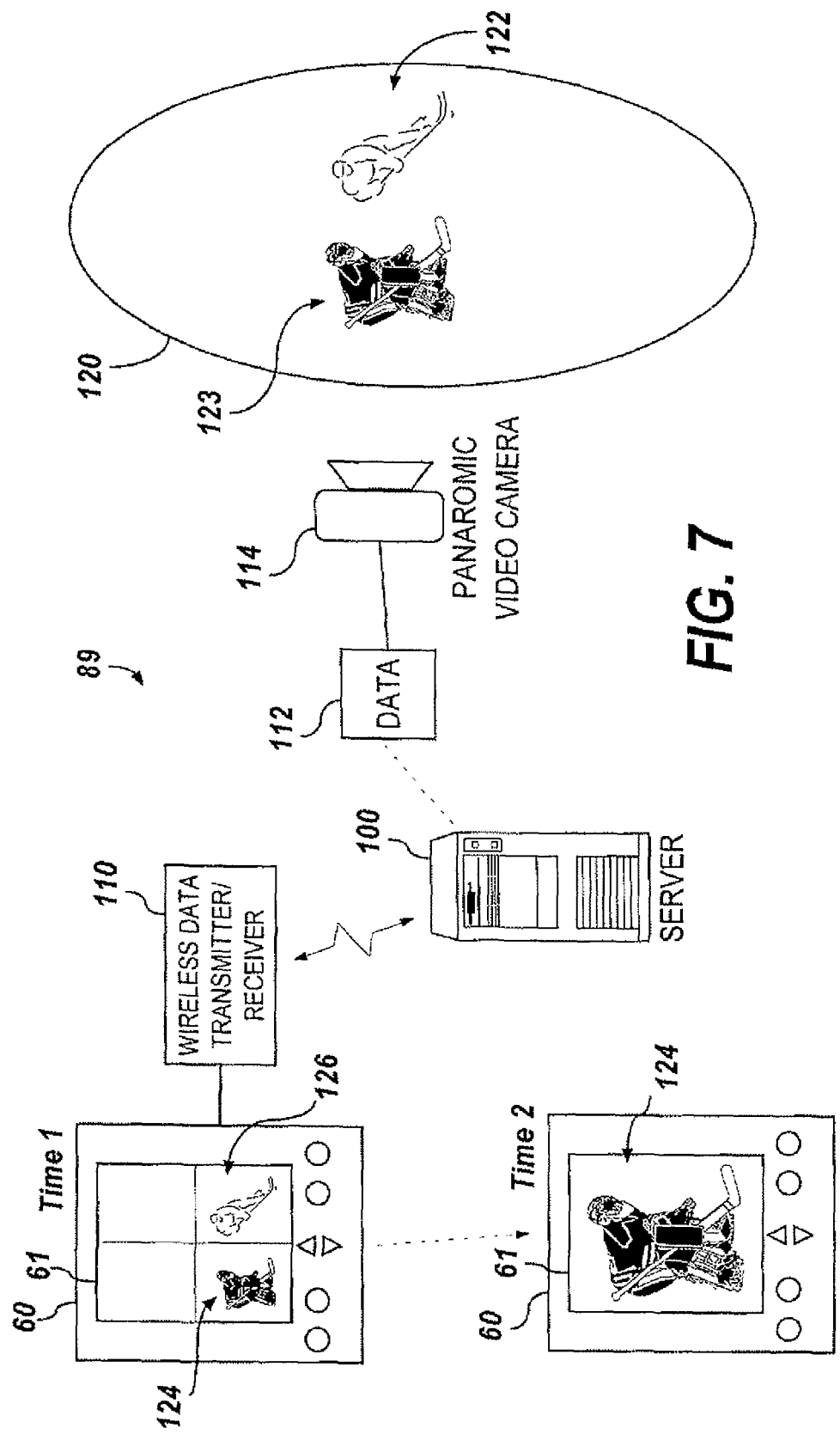
FIG. 7 depicts a system for providing multiple perspectives for activity at a venue at a first time/perspective and a second time/perspective in accordance with the disclosed embodiments.

FIG. 7 depicts a system 89 for providing multiple perspectives for activity at a venue 120 at a first time and/or perspective (Time 1) and a second time and/or perspective (Time 2), in accordance with the disclosed embodiments. In FIGS. 4, 5, 6, and 7, like or analogous parts are indicated by identical reference numerals. Thus, in system 89 of FIG. 7, an event, in this case illustrated as a hockey game, is taking place within venue 120. Venue 120 can be, for example, a hockey arena. Panoramic video camera 114 can be linked to data transmitter 112.

As explained previously, data transmitter 112 can be linked to server 100 via a direct link, such as a transmission cable or line, or through wireless communication means, such as through a wireless network. Server 100 can also communicate with hand held device 60 through a wireless network or other wireless communication means by transmitting data through such a network or wireless communications means to wireless data transmitter/receiver 110. Wireless data transmitter/receiver 110, as explained previously, can be integrated with hand held device 60.

Thus, a video image 124 of a hockey player 122 can be captured as video data by panoramic video camera 114, along with a video image 126 of a hockey player 123 and displayed within display screen 61 of hand held device 60 as indicated at Time 1. Video image 124 and 126 can be displayed within a grid-like interface on display screen 61. Note that in the illustration of FIG. 7, display screen 61 can be divided into four sections.

When a user touches, for example the area or section of display screen 61 in which video image 124 can be displayed, the entire display area of display screen 61 can then be consumed with a close-up video shot of video image 124, as indicated at Time 2, thereby providing the user with a closer view of hockey player 122. Those skilled in the art can appreciate that the touch screen display area of display screen 61 can be arranged with graphical icons and/or user-controls that perform specific pan and zoom functions. Such icons/user-controls, when activated by a user, permit the user to retrieve panned/zoomed images of events taking place in real time within venue 120.

Note that although only one panoramic video camera 114 and one data transmitter 112 are illustrated in FIG. 7, a plurality of panoramic video cameras, servers, and data transmitters can be implemented in accordance with the disclosed embodiments to capture the best video images, image-processing, and signal capacity to users, whether real time or otherwise, of events taking place at venue 120.

Figure 8:
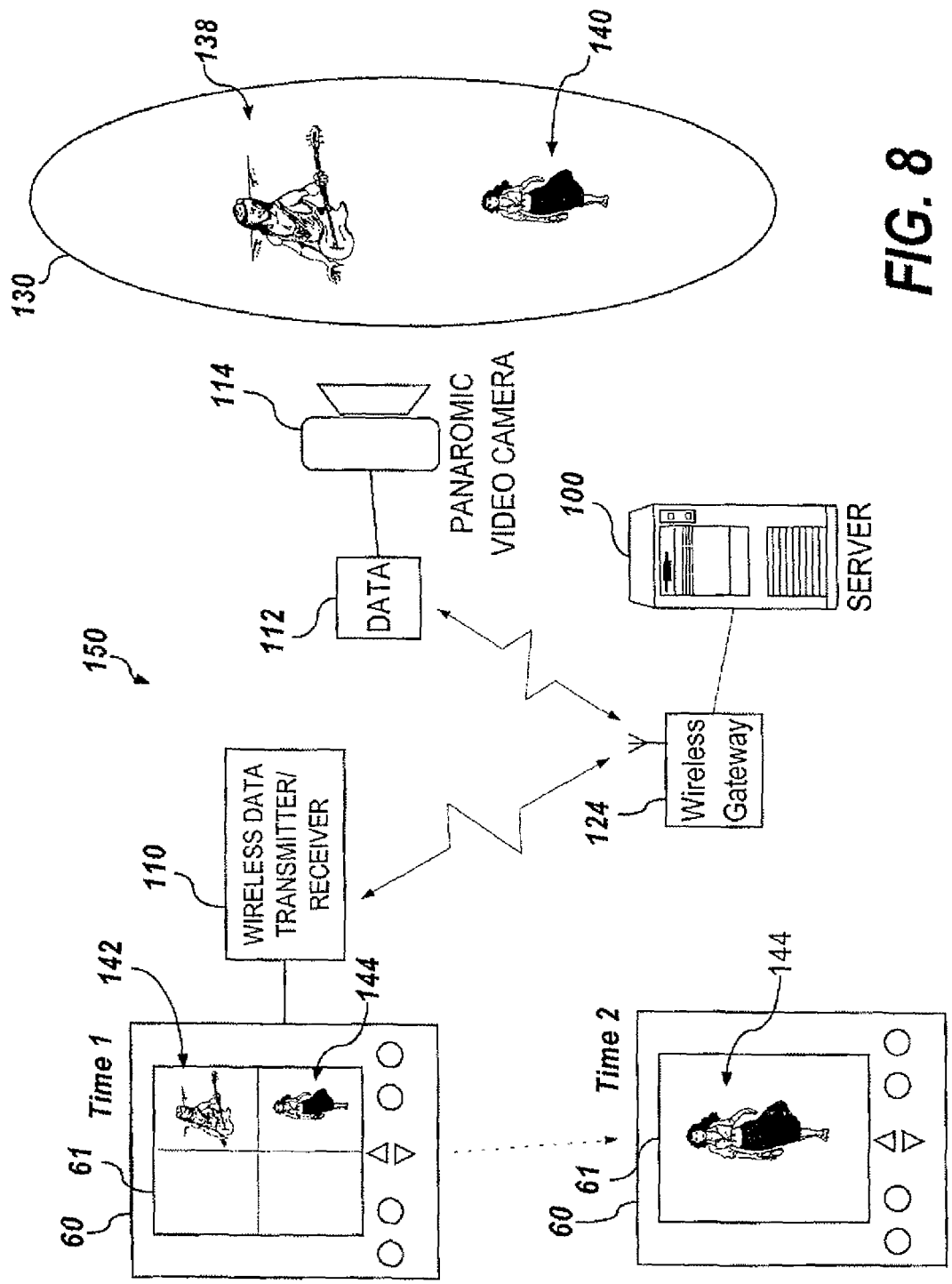
FIG. 8 illustrates a system for providing multiple perspectives through a hand held device of an activity at a venue including the use of a wireless gateway in accordance with the disclosed embodiments.

FIG. 8 illustrates a system 92 for providing multiple perspectives through hand held device 60 of an activity at a venue 130, including the use of a wireless gateway 124, in accordance with the disclosed embodiments. Those skilled in the art can appreciate that wireless gateway 124 can be configured as an access point for a wireless LAN (Local Area Network). Access points for wireless LAN networks and associated wired and wireless hardware (e.g., servers, routers, gateways, etc.) are well known in the art and can be utilized in accordance with the disclosed embodiments. Again, note that in FIGS. 4, 5, 6, 7, and 8, like or analogous parts are indicated by identical reference numerals. System 92 of FIG. 8 is analogous to system 89 of FIG. 7, the difference being in the nature of the venue activity. Venue 130 can be, for example, a concert hall or stadium configured with a sound stage.

Figure 9:
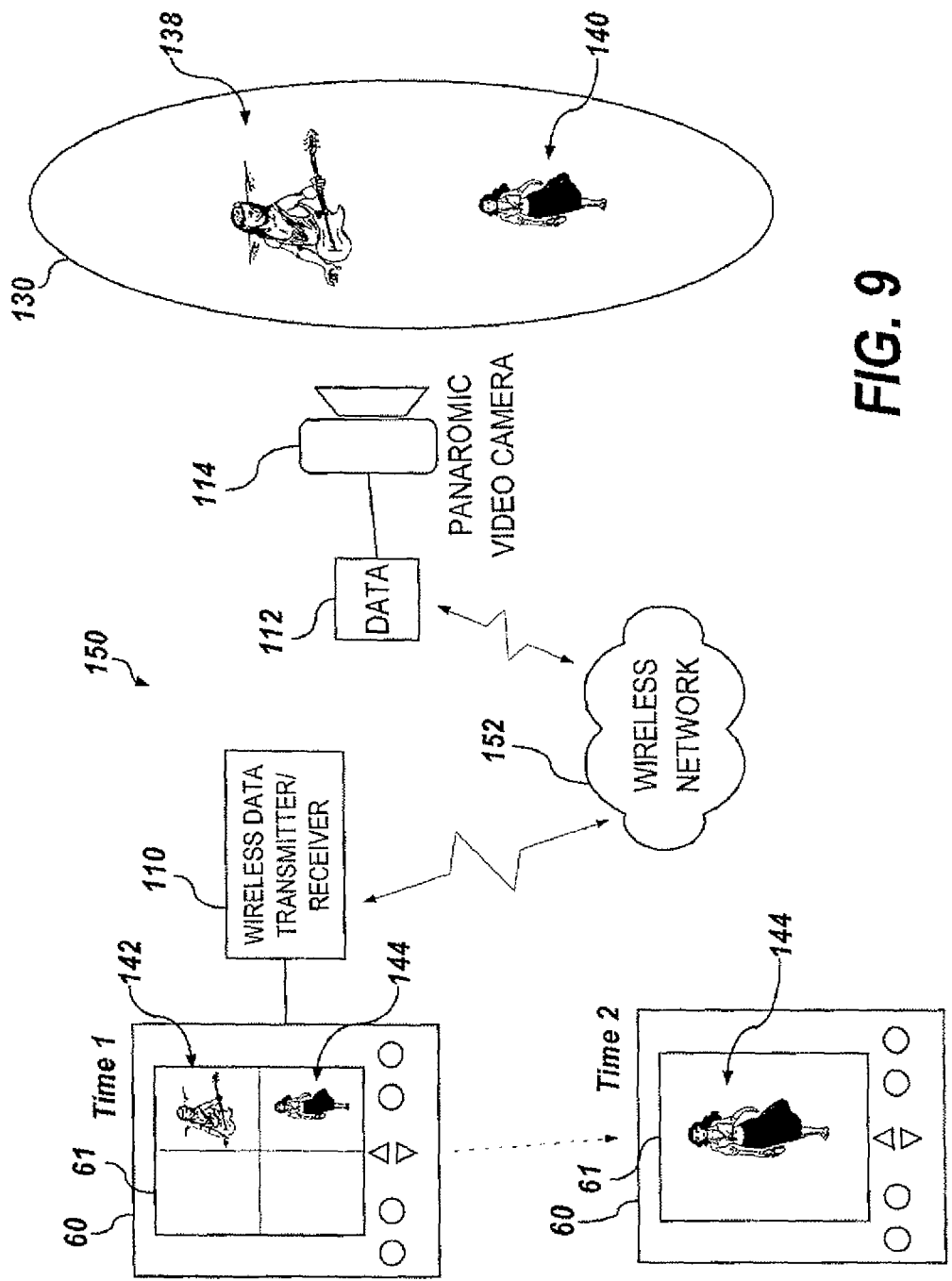
FIG. 9 depicts a system for providing multiple perspectives through a hand held device of a venue activity, in association with a wireless network in accordance with the disclosed embodiments.

Gateway 124 can be configured as a communications gateway through which data can enter or exit a communications network, such as wireless network 152 illustrated in FIG. 9 for a large capacity of user hand device 60 users. Wireless network 152 can be configured as a wireless LAN network. Hand held device 60 can be configured to communicate and receive transmissions from such a wireless LAN network based on device identification (e.g., device address). Communication with hand held devices, such as hand held device 60, however, can also be achieved through RF (Radio Frequency) broadcasts, thereby not requiring two-way communication and authentication between, for example, a wireless LAN network and such hand held devices. A broadcast under such a scenario can also require that such a hand held device or hand held devices possess decryption capabilities or the like in order to be authorized to receive transmissions from the venue.

The remaining elements of FIG. 8 are also analogous to the elements depicted in the previous drawings, with the addition of wireless gateway 124, which can be linked to server 100 and can be in communication with several wireless data transmitters/receivers 110 and one or more electronic hand held devices, including hand held device 60. Wireless data transmitter/receiver 110, as explained previously, can be integrated with hand held device 60. One or more panoramic video cameras, such as panoramic video camera 114, can be positioned at a venue 130 at locations that capture images not only of the events taking place on a concert stage, but also events taking place within the stadium itself.

If an audience member 140, for example, happens to be walking along a stadium aisle within view of panoramic video camera 114, the audience member's video image can be displayed as video image 144 within display screen 61 of hand held device 60, as indicated at Time 1. Likewise, panoramic video camera 114 captures images of band member 138 whose video image can be displayed as video image 142 within a display area of display screen 61, as indicated at Time 1.

Thus, a user of hand held device 60 can view not only the events taking place on a central performing platform of venue 130, but also other events within the arena itself. The band member 138 can be located on a central performing platform (not shown) of venue 130 when panoramic video camera 114 captures real-time video images of band member 138. The user can also, for example, wish to see a close-up of audience member 140. By activating user controls and/or a touch screen interface integrated with display screen 61, the user can, for example, pan or zoom to view a close-up video shot of audience member 140, as indicated at Time 2.

Captured video images are transferred from panoramic video camera 114 as video data through transmitter 112 to server 100 and through wireless gateway 124 to wireless data transmitter/receiver 110. Although a single server 100 is illustrated in FIG. 8, those skilled in the art can appreciate that a plurality of servers and/or wireless gateways can be implemented in accordance with the methods and systems of the disclosed embodiments to process and deliver captured and transmitted video data. Based on the foregoing, those skilled in the art can appreciate that video data can be simultaneously transferred from server 100 or a plurality or servers to literally thousands of hand held devices located within the range of the wireless network and/or wireless gateways associated with venue 130.

FIG. 9 illustrates a system 150 for providing multiple perspectives through hand held device 60 of an activity at a venue 130 in association with a wireless network 152, in accordance with the disclosed embodiments. System 150 of FIG. 9 is analogous to system 92 of FIG. 8, the difference noted in the inclusion of wireless network 152. Thus, in FIG. 8 and FIG. 9, like or analogous parts are indicated by identical reference numerals. Video data captured by a camera or cameras, such as panoramic video camera 114, can be transferred to data transmitter 112, which transmits the video data to wireless network 152. Wireless network 152 then retransmits the data, at the request of authorized users of hand held devices, such as hand held device 60, to wireless data transmitters/receivers, such as transmitter/receiver 110 integrated with hand held device 60.

Those skilled in the art can appreciate that wireless network 152 can also receive and retransmit other data, in addition to video data. For example, a server or other computer system can be integrated with wireless network 152 to provide team and venue data, which can then be transferred to wireless data transmitter receiver 110 from wireless network 152 and displayed thereafter as team and venue information within display screen 61 of hand held device 60. Other data that can be transferred to hand held device for display include real-time and historical statistics, purchasing, merchandise and concession information, and additional product or service advertisements.

Such data can include box scores, player information and matchups, animated playbooks, shot/hit/pitch charts, historical information, and offense-defense statistics. In a concert venue, for example, as opposed to a sporting event, information pertaining to a particular musical group can be also transferred to the hand held device, along with advertising or sponsor information. Note that both the video data and other data described above generally comprise types of venue-based data. Venue-based data, as referred to herein, can include data and information, such as video, audio, advertisements, promotional information, propaganda, historical information, statistics, event scheduling, and so forth, associated with a particular venue and/or its advertisers/sponsors generally not retrievable through public networks.

Such information can be transmitted together with video data received from data transmitter 112. Such information can be displayed as streaming data within display area 61 of hand held device 60 or simply stored in a database within hand held device 60 for later retrieval by the user.

One example of a wireless network that can be utilized to implement wireless network 152 can be Bluetooth, which is described in greater detail herein, and was conceived originally to make up for the shortcomings of infrared technologies (IR). Because IR cannot be utilized to penetrate walls, carry data heavy signals, or operate within devices that are not in line of sight, Bluetooth, which is becoming well known the art, can be configured as or with wireless network 152.

Figure 10:
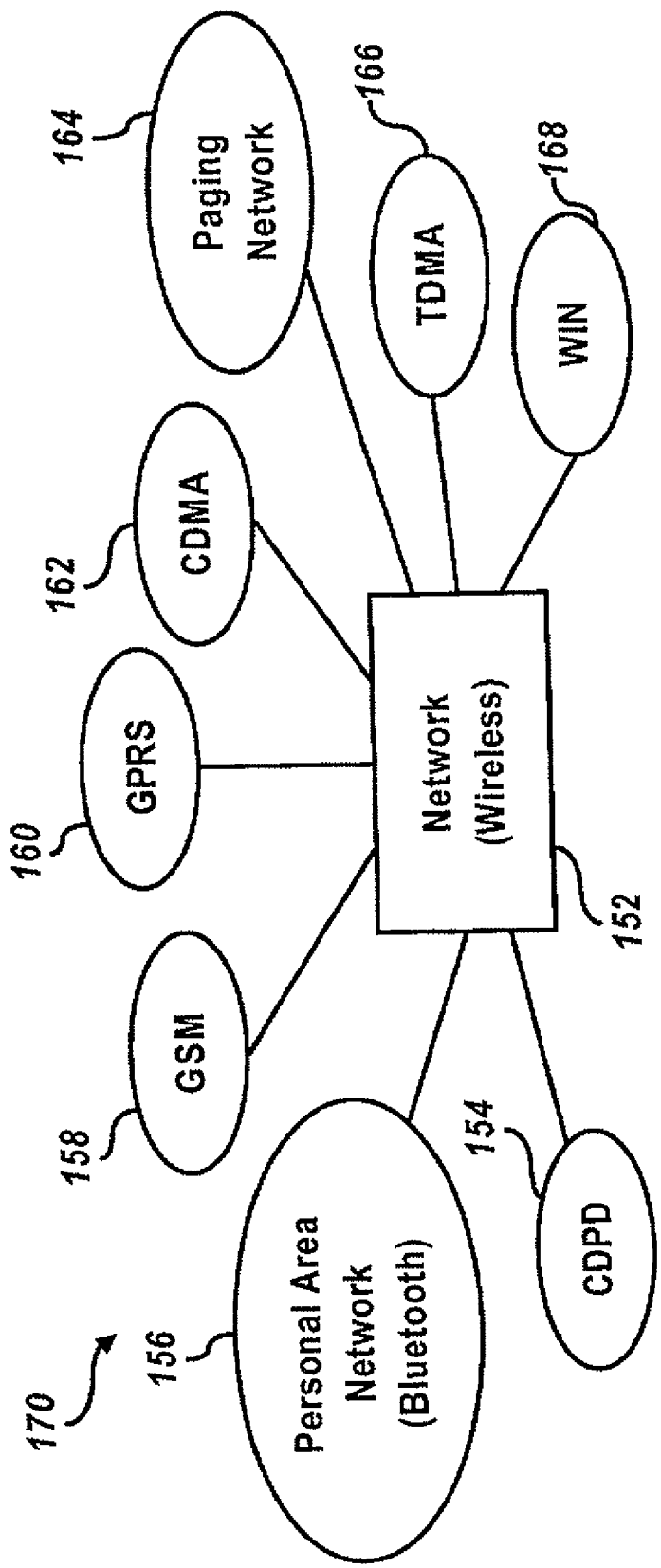
FIG. 10 illustrates a diagram depicting network attributes of a wireless network that can be utilized in accordance with the disclosed embodiments.

FIG. 10 illustrates an entity diagram 170 depicting network attributes of wireless network 152 that can be utilized in accordance with the disclosed embodiments. A wireless network 152 as illustrated in FIG. 10 can be configured as a variety of possible wireless networks. Thus, entity diagram 170 illustrates attributes of wireless network 152, which may or may not be exclusive of one another.

Those skilled in the art can appreciate that a variety of possible wireless communications and networking configurations can be utilized to implement wireless network 152. Wireless network 152 can be, for example, implemented according to a variety of wireless protocols, including cellular, Bluetooth, and 802.11 RF or direct IR communications. Wireless network 152 can be implemented as a single network type or a network based on a combination of network types (e.g., Bluetooth, CDMA, etc.).

Wireless network 152 can be configured with teachings/aspects of CDPD (Cellular Digital Packet Data) networks well known in the networking arts. CDPD network 154 is illustrated in FIG. 10. CDPD can be configured as a TCP/IP based technology that supports Point-to-Point (PPP) or Serial Line Internet Protocol (SLIP) wireless connections to mobile devices, such as the hand held devices described and illustrated herein. Mobility and/or cellular service are generally available throughout the world from major service providers. Data can be transferred utilizing CDPD protocols.

Current restrictions of CDPD are not meant to limit the range or implementation of the method and system described herein, but are described herein for illustrative purposes only. It is anticipated that CDPD will be continually developed, and that such new developments can be implemented in accordance with the disclosed embodiments.

Wireless network 152 can also be configured with teachings/aspects of a Personal Area Network 156 or Bluetooth, as described herein. Bluetooth was adopted by a consortium of wireless equipment manufacturers referred to at the Bluetooth Special Interest Group (BSIG), and has emerged as a global standard for low cost wireless data and voice communication. Current specifications for this standard call for a 2.4 GHz ISM frequency band. Bluetooth technology is generally based on a short-range radio transmitter/receiver built into small application specific circuits (ASICS, DSPs) and embedded into support devices, such as the hand held devices described and illustrated herein.

The Bluetooth standard permits up to 100 mw of power, which can increase the range to 100 M. In addition, Bluetooth can support several data channels. Utilizing short data packets and frequency hopping of up to 1600 hops per second, Bluetooth is a wireless technology that can be utilized to enable the implementation of the methods and systems described herein. Current restrictions of Bluetooth are not meant to limit the range or implementation of the disclosed embodiments, but are described herein for illustrative purposes only. It is anticipated Bluetooth will be continually developed, and that such new developments can be implemented in accordance with the disclosed embodiments.

Wireless network 152 can also be configured utilizing teachings/aspects of GSM network 158. GSM (Global System for Mobile Communication) and PCS (Personal Communications Systems) networks, both well known in the telecommunications arts, generally operate in the 800 MHz, 900 MHz, and 1900 MHz range. PCS initiates narrowband digital communications in the 900 MHz range for paging, and broadband digital communications in the 1900 MHz band for cellular telephone service. In the United States, PCS 1900 is generally equivalent to GSM 1900. GSM operates in the 900 MHz, 1800-1900 MHz frequency bands, while GSM 1800 is widely utilized throughout Europe and many other parts of the world.

In the United States, GSM 1900 is generally equivalent to PCS 1900, thereby enabling the compatibility of these two types of networks. Current restrictions of GSM and PCS are not meant to limit the range or implementation of the disclosed embodiments, but are described herein for illustrative purposes only. It is anticipated that GSM and PCS will be continually developed, and that aspects of such new developments can be implemented in accordance with the disclosed embodiments.

Wireless network 152 can also utilize teachings/aspects of GPRS network 160. GPRS technology, well-known in the telecommunications arts, bridges the gap between current wireless technologies and the so-called "next generation" of wireless technologies referred to frequently as the third-generation or 3G wireless technologies. GPRS is generally implemented as a packet-data transmission network that can provide data transfer rates up to 115 Kbps. GPRS can be implemented with CDMA and TDMA technology and supports X.25 and IP communications protocols, all well known in the telecommunications arts. GPRS also enables features, such as Voice over IP (VoIP) and multimedia services. Current restrictions of GPRS are not meant to limit the range or implementation of the disclosed embodiments, but are described herein for illustrative purposes only. It is anticipated that GPRS will be continually developed and that such new developments can be implemented in accordance with the disclosed embodiments.

Wireless network 152 can also be implemented utilizing teaching/aspects of a CDMA network 162 or CDMA networks. CDMA (Code Division Multiple Access) is a protocol standard based on IS-95 CDMA, also referred to frequently in the telecommunications arts as CDMA-1. IS-95 CDMA is generally configured as a digital wireless network that defines how a single channel can be segmented into multiple channels utilizing a pseudo-random signal (or code) to identify information associated with each user. Because CDMA networks spread each call over more than 4.4 trillion channels across the entire frequency band, it is much more immune to interference than most other wireless networks and generally can support more users per channel.

Currently, CDMA can support data at speeds up to 14.4 Kbps. Wireless network 152 can also be configured with a form of CDMA technology known as wideband CDMA (W-CDMA). Wideband CDMA can be also referred to as CDMA 2000 in North America. W-CDMA can be utilized to increase transfer rates utilizing multiple 1.25 MHz cellular channels. Current restrictions of CDMA and W-CDMA are not meant to limit the range or implementation of the disclosed embodiments, but are described herein for illustrative purposes only. It is anticipated that CDMA and W-CDMA will be continually developed and that such new developments can be implemented in accordance with the disclosed embodiments.

Wireless network 152 can be also implemented utilizing teachings/aspects of paging network 164. Such paging networks, well known in the telecommunications arts, can be implemented in accordance with the disclosed embodiments to enable transmission or receipt of data over the TME/X protocol, also well known in the telecommunications arts. Such a protocol enables notification in messaging and two-way data coverage utilizing satellite technology and a network of base stations geographically located throughout a particular geographical region. Paging network 162 can be configured to process enhanced 2-way messaging applications.

Unified messaging solutions can be utilized in accordance with wireless network 152 to permit carriers and Internet service providers to manage customer e-mail, voice messages and fax images and can facilitate delivery of these communications to PDAs, telephony devices, pagers, personal computers and other capable information retrieval devices, wired or wireless.

Current restrictions of such paging networks are not meant to limit the range or implementation of the disclosed embodiments, but are described herein for illustrative purposes only. It is anticipated that such paging networks, including those based on the TME/X protocol, will be continually developed and that such new developments can be implemented in accordance with the disclosed embodiments.

Wireless network 152 can also be configured utilizing teachings/aspects of TDMA networks 166. TDMA (Time Division Multiple Access) is a telecommunications network utilized to separate multiple conversation transmissions over a finite frequency allocation of through-the-air bandwidth. TDMA can be utilized in accordance with the disclosed embodiments to allocate a discrete amount of frequency bandwidth to each user in a TDMA network to permit many simultaneous conversations or transmission of data. Each user can be assigned a specific timeslot for transmission. A digital cellular communications system that utilizes TDMA typically assigns 10 timeslots for each frequency channel.

A hand held device operating in association with a TDMA network sends bursts or packets of information during each timeslot. Such packets of information are then reassembled by the receiving equipment into the original voice or data/information components. Current restrictions of such TDMA networks are not meant to limit the range or implementation of the disclosed embodiments, but are described herein for illustrative purposes only. It is anticipated that TDMA networks will be continually developed and that such new developments can be implemented in accordance with the disclosed embodiments.

Wireless network 152 can also be configured utilizing teachings/aspects of Wireless Intelligent Networks (WINs) 168. WINs are generally known as the architecture of the wireless switched network that allows carriers to provide enhanced and customized services for mobile telephones. Intelligent wireless networks generally include the use of mobile switching centers (MSCs) having access to network servers and databases such as Home Location Registers (HLRs) and Visiting Location Registers (VLRs), for providing applications and data to networks, service providers and service subscribers (wireless device users).

Local number portability allows wireless subscribers to make and receive calls anywhere—regardless of their local calling area. Roaming subscribers are also able to receive more services, such as call waiting, three-way calling and call forwarding. A HLR is generally a database that contains semipermanent mobile subscriber (wireless device user) information for wireless carriers' entire subscriber base.

A useful aspect of WINs for the disclosed embodiments is enabling the maintenance and use of customer profiles within an HLR/VLR-type database. Profile information can be utilized for example with season ticket holders and/or fans of traveling teams or shows. HLR subscriber information as used in WINs includes identity, service subscription information, location information (the identity of the currently serving VLR to enable routing of communications), service restrictions and supplementary services/information. HLRs handle SS7 transactions in cooperation with Mobile Switching Centers and VLR nodes, which request information from the HLR or update the information contained within the HLR. The HLR also initiates transactions with VLRs to complete incoming calls and update subscriber data. Traditional wireless network design is generally based on the utilization of a single HLR for each wireless network, but growth considerations are prompting carriers to consider multiple HLR topologies.

The VLR can also be configured as a database that contains temporary information concerning the mobile subscribers currently located in a given MSC serving area, but whose HLR may be elsewhere. When a mobile subscriber roams away from the HLR location into a remote location, SS7 messages are used to obtain information about the subscriber from the HLR, and to create a temporary record for the subscriber in the VLR.

Signaling System No. 7 (referred to as SS7 or C7) is a global standard for telecommunications. In the past the SS7 standard has defined the procedures and protocol by which network elements in the public switched telephone network (PSTN) exchange information over a digital signaling network to affect wireless and wireline call setup, routing, control, services, enhanced features and secure communications. Such systems and standards can be utilized to implement wireless network 152 in support of venue customers, in accordance with the disclosed embodiments.

Improved operating systems and protocols allow Graphical User Interfaces (GUIs) to provide an environment that displays user options (e.g., graphical symbols, icons or photographs) on a wireless device's screen. Extensible Markup Language ("XML") is generally a currently available standard that performs as a universal language for data, making documents more interchangeable. XML allows information to be used in a variety of formats for different devices, including PCs, PDAs and web-enabled mobile phones.

XML enables documents to be exchanged even where the documents were created and/or are generally used by different software applications. XML can effectively enable one system to translate what another systems sends. As a result of data transfer improvements, wireless device GUIs can be utilized in accordance with a hand held device and wireless network 152, whether configured as a paging network or another network type, to render images on the hand held device that closely represent the imaging capabilities available on desktop computing devices.

Those skilled in the art can appreciate that the system and logical processes described herein relative to FIG. 11 to FIG. 17 are not limiting features of the disclosed embodiments. Rather, FIG. 11 to FIG. 17 provide examples of image-processing systems and logical processes that can be utilized in accordance with the disclosed embodiments. Such a system and logical processes represent one possible technique, which can be utilized in accordance with one or more embodiments of the disclosed embodiments to permit a user of a hand held device to manipulate video images viewable on a display screen of the hand held device. It can be appreciated by those skilled in the art that other types of image-processing systems and logical processes can be implemented in accordance with the methods and systems of the disclosed embodiments. FIGS. 11 to 17 are provided for edification purposes only and as one possible illustrative example of camera and image processing systems that can be utilized in accordance with the methods and systems of the disclosed embodiments.

Figure 11:
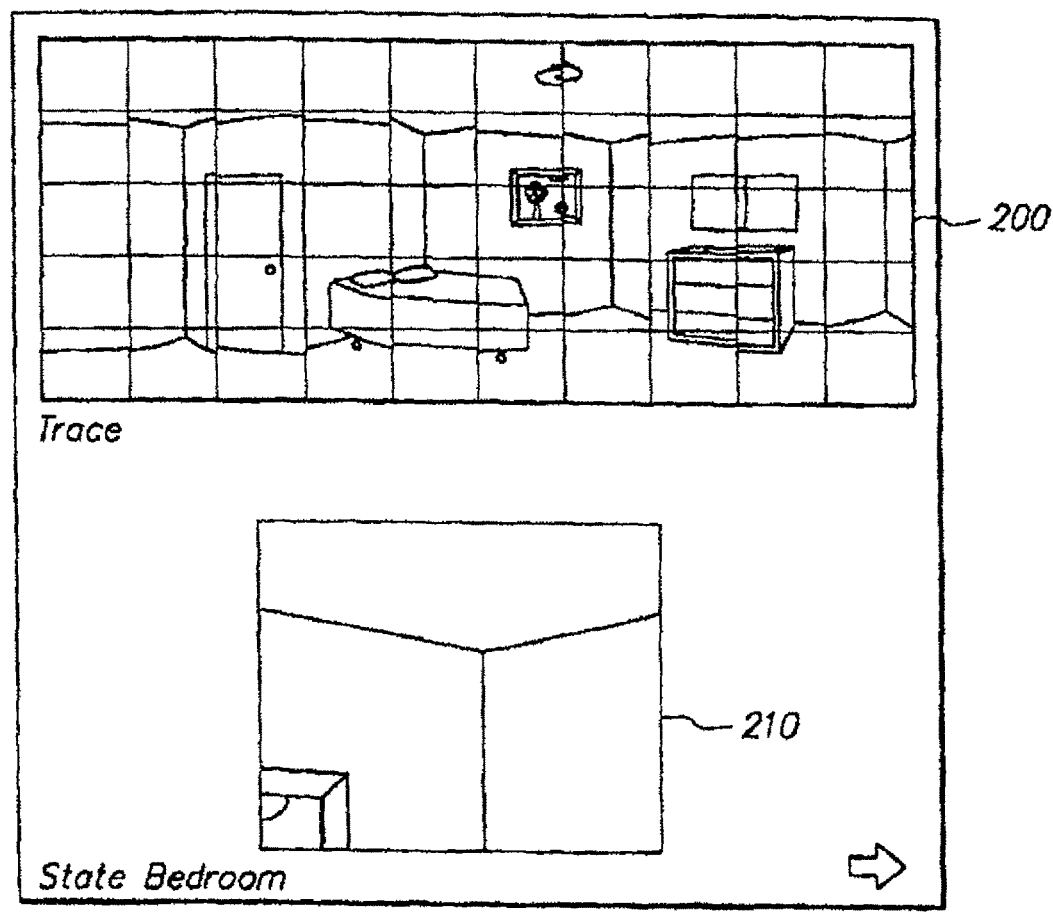
FIG. 11 depicts a prior art overview display and a detail window.
Figure 12:
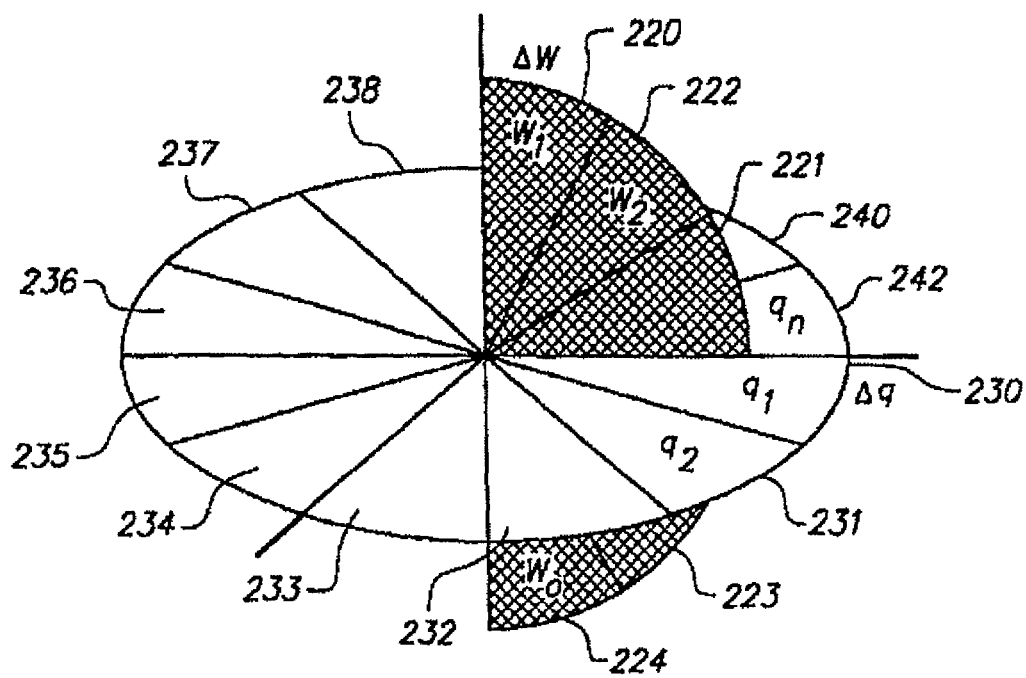
FIG. 12 illustrates a prior art spherical image space divided into a series of w rows and q columns, with the rows and columns representing individual frames as photographed from a video camera.

FIG. 11 thus illustrates a prior art overview display 200 and a detail window 210 that can be utilized with embodiments of the disclosed embodiments. The overview image display 200 is a view representative of a 360° rotation around a particular point in a space. While a complete rotational view can be utilized in accordance with the disclosed embodiments, one of ordinary skill in the computer arts will readily comprehend that a semi-circular pan (such as used with wide-angle cameras) or other sequence of images could be substituted for the 360 degree rotation without departing from the subject invention. The vantage point is generally where the camera was located as it panned the space. Usually the scene is captured in a spherical fashion as the camera pans around the space in a series of rows as depicted in FIG. 12. The space is divided into w rows 220-224 and q columns 230-242 with each q representing another single frame as shown in FIG. 12.

Figure 13:
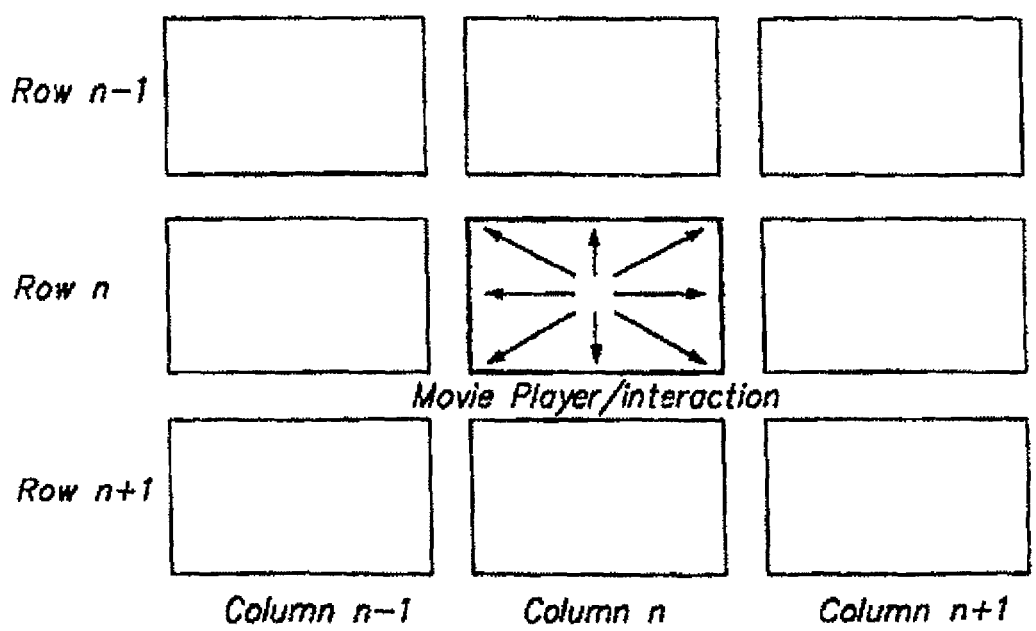
FIG. 13 depicts the two-dimensional representation of the spherical image space of FIG. 12 into rows and columns of image frames.

User control over the scene (e.g., rotation, pan, zoom) can be provided by pressing a touch screen display icon or moving a cursor displayed on a display screen of a hand held device, such as the hand held devices described herein. User control over the scene can also be provided by manipulating external user controls integrated with a hand held device (e.g., user controls 44 and 54 of FIG. 2 and FIG. 3). Movement from a frame in the overview image display to another frame is in one of eight directions as shown in FIG. 13. The user can interact with the video representation of the space one frame at a time. Each individual frame is an image of one of the pictures taken to capture the space as discussed above. The individual frames can be pieced together.

Interacting with a video one frame at a time results in the ability to present a detailed view of the space. The user can experience the overview image display as it unfolds a single frame at a time. In a venue application, a user can chose to view different sections of a larger area by browsing to a particular area are provided. The area chosen can be at a high resolution allowing for the user to zoom in and out of the section.

Another limitation of a simple overview viewer is that there is no random access means. The frames can only be viewed sequentially as the overview image display is unfolded. As adapted for use in accordance with the disclosed embodiments, this problem has been overcome by providing tools to browse, randomly select and trace selected images associated with any overview image.

Figure 14:
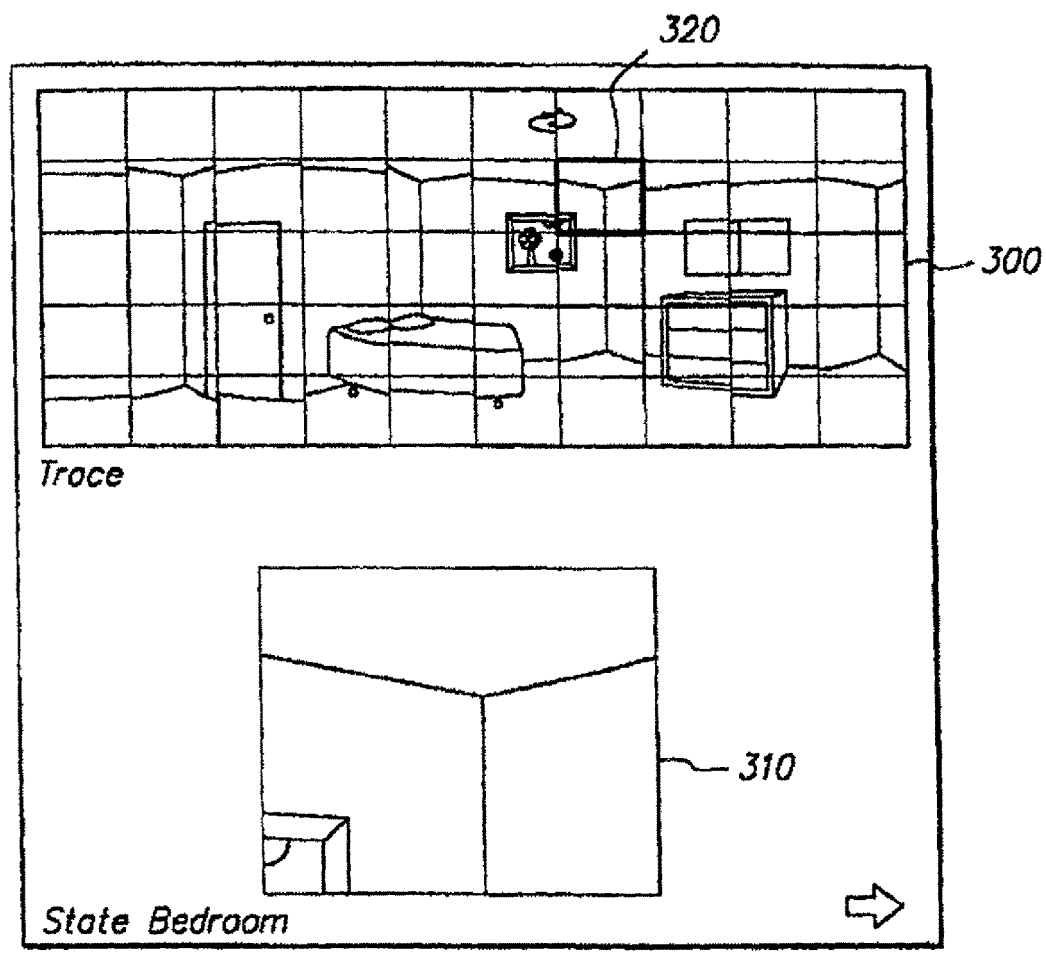
FIG. 14 illustrates a prior art overview display, a detail window and a corresponding area indicia (geometric figure outline)

FIG. 14 illustrates a prior art overview image 300, a detail window 310 and a corresponding area indicia, in this case a geometric figure outline 320. The detail window 310 corresponds to an enlarged image associated with the area bounded by the geometric figure outline 320 in the overview image 300. As the cursor is moved, the location within the overview image 300 can be highlighted utilizing the geometric figure outline 320 to clearly convey what location the detail window 310 corresponds to.

One of ordinary skill in the computer arts will readily comprehend that reverse videoing the area instead of enclosing it with a geometric figure would work equally well. Differentiating the area with color could also be used without departing from the invention. A user can select any position within the overview image, press the cursor selection device's button (for example, user controls in the form of touch screen user interface buttons or icons), and an enlarged image corresponding to the particular area in the overview display is presented in the detail window 310. Thus, random access of particular frames corresponding to the overview image can be provided.

Figure 15:
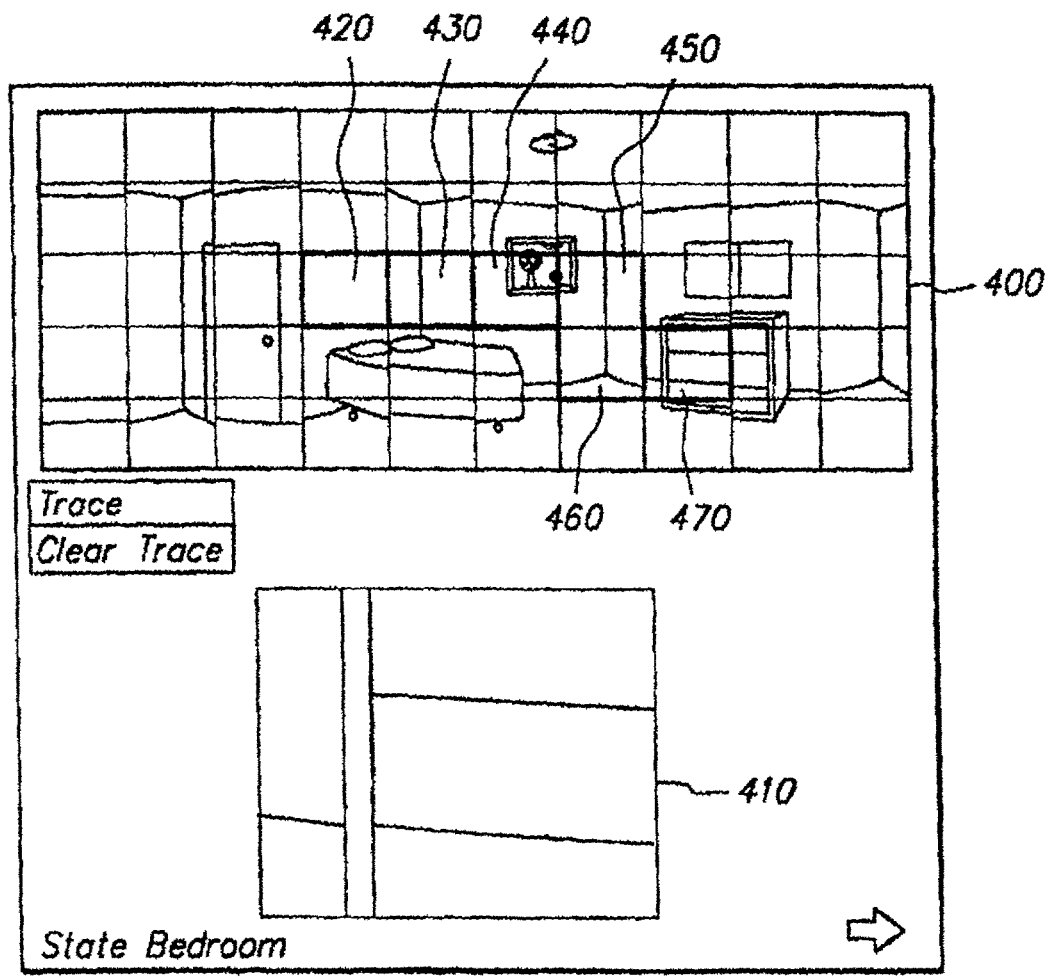
FIG. 15 depicts a prior art series of saved geometric figure outlines corresponding to user selections in tracing through an overview image display for subsequent playback, which can be utilized in accordance with the disclosed embodiments.

FIG. 15 illustrates a prior art series of saved geometric figure outlines corresponding to user selections in tracing through an overview display for subsequent playback. The overview image 400 has a detail window 410 with an enlarged image of the last location selected in the overview image 470. Each of the other cursor locations traversed in the overview image 420, 430, 440, 450 and 460 are also enclosed by an outline of a geometric figure to present a trace to the user.

Each of the cursor locations can be saved, and because each corresponds to a particular frame of the overview image, the trace of frames can be replayed at a subsequent time to allow another user to review the frames and experience a similar presentation. Locations in the detailed window and the overview image can also be selected to present other images associated with the image area, but not necessarily formed from the original image.

For example, a china teacup can appear as a dot in a china cabinet, but when the dot is selected, a detailed image rendering of the china teacup could appear in the detailed window. Moreover, a closed door appearing in an image could be selected and result in a detailed image of a room located behind the door even if the room was not visible in the previous image. Finally, areas in the detailed window can also be selected to enable further images associated with the detailed window to be revealed. Details of objects within a scene are also dependent on resolution capabilities of a camera. Cameras having appropriate resolution and/or image processing capabilities are preferably used in accordance with certain aspects of the disclosed embodiments.

The overview image was created as discussed above. To assist one of ordinary skill in the art to make and use the invention, a more detailed discussion of the necessary processing is presented below with reference to FIG. 16 and FIG. 17 herein.

Figure 16:
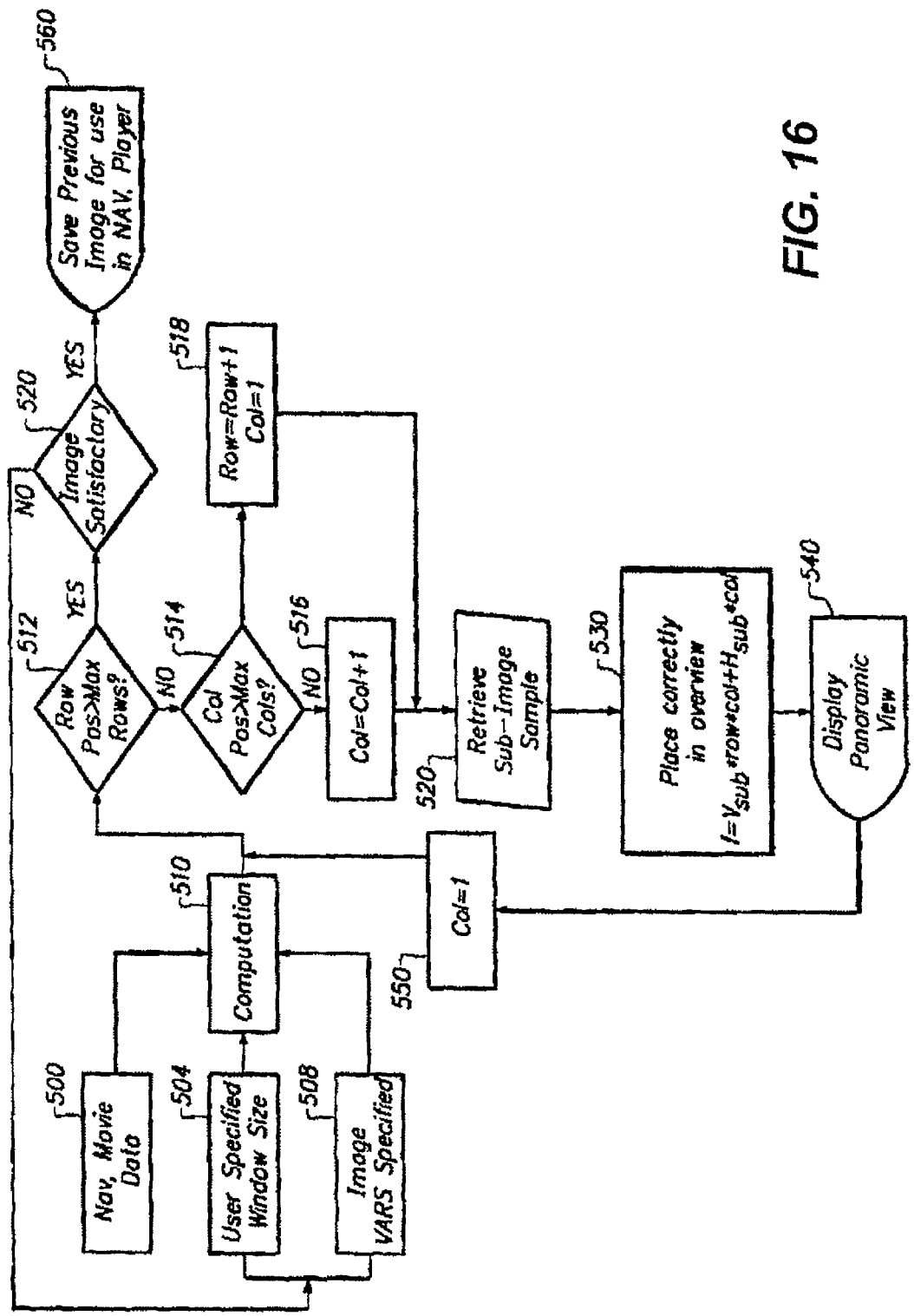
FIG. 16 is a prior art flowchart providing a logical process for building an overview image, which can be utilized in accordance with the disclosed embodiments.

FIG. 16 depicts a prior art flowchart providing a logical process for building an overview image display. Such a logical process can be utilized in accordance with the disclosed embodiments, but is not a necessary feature of the disclosed embodiments. Those skilled in the art will appreciate that such a logical process is merely an example of one type of image-processing algorithm that can be employed by an embodiment. For example, such a logical process can be implemented as a routine or subroutine that runs via image-processing unit 35 of FIG. 1 in a hand held device. Those skilled in the art can appreciate that the logical process described with relation to FIGS. 16 and 17 herein are not limiting features of the disclosed embodiments.

Such logical processes, rather, are merely one of many such processes that can be utilized to permit a user to manipulate video images displayed via a display screen of a hand held device. Navigable movie/video data in the form of images input to the hand held device to form individual images can be thus processed, as illustrated at function block 500. User specified window size (horizontal dimension and vertical dimension) can be entered, as illustrated at function block 504.

Image variables can be specified (horizontal sub-sampling rate, vertical sub-sampling rate, horizontal and vertical overlap of individual frame images, and horizontal and vertical clip (the number of pixels are clipped from a particular frame in the x and y plane)), as depicted at function block 508. Function blocks 500,504 and 508 are fed into the computation function block 510 where the individual frames are scaled for each row and column, and the row and column variables are each initialized to one.

Then a nested loop can be invoked to create the overview image. First, as indicated at decision block 512, a test is performed to determine if the maximum number of rows has been exceeded. If so, then the overview image is tested to determine if its quality is satisfactory at decision block 520. If the quality is insufficient, the user can be provided with an opportunity to adjust the initial variables, as illustrated at function blocks 504 and 508. The processing is then repeated. If, however, the image is of sufficient quality, it can be saved and displayed for use, as depicted at block 560.

If the maximum rows have not been exceeded as detected in decision block 512, then another test can be performed, as illustrated at decision block 514, to determine if the column maximum has been exceeded. If so, then the row variable can be incremented and the column variable can be reset to one at function block 518 and control flows to input block 520. If the column maximum has not been exceeded, then the column variable can be incremented and the sub-image sample frame can be retrieved, as depicted at input block 520. Then, as illustrated at function block 530, the frame can be inserted correctly in the overview image.

The frame can be inserted at the location corresponding to (Vsub*row*col)+Hsub*col; where row and col refer to the variables incremented in the nested loop, and Vsub and Hsub are user specified variables corresponding to the horizontal and vertical sub sampling rate. Finally, the incremental overview image can be displayed based on the newly inserted frame as depicted at display block 540. Thereafter, the column variable can be reset to one and processing can be passed to decision block 512.

A computer system corresponding to the prior art method and system depicted in FIGS. 11 to 17 can be generally interactive. A user can guess at some set of parameters, build the overview image, and decide if the image is satisfactory. If the image is not satisfactory, then variables can be adjusted and the image is recreated. This process can be repeated until a satisfactory image results, which can be saved with its associated parameters. The picture and the parameters can be then input to the next set of logic.

Such features may or may not be present with the hand held device itself. For example, images can be transmitted from a transmitter, such as data transmitter 112 of FIG. 7, and subroutines or routines present within the server itself can utilize predetermined sets of parameters to build the overview image and determine if the image is satisfactory, generally at the request of the hand held device user. A satisfactory image can be then transmitted to the hand held device. Alternatively, image-processing routines present within an image-processing unit integrated with the hand held device can operate in association with routines present within the server to determine if the image is satisfactory, and/or to manipulate the image (e.g., pan, zoom).

Figure 17:
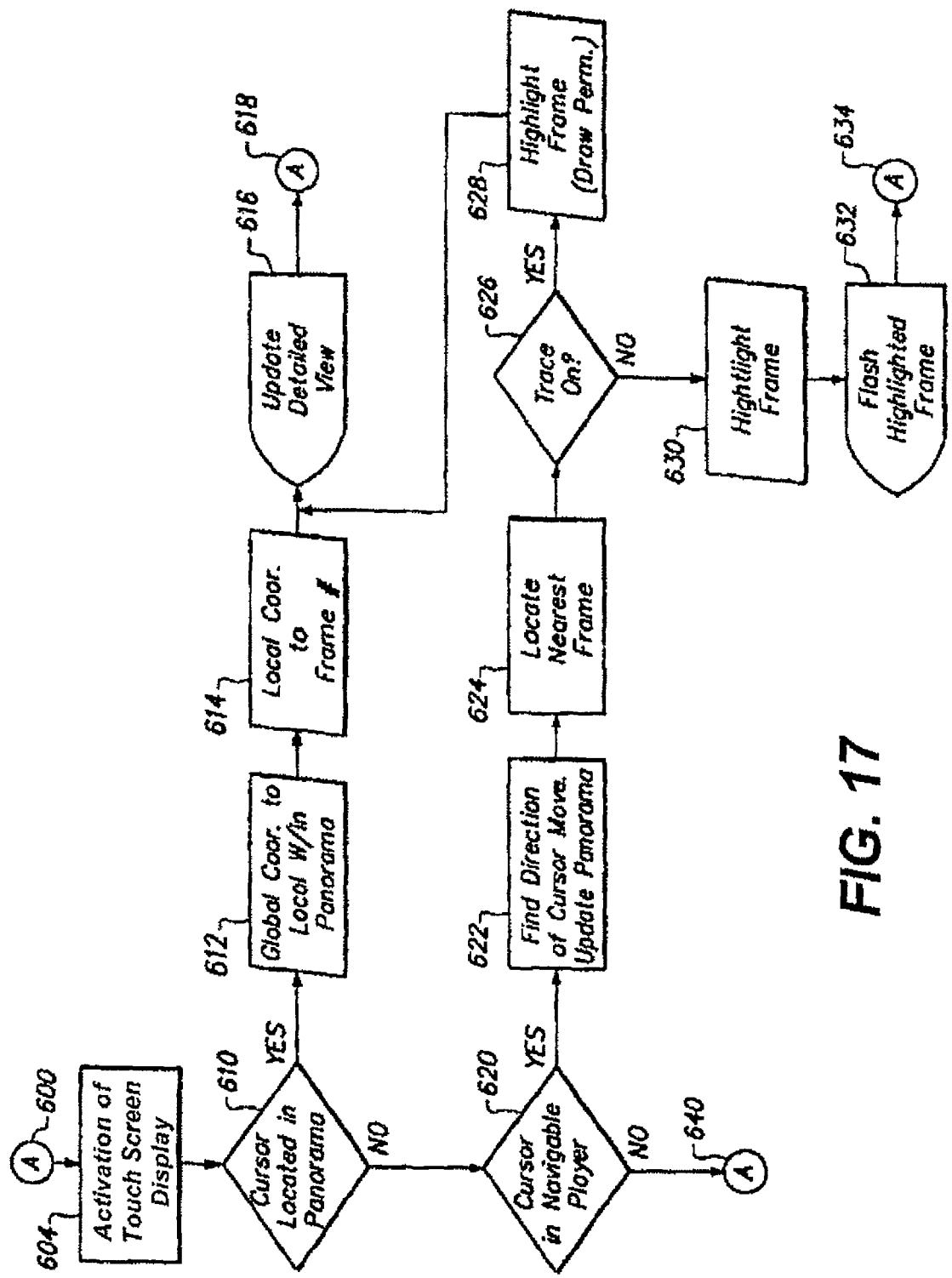
FIG. 17 illustrates a prior art flowchart illustrative of a logical process for playback interaction, which can be utilized in accordance with the disclosed embodiments.

FIG. 17 depicts a prior art flowchart illustrative of a logical process for playback interaction. The logical process illustrated in FIG. 17 can be utilized in accordance with the disclosed embodiments. Playback interaction can commence, as illustrated at label 600, which immediately flows into function block 604 to detect if user controls have been activated at the hand held device. Such user controls can be configured as external user controls on the hand held device itself (e.g., buttons, etc.), or via a touch screen user interface integrated with hand held device display screen.

When a touch screen user input or user control button press is detected, a test can be performed to determine if a cursor is positioned in the overview portion of the display. If so, then the global coordinates can be converted to overview image coordinates local to the overview image as shown in output block 612. The local coordinates can be subsequently converted into a particular frame number as shown in output block 614. Then, the overview image is updated by displaying the frame associated with the particular location in the overview image and control flows via label 600 to function block 604 to await the next button press.

If the cursor is not detected in the overview image as illustrated at decision block 610, then another test can be performed, as indicated at decision block 620, to determine if the cursor is located in the navigable player (detail window). If not, then control can be passed back via label 600 to function block 604 to await the next user input. However, if the cursor is located in the detail window, then as depicted a function block 622, the direction of cursor movement can be detected. As depicted at function block 624, the nearest frame can be located, and as illustrated at decision block 626, trace mode can be tested.

If trace is on, then a geometric figure can be displayed at the location corresponding to the new cursor location in the overview image. The overview image can be then updated, and control can be passed back to await the next user input via user controls at the hand held device and/or a touch screen user interface integrated with the hand held device. If trace is not on, the particular frame is still highlighted as shown in function block 630, and the highlight can be flashed on the overview image as illustrated at output block 632. Thereafter, control can be returned to await the next user input.

Although the aforementioned logical processes describe the use of a cursor as a means for detecting locations in a panorama, those skilled in the art can appreciate that other detection and tracking mechanisms can be utilized, such as, for example, the pressing of a particular area within a touch screen display.

Figure 18:
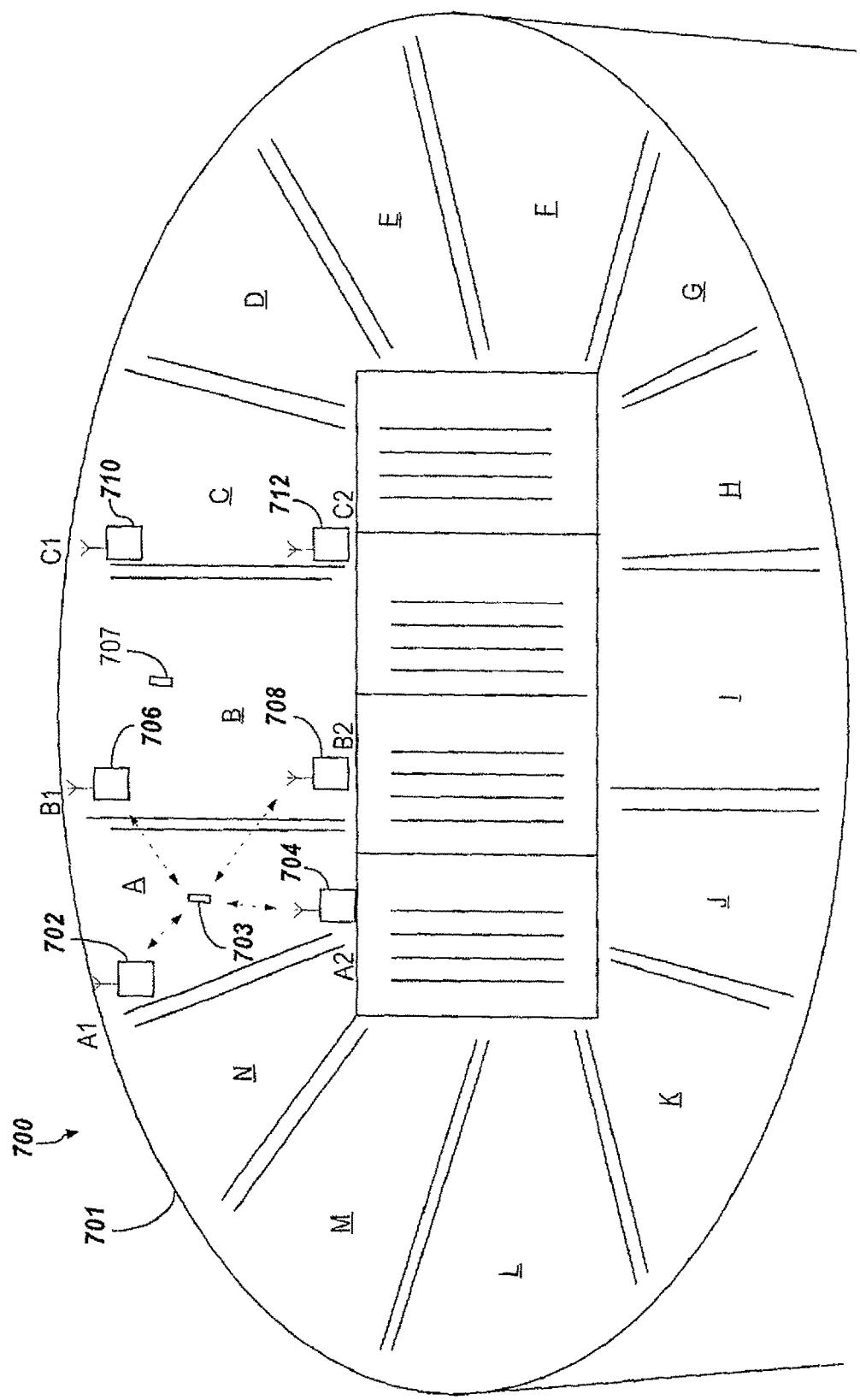
FIG. 18 depicts a pictorial representation illustrative of a Venue Positioning System (VPS) in accordance with the disclosed embodiments.

FIG. 18 depicts a pictorial representation illustrative of a Venue Positioning System (VPS) 700 in accordance with the disclosed embodiments. FIG. 18 illustrates a stadium venue 701, which is divided according to seats and sections. Stadium venue 701 can be utilized for sports activities, concert activities, political rallies, or other venue activities. Stadium venue 701 is divided, for example, into a variety of seating sections A to N. For purposes of simplifying this discussion, VPS 700 is described in the context of sections A to C only.

A venue positioning system (VPS) device 704 is positioned in section A of stadium venue 701, as indicated at position A2. A VPS device 702 is located within section A at position A1. In the illustration of FIG. 18, it is assumed that VPS device 702 is located at the top of a staircase, while VPS device 704 is located at the bottom of the staircase, and therefore at the bottom of section A, near the sports field 711. A VPS device 706 is located near the top of section B at position B1. A VPS device 708 is located at the bottom of section B at position B2, near sports field 711. Similarly, in section C, venue-positioning devices 710 and 712 are respectively located at positions C1 and C2.

A hand held device 703 can be located at a seat within section A. For purposes of this discussion, and by way of example only, it is assumed that hand held device 703 is being operated by a stadium attendee watching a sporting event or other venue activity taking place on sports field 711. A hand held device 707 is located within section B. Hand held device 707, by way of example, can also be operated by a concessionaire or venue employee.

If the user of hand held device 703 desires to order a soda, hot dog, or other product or service offered by venue operators during the venue event, the user merely presses an associated button displayed via a touch screen user interface integrated with the hand held device. A signal is transmitted by hand held device 703, in response to the user input to/through the VPS device, wireless network or wireless gateway as previously described. One or more of VPS devices 702, 704, 706, and 708 can detect the signal. The VPS devices can also operate merely as transponders, in which case hand held devices will be able to determine their approximate location within the venue and then transmit position information through wireless means to, for example, concession personnel.

VPS devices 702, 704, 706, and 708 function in concert with one another to determine the location of hand held device 703 within section A. Triangulation methods, for example, can be used through the hand held device or VPS devices to determine the location of the hand held device within the venue. This information is then transmitted by one or more of such VPS devices either directly to hand held device 707 or initially through a wireless network, including a wireless gateway and associated server, and then to hand held device 707. The user of hand held device 707 then can directly proceed to the location of hand held device 703 to offer concession services.

Additionally, hand held device 703 can be configured with a venue menu or merchandise list. In response to requesting a particular item from the menu or merchandise list, the request can be transmitted as wireless data from hand held device 703 through the wireless network to hand held device 707 (or directly to a controller (not shown) of hand held device 707) so that the user (concession employee) of hand held device 707 can respond to the customer request and proceed directly to the location of hand held device 703 used by a customer.

Figure 19:
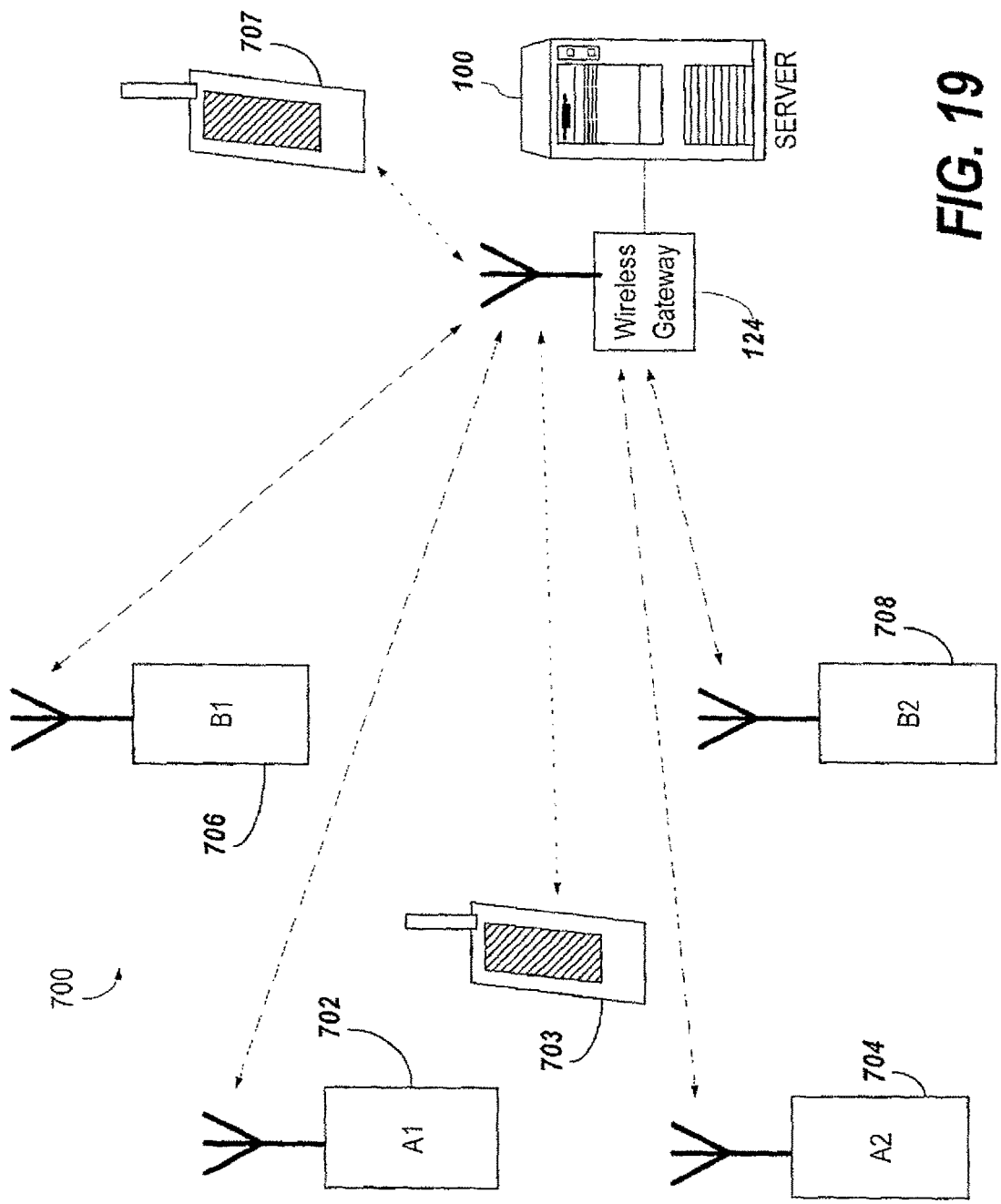
FIG. 19 illustrates in greater detail the Venue Positioning System (VPS) of FIG. 18 in accordance with the disclosed embodiments.

FIG. 19 illustrates in greater detail the VPS 700 of FIG. 18, in accordance with the disclosed embodiments. In FIG. 18 and FIG. 19 like or analogous parts are indicated by identical reference numerals, unless otherwise stated. Additionally wireless gateway 124 and server 100 of FIG. 19 are analogous to the wireless gateway 124 and server 100 illustrated in FIG. 8. Venue positioning units 702, 704, 706, and 708 are located within section A and section B. A wireless gateway 124 is linked to server 100. Wireless gateway 124 can communicate with hand held device 707 and hand held device 703.

Wireless gateway 124 can also communicate with VPS devices 702, 704, 706, and 708 if the VPS devices are also operating as data communication devices in addition to providing mere transponder capabilities. When VPS devices 702, 704, 706, and 708 detect the location of hand held device 703 within stadium venue 701, the location is transmitted to wireless gateway 124 and thereafter to hand held device 703. It should be appreciated that a hand held device user can also identify his/her location in a venue by entering location information (e.g., seat/section/row) on the hand held device when making a request to a service provider such as a food concession operation. The VPS devices will still be useful to help concession management locate concession employees located within the venue that are in closest proximity to the hand held device user. A wireless gateway 124 and server 100 can be associated with a wireless network implemented in association with stadium venue 701. Those skilled in the art will appreciate that such a wireless network can be limited geographically to the stadium venue 701 itself and the immediate surrounding area. An example of such a wireless network, as described previously is a Bluetooth based wireless network.

The hand held devices themselves can be proprietary devices owned by promoters or operators of stadium venue 701 and rented to patrons for their use while attending a venue activity. Proprietary devices will generally be manufactured using durable materials (e.g., similar to those materials used on field technician digital multimeters/devices such as the Fluke™ line of electronic devices). Proprietary devices will also be limited in hardware and software modules (i.e., software routines/subroutines) needed for communication with the venue system in order to display venue activities to temporary users.

Hand held devices can also be owned by the patrons themselves that they bring into the stadium venue for their use by permission of the venue promoter or stadium owners in return for the payment of a fee by the patron. In return for the fee, the venue promoter or stadium owner can provide the patron with a temporary code, which permits them to access, the wireless transmissions network and associated with the venue itself, such as wireless network 152 described herein. Patron-owned devices can utilize modules (e.g., smart card technology to receive authorization (e.g., frequency or codes) needed to receive venue—provided video/data. Authorization can also be transferred to the patron-owned device via IR or short-range RF means. Wireless network 152 described herein can be configured as a proprietary wireless Intranet/Internet providing other data accessible by patrons through their hand held devices.

Figure 20:
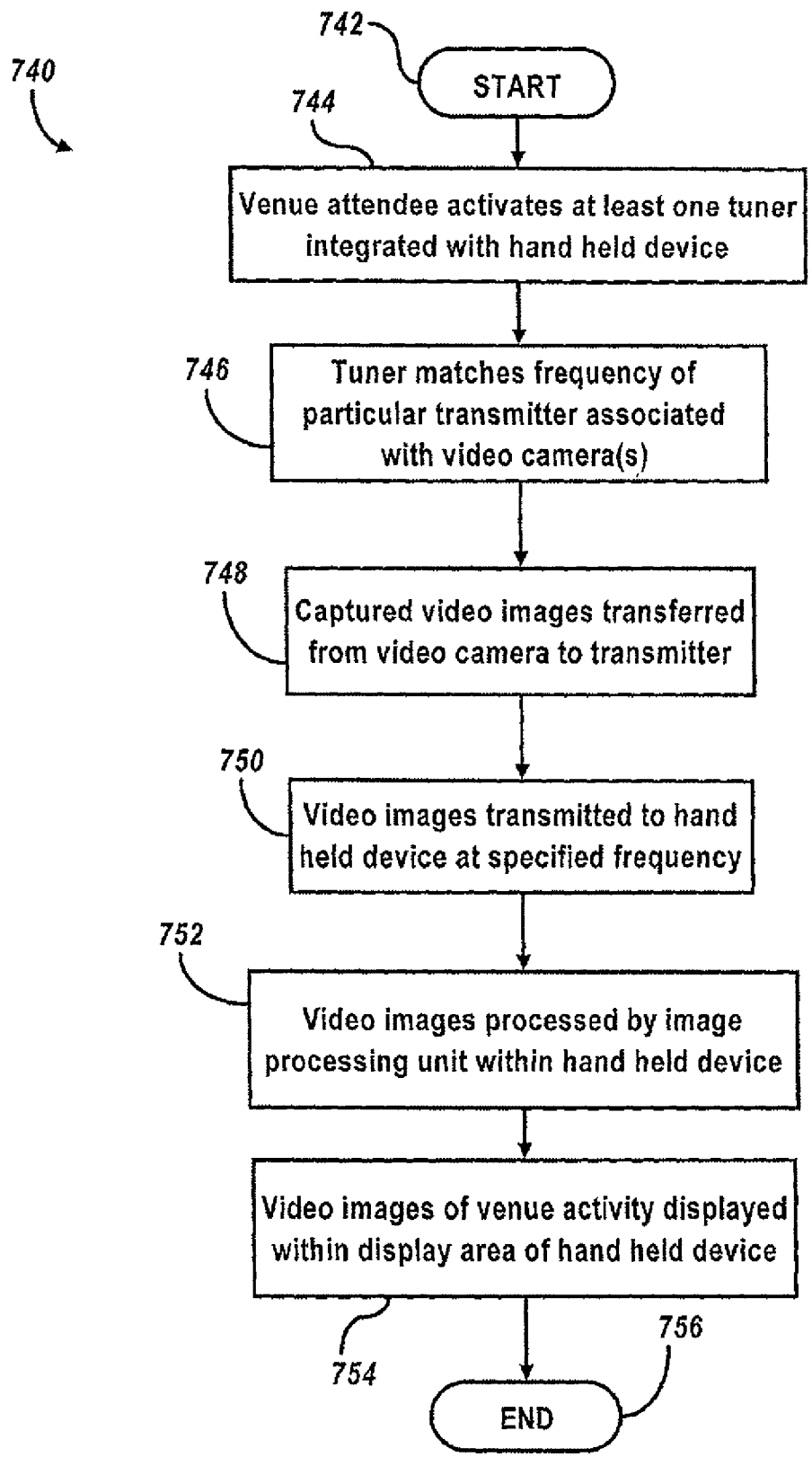
FIG. 20 depicts a flowchart of operations illustrative of a method for providing multiple venue activities through a hand held device in accordance with the disclosed embodiments.

FIG. 20 depicts a flowchart of operations 740 illustrative of a method for providing multiple venue activities through a hand held device, in accordance with the disclosed embodiments. The process is initiated, as depicted at block 742. As illustrated next at block 744, a venue attendee can activate at least one hand held tuner integrated with a hand held device, such as the hand held device illustrated in FIG. 4. At least one tuner can be integrated with the hand held device, although more than one tuner (or other simultaneous signal receiving capability) can be used within a hand held device in support of other embodiments of the invention previously described.

The tuner, or tuners, is/are associated with a transmission frequency/frequencies of a transmitter that can be linked to a particular camera/cameras focusing on a venue activity, or to a wireless gateway or wireless network transmission. To view images from a particular angle, the user can retrieve the video images from the camera associated with that particular perspective. The user can have to adjust a tuner until the right frequency/image is matched, as indicated at block 756. As illustrated at block 748, captured video images are transferred from the video camera to the transmitter associated with the camera, or a server in control of the camera(s). Video images are thus generally transmitted to the hand held device at the specified frequency, either in response to a user request at the hand held device, as depicted at block 750 or as a broadcast.

An image-processing unit integrated with the hand held device, as illustrated at block 752 can process transferred video images. An example of such an image-processing unit is image-processing unit 35 of FIG. 1. As indicated thereafter at block 754, the video images of the venue activity captured by the video camera can be displayed within a display area of the hand held device, such as display 18 of FIG. 1. The process can then terminate, as illustrated at block 756 when the user no longer desires to view the perspective.

Figure 21:
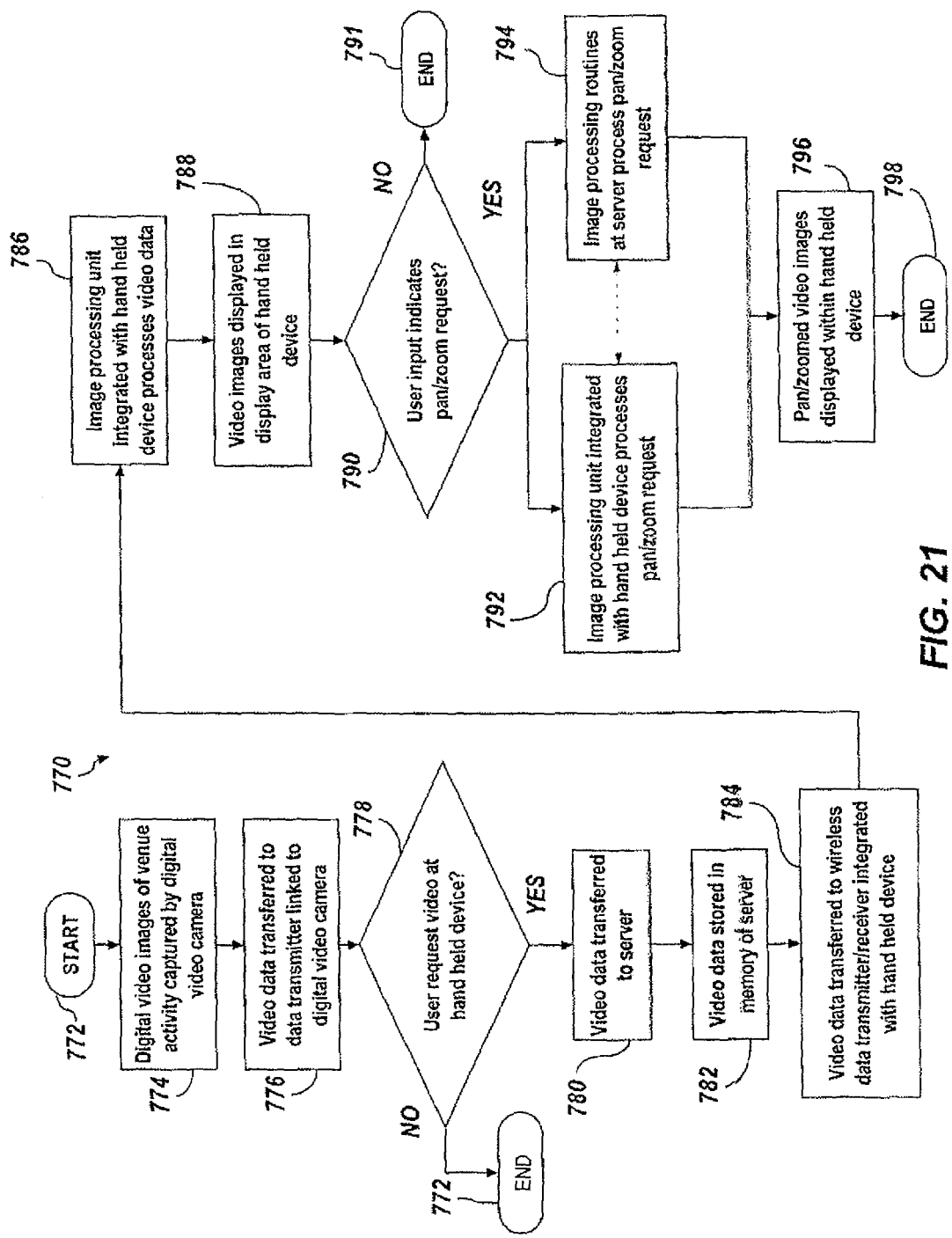
FIG. 21 illustrates a flowchart of operations illustrative of a method for providing multiple venue activities through a hand held device from one or more digital video cameras in accordance with the disclosed embodiments.

FIG. 21 illustrates a flowchart of operations 770 illustrative of a method for providing multiple venue activities through a hand held device from one or more digital video cameras, in accordance with the disclosed embodiments. When a user of a hand held device can interact with the venue system, as indicated at block 772, the process is initiated. As illustrated next at block 774, video images of a venue activity can be captured by one or more digital video cameras.

Such digital video cameras can be panoramic/wide-angle in nature and/or configured as high definition/resolution video cameras, well known in the art. The video camera or cameras can be respectively linked to data transmitters, such as data transmitters 102, 104, 106, and/or 108 of FIG. 5 or data transmitter 112 of FIG. 6 to FIG. 9 herein. As depicted next at decision block 778, if a user does not request a view of the venue activity through the hand held device, the process terminates (i.e., with respect to that use), as illustrated thereafter at block 779.

If, as illustrated at decision block 778, the user can request a view of the venue activity through the hand held device, then as described thereafter at block 780, video data can be transferred from a data transmitter to a server, such as server 100 of FIG. 5 to FIG. 8 herein. The video data can be stored in a memory location of the server or a plurality of servers, as indicated at block 782. The video data can be then transferred to a wireless data transmitter/receiver integrated with the hand held device, as indicated at block 784.

As illustrated thereafter at block 786, the video data can be processed by an image-processing unit and associated image-processing routines and/or subroutines integrated with the hand held device. When image processing is complete, the video images can be displayed in a display area of the hand held device. As illustrated next at block 790, if a user chooses to pan/zoom for a better view of the video images displayed within the hand held device, then two possible operations can follow, either separately or in association with one another.

The image-processing unit integrated with the hand held device can process a user's pan/zoom request, as illustrated at block 792. Alternatively, image-processing routines and/or subroutines resident at the server or a plurality of servers can process the user's pan/zoom request, following the transmission of the user's request from the hand held device to the server or plurality of servers. Such a request can be transmitted through a wireless gateway linked to the server or servers.

Image processing can occur at the server or servers if the hand held device is not capable of directly processing the video data and video images thereof due to low memory or slow CPU allocation. Likewise, some image-processing can take place within the hand held device, while video image-processing requiring faster processing capabilities and increased memory can take place additionally at the server or servers to assist in the final image representation displayed at the hand held device.

When image processing is complete, the pan/zoomed images can be displayed within a display screen or display area of the hand held device, as illustrated thereafter at block 796. The process then terminates, as depicted at block 798. If the user does not request pan/zoom, as indicated at block 790, the process can then terminate, as described at block 791.

Figure 22:
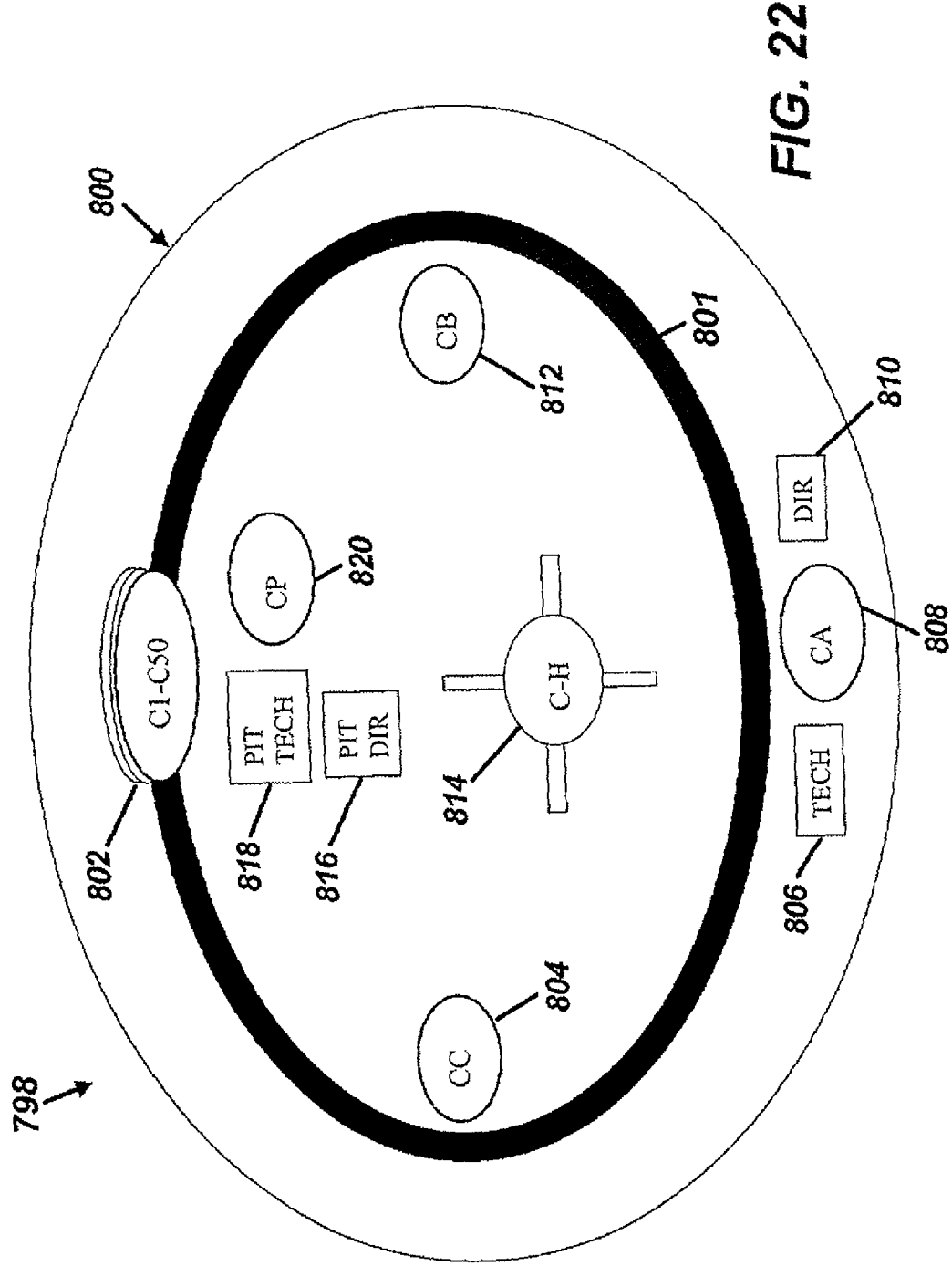
FIG. 22 depicts a block diagram illustrative of a racetrack deployment, which can be implemented in accordance with the disclosed embodiments.

FIG. 22 depicts a block diagram 798 illustrative of a racetrack deployment of multimedia solutions, which can be implemented in accordance with the disclosed embodiments. Generally, a racetrack 801 can be configured within a racing venue or racing stadium. An example of a racetrack in which an embodiment can be implemented is a NAS-CAR® racing stadium. NASCAR® is a registered trademark of the National Association for Stock Car Auto Racing, Inc., P.O. Box 2875, Daytona Beach, Fla. 32120-2875.

Vehicle "in-play" cameras can be located within vehicles C1 to C50, as indicated at block 802. Such in-play cameras can provide data wireless through communication means already discussed herein. Note that as utilized herein, the term "in-play camera" generally refers to a camera, which is located within the action or proximate to the action of a venue activity. The term "in-play camera view" as utilized herein generally refers to one or more views captured via an in-play camera or other cameras for transmission to hand held devices and/or enterprise communication equipment. Thus, an in-play camera view can not necessarily be restricted to views captured only from in-play cameras. An in-play camera view can also be a view captured from a stationary camera. It is understood that the term "camera" as utilized herein can refer to a variety of types of cameras, including digital video recorders, camcorders, panoramic cameras, uniview (i.e., universal view) cameras, and so forth.

Figure 23:
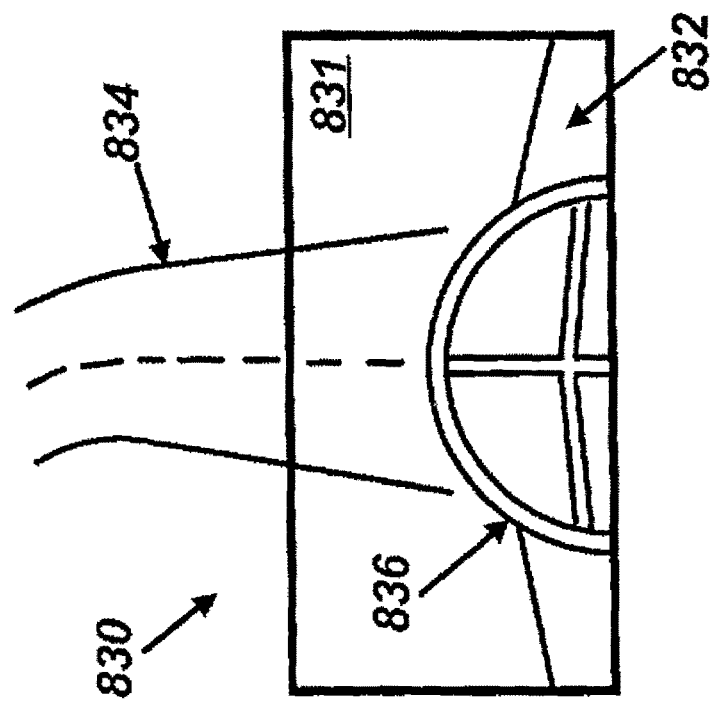
FIG. 23 illustrates a pictorial diagram of an in-play camera view of a racetrack deployment, which can be implemented in accordance with the disclosed embodiments.

A main camera perspective can be provided by camera 808 (i.e., CA). A first turn perspective can be provided by camera 812 (i.e., CB). Additionally, a second turn perspective can be provided by camera 804 (i.e., CC). A PIT camera 820 (i.e., CP) can also provide a racing pit perspective. A helicopter camera 814 (i.e., C-H) can also be positioned within a helicopter flaying above stadium 800. A system technician 806 (i.e., TECH) can work in concert with a director 810 (i.e., DIR). Director 810 is generally a media/technical director. A pit technician 818 (i.e., PIT TECH) can be located near a bit director 816 (i.e., PIT DIR). The following index summarizes the roles of various cameras and individuals indicated in FIG. 22:

C1-C50—Vehicle "In-play" Cameras
CA—Main Camera Perspective
CB—First Turn Perspective
CC—Second Turn Perspective
CP—PIT Camera
C-H—Helicopter Camera
TECH—System technician
PIT TECH—Pit technician
DIR—Media/Technical Director
PIT DIR—Pit Director FIG. 23 illustrates a pictorial diagram 830 of an in-play camera view of a racetrack deployment, which can be implemented in accordance with the disclosed embodiments. Such an in-play camera view can be obtained from a camera located within a racing car within stadium 800 of FIG. 22. Examples of such racing cars are illustrated in FIG. 22 at block 802 (i.e., racing cars C1 to C50). As depicted in FIG. 23, the driver of a racing car can view a racing track 834 (i.e., a view of track 801 of FIG. 22) through a car window 831. The driver can generally view a racing car dashboard 832 and steering wheel 836. Such a view can be broadcast real-time via a camera located within the racing car. Such a view can be broadcast real-time and transmitted from the camera located within the racing car through a wireless communications network to a hand held device 838, which is illustrated in FIG. 24.

Figure 24:
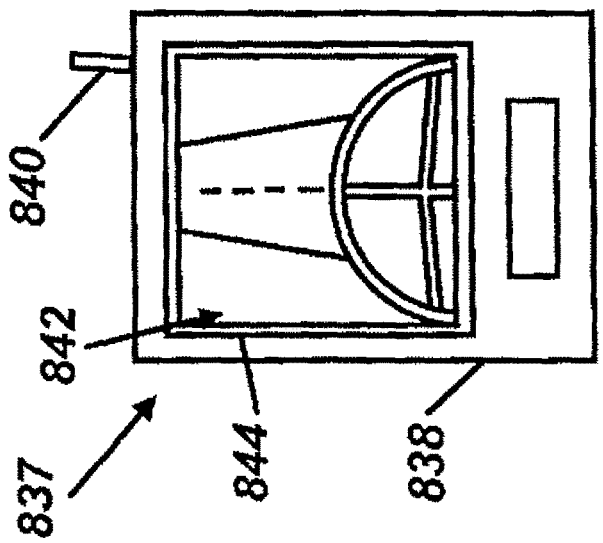
FIG. 24 depicts a pictorial view of a hand held device and a display area having an in-play view of the racetrack deployment indicated in FIG. 23, in accordance with the disclosed embodiments.

FIG. 24 depicts a pictorial view 837 of hand held device 838 and a display area 844 having an in-play view of the racetrack deployment indicated in FIG. 23, in accordance with the disclosed embodiments. Hand held device 838 is analogous to hand held devices illustrated in FIGS. 2 and 3 herein. Hand held device 838 of FIG. 24 is also analogous to hand held device 60 of FIGS. 4 to 9 herein. Hand held device 838 can receive and transmit data to and from a wireless communications network, such as, for example, network 152, which is depicted in FIG. 10 herein. Thus, the in-play camera view obtained from racing cameras, such as indicated in FIG. 23, can be transmitted through a wireless communications network real-time to hand held device 838 and displayed on display area 844 for a user of the hand held device 838 to view.

Hand held device 838 also generally includes an antenna 840. Those skilled in the art can appreciate that antenna 840 can be integrated within hand held device 838 and is presented as an external attachment or appendage to hand held device 838 for illustrative purposes only. View 842 displayed within display area 844 can thus be obtained from a camera positioned within a racing car, as indicated in FIGS. 22 and 23. Hand held device 838 can be configured to include video recording capabilities. Thus, a user of hand held device 838 may desire to record a view obtained by a camera (e.g., cameras illustrated in FIG. 22).

Thus, in-play camera views can be wirelessly transmitted from at least one in-play camera located at an in-play location within a venue (e.g., a racing venue) to enterprise equipment, wherein the views can then be processed for display on a display screen associated with the hand held device. It should be appreciated by those skilled in the art that camera views can also be transmitted for receipt directly by hand held devices. Thereafter, the in-play camera view can be displayed on the display screen, thereby enabling a user of the hand held device to view the in-play camera view through the hand held device.

Figure 25:
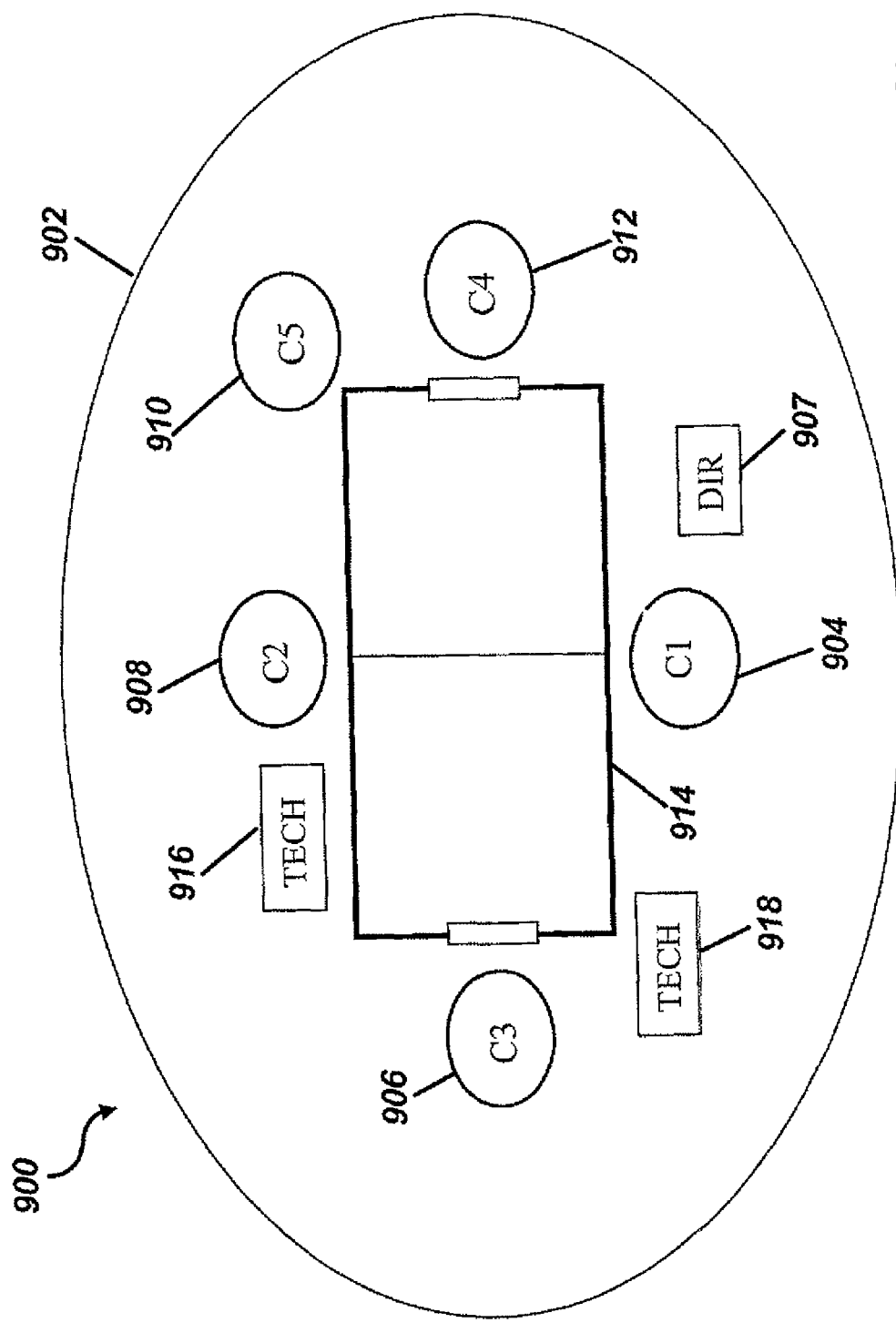
FIG. 25 illustrates a block diagram illustrative of a sports venue deployment, which can be implemented in accordance with an alternative embodiment.
Figure 26:
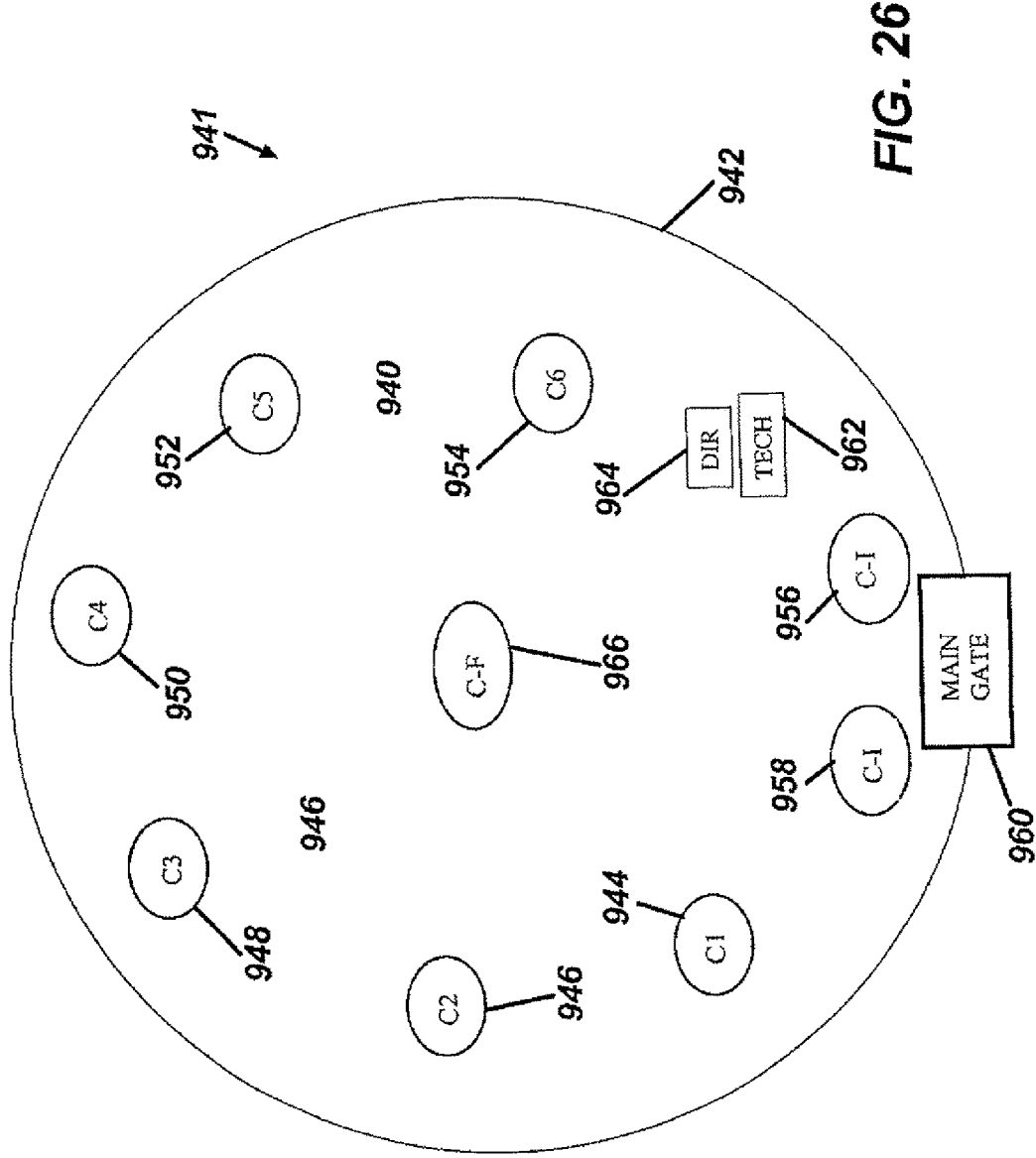
FIG. 26 depicts a block diagram illustrative of a village deployment, which can be implemented in accordance with an alternative embodiment.

The in-play camera view can be transmitted from enterprise equipment and/or at least one in-play camera to the hand held device in response to a particular user input and/or selection. In addition, a particular in-play camera view transmitted from at least one in-play camera can be recorded, in response to a particular user input. Such in-play camera views can also be stored in a memory associated with the hand held device or within storage media (e.g., a memory stick or memory disk or other storage media), in response to a particular input and/or selection. Although the in-play camera location can comprise, for example, a placement within at least one racing car competing within a racing venue, it should be appreciated form the foregoing disclosure that the in-play camera can be utilized in other venue related applications, such as, for example, horse racing, football, soccer, etc. For example, an in-play camera can be integrated with a helmet or other equipment associated with the activity. Video obtained from such in-play cameras FIG. 25 illustrates a block diagram 900 illustrative of a sports venue deployment, which can be implemented in accordance with the disclosed embodiments. A sports stadium 902 includes a playing field 914 about which various cameras can be positioned to obtain perspective video views for broadcast to wireless hand held devices located within the stadium or outside of the stadium. Camera 904 (i.e. C1) can provide a main center camera perspective. Camera 908 (i.e., C2) can provide an opposite center perspective (i.e., opposite camera 904). Camera 906 (i.e., C3) can provide a home team goal view. Camera 912 (i.e., C4) can provide a visiting team goal view. Camera 910 (i.e., C4) can provide a roaming "fan CAM" view. A systems technician 918 (i.e., TECH) can function in concert with a media/technical director (i.e., DIR) 907. Cameras C1 to C5 indicated in FIG. 25 thus generally can comprise in-play cameras. Video obtained from such in-play cameras can be transmitted from such in-play cameras for display on a display associated with a hand held device. The following generally summarizes the deployment illustrated in FIG. 25:

C1—Main Center Camera Perspective
C2—Opposite Center Perspective
C3—Home Team Goal View
C4—Visiting Team Goal View
C5—Roaming "Fan CAM"
TECH—System technicians
DIR—Media/Technical Director FIG. 26 depicts a block diagram 941 illustrative of a village 942 deployment, which can be implemented in accordance with an alternative embodiment of the present invention. An example of a "village" is an amusement park or entertainment complex. As illustrated in FIG. 26, cameras 944, 946. 948, 950, 952, and 954 (i.e., cameras C1 to C6) can provide activity/show perspectives. Cameras 958 and 956 (i.e., C-I) can provide INFO channels which can broadcast particular village information for display on a hand held device, such as, for example, hand held device 838 discussed earlier.

Village 42 can include a main gate 960 through which village attendees can pass prior to entry to village 942. One or more system technicians 962 (TECH) can be located within village 942 to work in concert with a media/technical director 964 (i.e., DIR). One or more roaming "Fan CAM" cameras 966 (i.e., Fan CAM) can also be located within village 942 to provide roaming video views which can be picked up by hand held devices in communication with a wireless communications network associated with village 941. Cameras C-1, C-F and C1 to C6 illustrated in FIG. 26 thus generally can comprise in-play cameras. Video obtained from such in-play cameras can be transmitted from such in-play cameras for display at one or more hand held devices. The following generally summarizes the deployment illustrated in FIG. 26:

C-I—INFO Channels
C1-C6—Activity/Show Perspectives
C-F—Roaming "Fan CAM"
TECH—System technicians
DIR—Media/Technical Director It can be appreciated that other examples of a venue that can be utilized in accordance with the disclosed embodiments is a casino. For example, if a patron of a casino desires to monitor a sports captioned sports event such as a boxing match at the casino sports book or sporting event area, the patron can be provided with a hand held device that will enable the patron to view selected sporting events through the hand held device while participating in other casino activities, such as gambling. It should be appreciated that an in-play camera can include video feed from sports book events. Thus, a casino is an example of a venue that can utilize the disclosed methods and for transmitting close captioned sporting events to roving casino patrons via hand held devices as described herein.

Additionally, based on the foregoing description it should be appreciated that hand held devices within a casino setting can be adapted to operate throughout a network of participating casino and other networked establishments therefore enabling broader roaming options to the casino patrons. It should further be appreciated that such a network can include wireless (e.g., cellular and/or satellite) capabilities. For example, U.S. Pat. No. 5,999,808 issued to LaDue on Dec. 7, 1999 describes a cellular radio system implemented within a casino environment and is hereby incorporated by reference. Note that the U.S. Pat. No. 5,999,808 is directed at wireless gaming methods, but not disclose video transmission capabilities. Finally, it should be appreciated that the VPS discussion disclosed herein can be applied in a casino venue in order to provide particular casino services (e.g., change/drink caddies to patrons) by pinpointing the patrons' VPS location.

Figure 27:
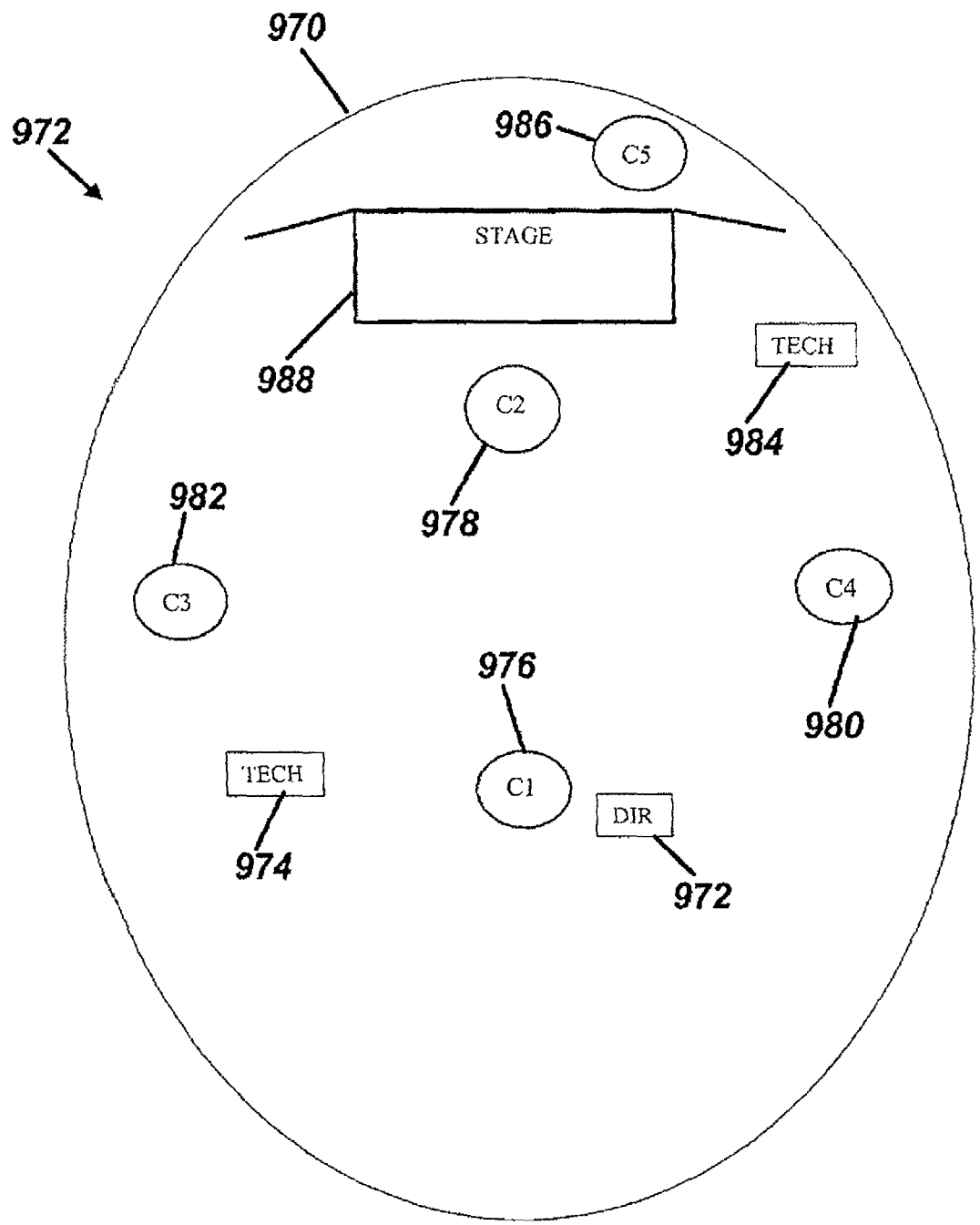
FIG. 27 illustrates a block diagram of a concert deployment, which can be implemented in accordance with an alternative embodiment.

FIG. 27 illustrates a block diagram 972 of a concert deployment, which can be implemented in accordance with an alternative embodiment of the present invention. FIG. 27 depicts a concert arena 970, which includes a stage 988. A camera 976 (i.e., C1) can provide a main camera perspective. A camera 978 (i.e., C2) can provide close up perspectives of the events taking place on stage 988. Camera 982 (i.e., C3) can provide a left view of the events taking place on stage 988. Camera 980 (i.e., C4) can provide a right view of the events taking place on stage 988. A backstage camera 986 (i.e., C5) can also provide backstage views of the events taking place on stage 988. A systems technician 974 (i.e., TECH) can also work in concert with a media/technical director 972 (i.e., DIR). Cameras C1 to C5 depicted in FIG. 27 thus generally can comprise in-play cameras. Video obtained from such in-play cameras can be transmitted from such in-play cameras for display at one or more hand held devices. The following generally summarizes the deployment illustrated in FIG. 27.

C1—Main Camera Perspective
C2—Close UP Perspectives
C3—Left View
C4—Right View
C5—Backstage Camera
TECH—System technicians
DIR—Media/Technical Director A hand held device (e.g., hand held device 60) can be equipped with receivers that can receive data transmitted from one or more data source(s) (e.g., RF gateways, video cameras, etc.) within the live entertainment venue. Such hand held devices are generally wireless-enabled and can take the form of a hand held portable television, PDA, proprietary rentals, or the like. The hand held devices can be adapted to receive smart cards that can enable receipt of venue data (e.g., receivers and/or authorization codes being held within the smart card or module). A venue-based data source can be a video camera, server or private broadcasting system. Video cameras can be adapted to provide high-resolution wide-angle video data. The video camera can also be a wireless video camera.

It can be appreciated that a hand held device, as described herein, can also be configured to include video cameras (e.g., digital camcorders, etc.), which can record and broadcast video. In such a situation, the hand held device can actually function as an in-play camera (i.e., if the hand held device is configured with video camera and video transmission capabilities). Such video camera capabilities can enable venue attendees to actually participate in providing live video feeds for use by an associated enterprise in order to leverage or expand viewing opportunities beyond enterprise camera assets. Under such a scenario, the venue attendees can actually provide media directors, amateur material for rebroadcast throughout the venue.

The concert arena or stadium can also be equipped with one or more transmitters. For example, several wireless gateways or signal transponders can be located throughout a venue to enable the simplex or duplex transfer of data. Examples of wireless networks that can be utilized in association with the disclosed embodiments are the well-known local area "Bluetooth" and "802.11" networks, and telecommunications networks such as CDMA, W-CDMA, GSM, etc.

Figure 28:
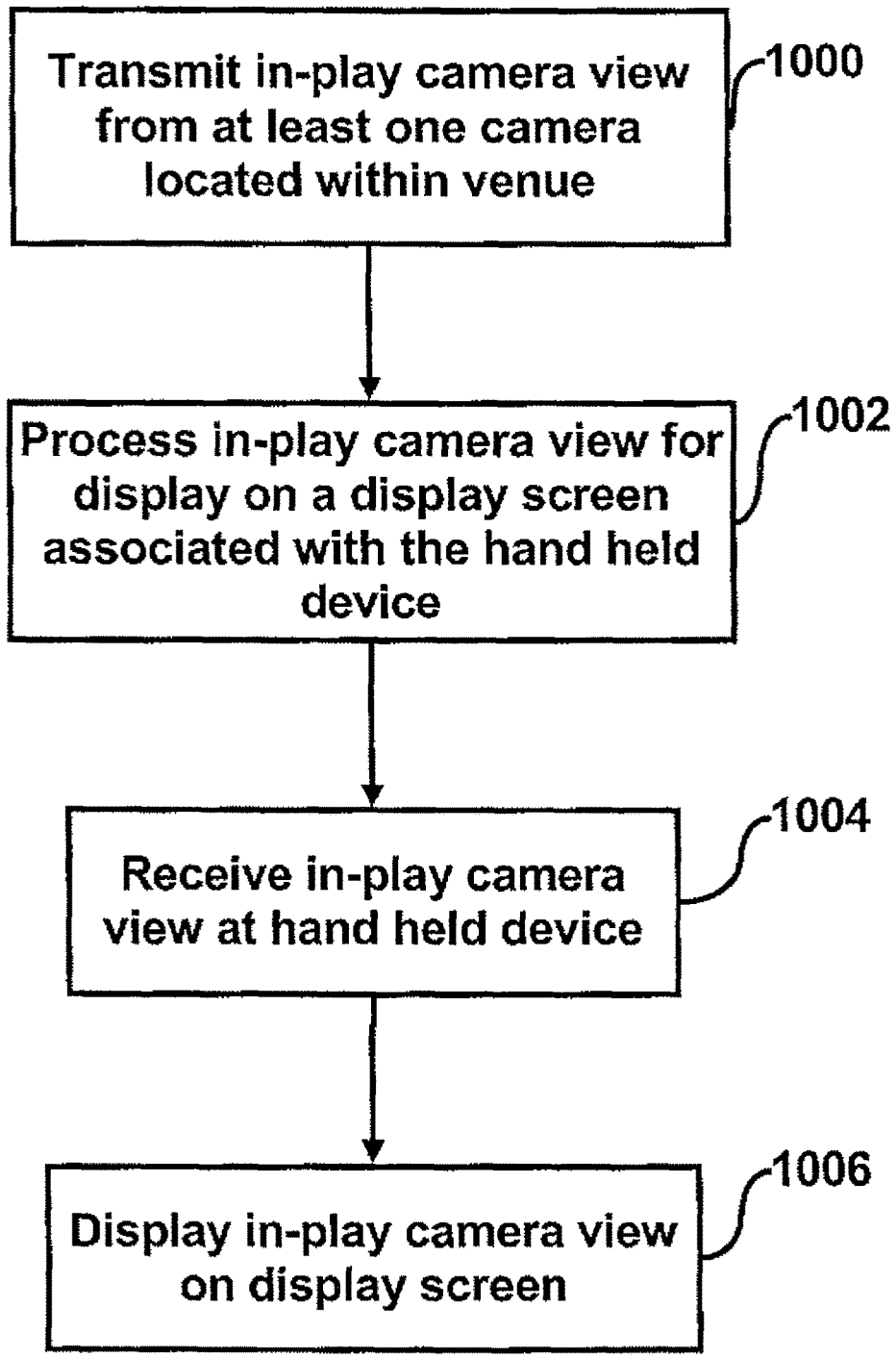
FIG. 28 depicts a flow-chart of operations illustrating operational steps that can be implemented in accordance with the disclosed embodiments.

FIG. 28 illustrates a flow-chart of operations illustrating operational steps that can be implemented in accordance with the disclosed embodiments. As indicated at block 1000, one or more in-play camera views can be transmitted from at least one in-play camera located at an in-play location within a venue. Thereafter, as illustrated at block 1002, such in-play camera views can be processed via a processor for display on a display associated with the hand held device. It can be appreciated based on the foregoing that the same in-play camera view can be transmitted to a plurality of hand held devices. As indicated next at block 1004, the in-play camera view(s) can be received at the hand held device (or hand held devices).

Thereafter, as illustrated at block 1006, the in-play camera view(s) can be displayed on the display associated with the hand held device, thereby enabling a user of the hand held device to view the in-play camera view(s) through the hand held device. Although a particular sequence of operational steps is illustrated in FIG. 28, it can be appreciated that this particular sequence is not a limiting feature of the present invention. For example, the operation illustrated at block 1004 can occur prior to the operation illustrated at block 1002. Processing of the in-play camera view can take place within the hand held device itself or via enterprise equipment/software associated with the venue from which in-play camera views are obtained. In-play camera views can be transmitted from in-play cameras to a hand held device in response to a particular user input. A particular in-play camera view transmitted from an in-play camera can be recorded in response to a user input. Additionally, a particular in-play camera view transmitted from said an in-play camera can be stored in response to a user input.

The embodiments and examples set forth herein are presented in order to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

The invention claimed is:

1. A system for authorizing access by a user of at least one service associated with an event at a venue based on a location of said user as determined by information derived from communication between a computing device in the form of a wireless handheld computing device carried and utilized by said user and assets of a wireless data communications network, said system comprising:

a wireless data communication network, the wireless data communication network allowing one or more mobile carriers to provide wireless data communication services to the wireless handheld computing device, and further comprising:

mobile switching centers, the mobile switching centers having access to one or more network servers and one or more network databases, wherein the wireless data communication network provides for updating of and use of information from the one or more network databases;

one or more receivers wirelessly receiving venue specific content, the one or more receivers configured to receive a request for streaming data from the wireless handheld computing device;

one or more transmitters wirelessly transmitting to the wireless handheld computing device;

wherein the one or more transmitters is configured to transmit at least one authorization code to the wireless handheld computing device based at least in part on a device identification of the wireless handheld computing device associated with a user; and at least one server, said at least one server comprising: a processor; a data bus coupled to said processor;

a computer-usable medium embodying computer code, said computer-usable medium being coupled to said data bus, said computer program code comprising network instructions executable by said processor and configured for:

determining a location of the wireless handheld computing device associated with at least one user based on communications of the wireless handheld computing device utilized by said at least one user, with said wireless data communications network supporting the wireless data communications service of the wireless handheld computing device, wherein the communications between the wireless handheld computing device and the wireless data communications network enables access by the server to information in the one or more network databases, the one or more network databases including at least wireless handheld computing device information associated with a plurality of users, including said user, and wherein the location of the wireless handheld computing device is determined by the server at least in part according to the wireless handheld computing device information stored in the one or more network databases and information from said wireless data communications network; and authorizing the wireless handheld computing device, by a security unit of the wireless handheld computing device, to receive said streaming data based on said location as determined by said wireless data communications network, wherein authorizing said wireless handheld computing device further comprises preventing said wireless handheld computing device from receiving said streaming data at a location beyond or within a particular geographic area, wherein said location beyond the particular geographic area further comprises a location selected from the group of locations comprising a location beyond a particular frequency range and a location outside of a particular geographical area associated with a wireless network, wherein authorizing further comprises transmitting the at least one authorization code to the wireless handheld computing device;

the wireless handheld computing device configured to communicate with the wireless data communications network, the wireless handheld computing device comprising:

a processor;
a data bus coupled to said processor;
a display screen including a touch screen user interface;
a computer-usable medium embodying computer code, said computer usable medium being coupled to said data bus, said computer program code comprising instructions executable by said processor and configured for:

connecting the wireless handheld computing device associated with the user to the wireless data communications network;

decrypting said streaming data according to the at least one authorization code received from the one or more transmitters; and displaying said streaming data, wherein said streaming data includes streaming video accessed from a server and sent to the wireless handheld computing device over the wireless data communication network, wherein streaming video is captured from multiple angles by multiple video cameras operating within at least one entertainment venue and is processed for simultaneous delivery to, and display by said user, on the display screen wherein said user comprises at least one subscriber of said streaming data.

2. The system of claim 1, wherein the wireless handheld computing device associated with the at least one subscriber further comprises a software module, wherein the software module performs routines or subroutines and utilizes image processing to convert said streaming video data received at the wireless handheld computing device into rendered images, and displays the images at the display screen of the at least one wireless handheld computing device, and wherein the streaming data includes said streaming video captured by at least two video cameras operating within said at least one entertainment venue, each video camera providing a different perspective, and wherein the software module allows the user to select on the display screen whether to display one or more of the perspectives from each of the two or more video cameras, and wherein the software module, in response to a user input request on the display screen, selects a network from the group consisting of a wireless LAN, Bluetooth, and the wireless data communication network to carry out the user input request.

3. The system of claim 2, wherein said network instructions are further configured for:

storing subscriber information associated with said at least one subscriber in a database, wherein the database comprises said one or more network databases and wherein the one or more network databases further comprise at least one Home Location Register, and wherein the at least one Home Location Register includes at least the identity of the currently serving Visiting Location Register, and wherein the Home Location Register handles signal system transactions in cooperation with mobile switching centers and the Visiting Location Register, wherein the Visiting Location Register requests information from the at least one Home Location Register and further wherein the Home Location Register initiates transactions with the Visiting Location Register to update wireless handheld computing device information associated with the at least one subscriber; and utilizing the wireless handheld computing device subscriber information to authorize said streaming data.

4. The system of claim 3 wherein the wireless data communications network comprises a CDMA network.

5. The system of claim 3 wherein the wireless data communications network comprises a GSM network.

6. The system of claim 3 wherein the wireless data communications network comprises a digital cellular communications system.

7. The system of claim 3 wherein said at least one subscriber comprises a roaming subscriber.

8. The system of claim 2 wherein the wireless data communications network comprises a packet-data transmission network based on a combination of network types.

9. The system of claim 3, wherein said touch screen user interface provides user interface buttons that said user touches to select whether to display one or more of the perspectives from each of the two or more video cameras.

10. The system of claim 2 wherein said image processing that converts said streaming video data into said rendered images includes selecting any position in at least one image of said rendered images to provide for an enlarged image displayed in said screen comprising a detailed image rendering of said at least one image.

* * * * *